United States Patent
Kuelbs et al.

(10) Patent No.: US 7,136,830 B1
(45) Date of Patent: Nov. 14, 2006

(54) METHOD OF PRODUCING, SELLING, AND DISTRIBUTING ARTICLES OF MANUFACTURE THROUGH THE AUTOMATED AGGREGATION OF ORDERS AND THE VISUAL REPRESENTATION OF STANDARDIZED SHIPPING VOLUMES

(75) Inventors: Gustav P. Kuelbs, Dallas, TX (US); John A. Kuelbs, Southlake, TX (US); Gregory G. Kuelbs, Keller, TX (US); Donald Domzalski, Lewisville, TX (US)

(73) Assignee: World Factory, Inc., Coppell, TX (US)

( * ) Notice: Subject to any disclaimer, the term of this patent is extended or adjusted under 35 U.S.C. 154(b) by 0 days.

(21) Appl. No.: 10/055,751

(22) Filed: Jan. 23, 2002

Related U.S. Application Data

(63) Continuation-in-part of application No. 09/968,962, filed on Oct. 2, 2001, now abandoned, which is a continuation-in-part of application No. 09/619,947, filed on Jul. 20, 2000, now Pat. No. 6,954,734.

(60) Provisional application No. 60/237,157, filed on Oct. 2, 2000, provisional application No. 60/149,011, filed on Aug. 13, 1999, provisional application No. 60/144,682, filed on Jul. 20, 1999.

(51) Int. Cl.
*G06F 17/30* (2006.01)
(52) U.S. Cl. .............................. 705/27; 705/26
(58) Field of Classification Search ................ 705/26, 705/27
See application file for complete search history.

(56) References Cited

U.S. PATENT DOCUMENTS

| | | | | |
|---|---|---|---|---|
| 6,035,289 | A * | 3/2000 | Chou et al. | 705/37 |
| 6,049,778 | A * | 4/2000 | Walker et al. | 705/14 |
| 6,260,024 | B1 * | 7/2001 | Shkedy | 705/37 |
| 6,269,343 | B1 * | 7/2001 | Pallakoff | 705/26 |
| 6,384,349 | B1 * | 5/2002 | Voll | 177/25.19 |
| 2002/0038266 | A1 * | 3/2002 | Tuttrup et al. | 705/28 |
| 2002/0143692 | A1 * | 10/2002 | Heimermann et al. | 705/37 |

FOREIGN PATENT DOCUMENTS

EP  0452057 A2 * 8/1991

OTHER PUBLICATIONS

Canada Newswire, US fleet services sees comshare MPC as integrated part of its future dashboard of key business indicatiors, Nov. 12, 2001.*

* cited by examiner

*Primary Examiner*—Mark Fadok
(74) *Attorney, Agent, or Firm*—James E. Walton

(57) ABSTRACT

The present invention also provides a dynamic on-line order gathering system that enables sellers to offer one or a combination of goods whose availability (production and/or shipping) may be economically linked in some ways with other items and which facilitates aggregation of demand across related items so as to enable the ability to reach critical mass of demand for the related goods by a more efficient means than currently available.

22 Claims, 46 Drawing Sheets

| DAYS TO DELIVER 307 | COST OF MONEY 321 | RISK OF OBSOLENCE 323 | EXOGENOUS RISK 325 | CURRENCY RISK 327 | FACTORY COST 329 |
|---|---|---|---|---|---|
| N | 10.00 | 0.40 | = | = | = |
| . | 10.00 | 0.00 | > | < | > |
| . | 10.00 | 0.00 | > | < | > |
| 8 | 10.00 | 0.00 | < | < | > |
| 7 | 20.00 | 0.00 | < | < | > |
| 6 | 20.00 | 0.00 | > | < | > |
| 5 | 20.00 | 0.00 | < | < | > |
| 4 | 30.00 | 0.00 | < | < | > |
| 3 | 30.00 | 0.00 | < | < | > |
| 2 | 30.00 | 0.00 | < | < | > |
| 1 | 30.00 | 0.00 | < | < | > |
| . | . | . | . | . | . |
| N | N | N | N | N | N |

$$\text{PRICE A (STYLE 1)} = \text{MANUFACTURER COST} + \left(Y * \frac{R}{365}\right) + P[\text{ITEM RISK}] + P\left[\frac{\$1000 - 0}{\text{ORDER RISK}}\right]$$

R = REAL COST OF MONEY APR
Y = DAYS OF FINANCING

| ORCHID ARMCHAIR | | Price | Quantity Available | Time to Delivery | Offer Expires | Order Minimum | |
|---|---|---|---|---|---|---|---|
| | ⚙ | ~~$11.50~~ | – | – | Closed: 3/9/2000 | 4 | |
| | 🚢 | ~~$15.65~~ | – | – | Closed: 6/13/2000 | 4 | |
| | 🚚 | $51.13 | 9 | 3-7 days | 9/12/2000 | 2 | |

| ORCHID BENCH | | Price | Quantity Available | Time to Delivery | Offer Expires | Order Minimum | |
|---|---|---|---|---|---|---|---|
| | ⚙ | ~~$82.06~~ | – | – | Closed: 3/9/2000 | 4 | |
| | 🚢 | ~~$90.27~~ | – | – | Closed: 6/13/2000 | 4 | |
| | 🚚 | $101.10 | 9 | 3-7 days | 9/12/2000 | 1 | |

| 5/PCS ROSE ALUMINUM GARDEN SET | | Price | Quantity Available | Time to Delivery | Offer Expires | Order Minimum | |
|---|---|---|---|---|---|---|---|
| | ⚙ | ~~$202.99~~ | – | – | Closed: 3/9/2000 | 4 | |
| | 🚢 | ~~$223.29~~ | – | – | Closed: 6/13/2000 | 4 | |
| | 🚚 | $250.08 | 2 | 3-7 days | 9/12/2000 | 2 | |

| ROSE VINE MATCHING BENCH | | Price | Quantity Available | Time to Delivery | Offer Expires | Order Minimum | |
|---|---|---|---|---|---|---|---|
| | ⚙ | ~~$63.89~~ | – | – | Closed: 3/9/2000 | 4 | |
| | 🚢 | ~~$70.26~~ | – | – | Closed: 6/3/2000 | 4 | |
| | 🚚 | $78.71 | 3 | 3-7 days | 9/2/2000 | 1 | |

| 5/PCS IMPERIAL CAST GARDEN SET | | Price | Quantity Available | Time to Delivery | Offer Expires | Order Minimum | |
|---|---|---|---|---|---|---|---|
| | ⚙ | ~~$221.99~~ | – | – | Closed: 3/9/2000 | 4 | |
| | 🚢 | ~~$244.19~~ | – | – | Closed: 6/13/2000 | 4 | |
| | 🚚 | ~~$273.49~~ | – | – | Closed: 9/12/2000 | 4 | SOLD |

FIG. 17C

| | | Price | Quantity Available | Time to Delivery | Offer Expires | Order Minimum | |
|---|---|---|---|---|---|---|---|
| 5/PCS SELECT CAST GARDEN SET | | $221.99 | - | - | Closed: 3/9/2000 | 4 | |
| | | $244.19 | - | - | Closed: 6/13/2000 | 4 | |
| | | $273.49 | 9 | 3-7 days | 9/12/2000 | 1 | |

| | | Price | Quantity Available | Time to Delivery | Offer Expires | Order Minimum | |
|---|---|---|---|---|---|---|---|
| 5/PCS ALUMINUM & WICKER PATIO SET | | $221.72 | 10 | 3-7 days | 6/30/2000 | 1 | |

| | | Price | Quantity Available | Time to Delivery | Offer Expires | Order Minimum | |
|---|---|---|---|---|---|---|---|
| WICKER & ALUMINUM BISTRO SET | | $74.05 | - | - | Closed: 3/9/2000 | 4 | |
| | | $81.46 | - | - | Closed: 4/26/2000 | 4 | |
| | | $91.23 | 3 | 3-7 days | 7/30/2000 | 1 | |

| | | Price | Quantity Available | Time to Delivery | Offer Expires | Order Minimum | |
|---|---|---|---|---|---|---|---|
| 3/PCS ALUMINUM AND WICKER BISTRO SET | | $119.87 | - | - | Closed: 9/26/2000 | 4 | SOLD |

| | | Price | Quantity Available | Time to Delivery | Offer Expires | Order Minimum | |
|---|---|---|---|---|---|---|---|
| 7-1/2', 6 RIB STANDARD UMBRELLA HUNTER GREEN | | $27.76 | - | - | Closed: 3/9/2000 | 4 | |
| | | $30.54 | - | - | Closed: 6/13/2000 | 4 | |
| | | $34.20 | - | - | Closed: 9/12/2000 | 4 | SOLD |

| | | Price | Quantity Available | Time to Delivery | Offer Expires | Order Minimum | |
|---|---|---|---|---|---|---|---|
| 7-1/2', 6 RIB STANDARD UMBRELLA BLUE | | $27.76 | - | - | Closed: 3/9/2000 | 4 | |
| | | $30.54 | - | - | Closed: 6/13/2000 | 4 | |
| | | $34.20 | - | - | Closed: 9/12/2000 | 4 | SOLD |

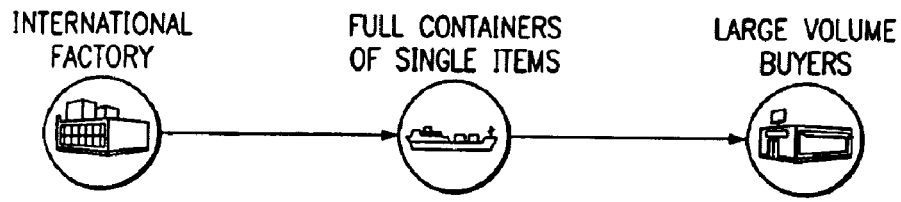
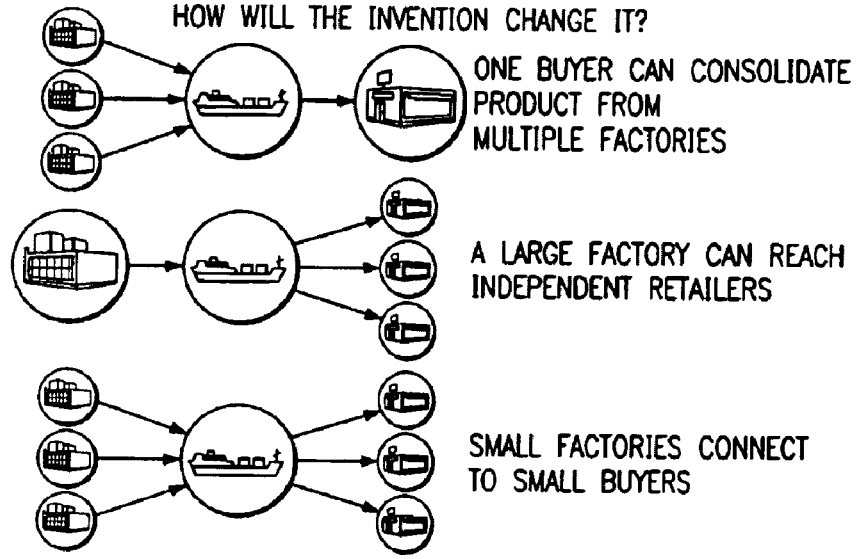
FIG. 18A
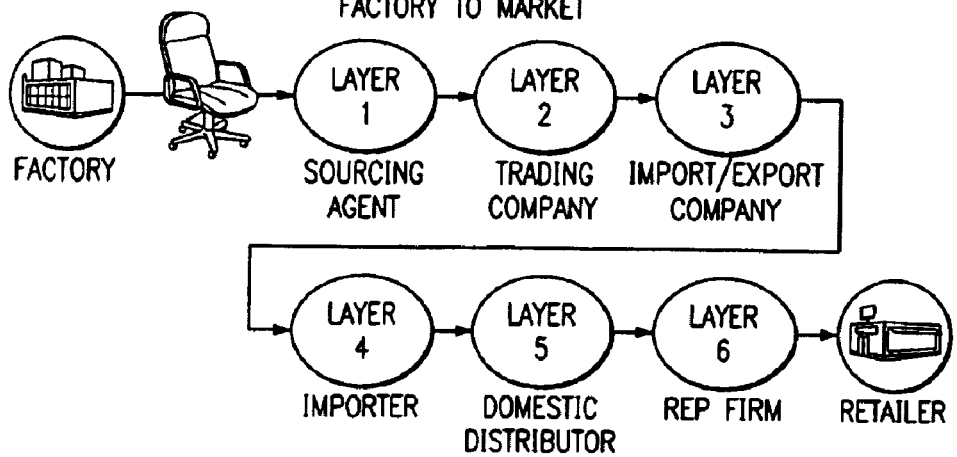
FIG. 18B

RETAILER TO SOURCE
OLD SOURCING METHOD

EACH PRODUCT CATAGORY HAS ITS OWN UNIQUE PATH TO SUPPLY WHICH
MAKES IT DIFFICULT FOR INDEPENDENT RETAILERS TO SOURCE A VARIETY OF GOODS

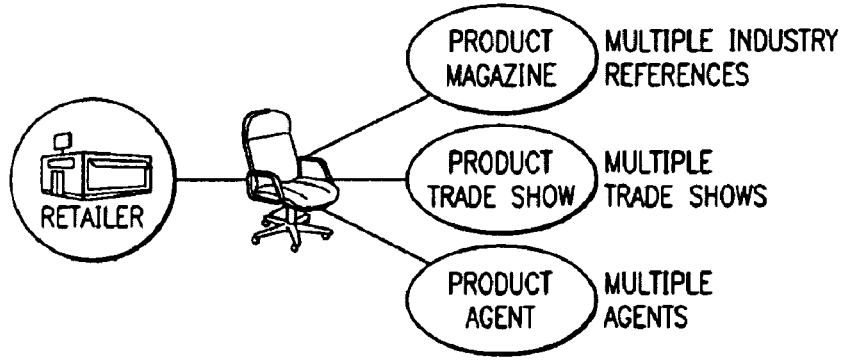

EXCHANGE RETAILERS ENJOY A "SINGLE POINT OF CONTACT" TO
MULTIPLE PRODUCT CATAGORIES AND MULTIPLE FACTORIES

THE EXCHANGE EMPOWERS INDEPENDENT RETAILER PURCHASING PERSONNEL
INDEPENDENTS CAN NOW COMPETE IN BOTH
PRICE AND SELECTION WITH NATIONAL CHAINS

*FIG. 18C*

PHYSICAL FLOW OF GOODS
THE OLD SYSTEM
UP TO 5 SHIPPING TRANSACTIONS AND UP TO 3 WAREHOUSE STOPS

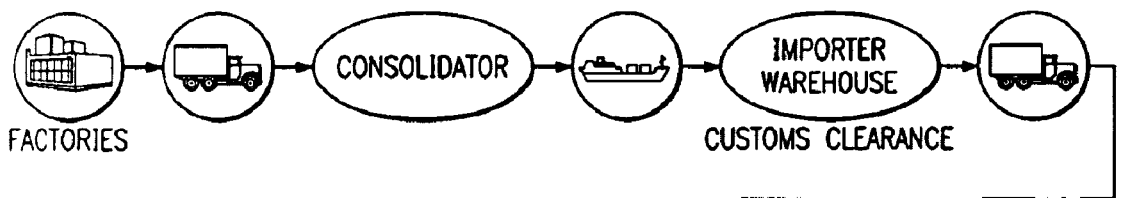

*FIG. 18D*

BUYER'S PORTAL
701

FIG. 27

| 173 Items Found | 740 | 742 | 744 | 746 | 748 |
|---|---|---|---|---|---|
| 10" METAL TRANSPLANTER | Production Level | Price | Minimum Order | WorldFactory Arrival Date | Qty Available |
| 719, 721 | 741 | $0.45 | 1 | 3/15/2001 | 2160 |
| 10" METAL TROWEL | Production Level | Price | Minimum Order | WorldFactory Arrival Date | Qty Available |
| 723 | 743 | $0.45 | 1 | 3/15/2001 | 2160 |
| 10' TWO-TIER MARKET UMBRELLA, BLUE | Production Level | Price | Minimum Order | WorldFactory Arrival Date | Qty Available |
| 725 | 745 | $50.88 | 1 | 4/15/2001 | 10 |
| 10' TWO-TIER MARKET UMBRELLA, HUNTER GREEN | Production Level | Price | Minimum Order | WorldFactory Arrival Date | Qty Available |
| 727 | 747 | $50.88 | 1 | 4/15/2001 | 25 |
| 10' TWO-TIER MARKET UMBRELLA, NATURAL | Production Level | Price | Minimum Order | WorldFactory Arrival Date | Qty Available |
| 729 | 749 | $50.88 | 1 | 4/15/2001 | 10 |
| 11" METAL WEEDER | Production Level | Price | Minimum Order | WorldFactory Arrival Date | Qty Available |
| 731 | 751 | $0.45 | 1 | 3/15/2001 | 2160 |
| 12" ALUMINUM TRANSPLANTER | Production Level | Price | Minimum Order | WorldFactory Arrival Date | Qty Available |
| 733 | 753 | $2.40 | 1 | 3/15/2001 | 3168 |

| W⊕RLD FACTORY | PRODUCT DATA SHEET 753 |
|---|---|

| Product Category: Interior: ~761 |
| --- |
| SKU/Ref#: 150800001 ~763 |
| UPC#: 685795010931 ~765 |
| Unit of Measure: Each ~767 |
| Item Name: JUTE RUG-BURGUNDY ~769 |
| Item Description:<br>2500 GR/SQM (GROSS WEIGHT), 100% JUTE YARN, FIRE RESISTANT, ANTIBACTERIA, REACTIVE DYE, BURGUNDY AND NATURAL COLORS. ABSORBENT 10 TIMES THE NOISE LEVEL OF SYNTHETIC CARPET, HUMIDITY REGULATING, HAS NONE OF THE TOXIC FUMES OF SYNTHETIC FIBRES, STATIC FREE, ~771 |

| Primary Material:<br>JUTE ~773 | Other Material(s): ~774 |
| --- | --- |

| Color:<br>BURGUNDY AND ~775 | Size: ~776 | Other: ~778 |
| --- | --- | --- |

| Recommended Price: ~777<br>$24.19 | 780 ~ MSRP:<br>$0.00 |
| --- | --- |

Dimensions and Shipping Information: 755

| Product Dimensions: ~781 | | Cubic Dim: | Shipping Information: ~783 |
| --- | --- | --- | --- |
| Assembled (UOM): | in 13.78 X 23.62 X 0.00<br>cm 35.00 X 60.00 X 0.00 | cu in  W<br>cu cm W | Max. UOM Qty per 20'/40' Cnt:<br>a/b |
| Package (UOM): | in 13.78 X 23.62 X 0.00<br>cm 35.00 X 60.00 X 0.00 | cu in  X<br>cu cm X | Package Type:<br>Kraft Box |
| Case: | in <N/A><br>cm | cu in  Y<br>cu cm Y | Qty per Case:<br>c |
| Master Carton: | in 13.78 X 23.62 X 0.00<br>cm 35.00 X 60.00 X 0.00 | cu in  Z<br>cu cm Z | Qty per Master Shipping Carton:<br>1 |

| Weight Information:<br>    Net Weight (UOM): N/A<br>787 Gross Weight (UOM): 5.50 lbs<br>    Gross Case Weight:<br>Gross Master Carton Weight: 6.38 lbs | UPS Shipping Information ~785<br>                         Package (UOM)  Case<br>UPS Capable?    Yes        ---<br>UPS Weight (lbs):  6<br>Zone2: Zone3: Zone4: Zone5: Zone6: Zone7: Zone8:<br>$3.73  $4.01  $4.54  $4.84  $5.14  $5.41  $5.94 | Master<br>Carton<br>Yes<br>7 |

| WORLD FACTORY | Home Page | Outdoor Living | Tools & Hardware | New Departments | Close-out |

FAQ's    View My RFQ's    Advanced Search    U.S. Sample Showroom    Help/Contact Us

Order Pad
Last item purchased:
Tailgaiter Fireplace and Grill
Total Items: 3
Subtotal: $5,415.20
[View Order Pad]

Browse Departments
Benches
  Cast Iron
  Metal
Brass Garden & Outdoor Accessories
  Thermometers & Rain Gauges
Candle Lanterns, Torches & Candle Stakes
Fountains
  Indoor/Outdoor Garden
  Table & Wall
Outdoor Furniture
  Aluminum-Sling & Cushioned
  Cast Aluminum
  Stainless Steel & Aluminum
  Wicker & Aluminum
  Wood & Aluminum
  Wrought Iron
Planters
  Poly Foam Indoor/Outdoor
  Wooden
Sundials & Bird Baths
Tools
  Garden Tools
  Power Glide Tools
Umbrellas
Umbrellas Stands 803 — Early Buy

COPPER PATIO TORCH SET — 805

807

811
Offer Number: 1273
SKU Number: 50401074

813
815 — World Factory Arrival Date: 6/1/2001
Orders begin shipping 3-14 days from above date 817
Quantity Available: 800
819 — Min Order: 1
In Multiples of: 1
Price: $37.55
823    821

SOLID POLISHED COPPER POTS WHICH INCLUDES (1) 52" AND (1) 62" TORCH USE ONLY
809
More Information Order Quantity: [ ]   ADD TO ORDERPAD
825    827

Other Items arriving in this container: — 829

835 — Quantity Available
1) CONDUCTORS 3/PCS LANTERN SET — 831    400
2) SHORT STAND W/TAPERED LANTERNS — 833    200

FIG. 30

WORLD FACTORY — WHERE BUSINESSES BUY DIRECT FROM THE WORLD'S FACTORIES

Edit Offer# 1273
ACME LIGHTING LIMITED-Account# 99- — 853  855
Document Last Edited: R_SAYNER on 3/13/2001 7:42:42: AM [More]
Offer Status: Active — 857
Item Offer Information: — 859
Container # <Unknown>

| Item | *Minimum Production Quantity | *Minimum Order Quantity | *Cost ($/Unit of Measure) | *Maximum Order Quantity | Earliest/Actual Production Date | | | Help |
|---|---|---|---|---|---|---|---|---|
| 50401046 SHORT STAND W/ TAPERED LANTERNS | 416 | 1 | 1.00 | 1500 | April | 1 | 2001 | |
| | | | | | ☐ Convert to Actual Production Date? | | | |
| Production Level Pricing | 🏭 22.90 | ☎ 26.80 | 🚢 28.95 | 🚚 35.65 | | | | |
| 50401074 COPPER PATIO TORCH SET | 440 | 1 | 1.00 | 15000 | April | 1 | 2001 | |
| | | | | | ☐ Convert to Actual Production Date? | | | |
| Production Level Pricing | 🏭 33.55 | ☎ 37.55 | 🚢 39.89 | 🚚 42.89 | | | | |
| 50401056 CONDUCTORS 3/PCS LANTERN SET | 256 | 1 | 1.00 | 15000 | April | 1 | 2001 | |
| | | | | | ☐ Convert to Actual Production Date? | | | |
| Production Level Pricing | 🏭 56.17 | ☎ 58.79 | 🚢 61.29 | 🚚 65.50 | | | | |

Enter Offer Minimum Constraint: Example
○ 20 foot container
⦿ 40 foot container
○ US Dollar Minimum [____] or more total order value — 867

Offer Comments: — 869

Offer Acceptance Information: — 877
879 — *Factory Offer Expiration Date: February 20 2001
881 — Available Terms of Sale:
☑ Letter of Credit
☐ Bank Transfer
☐ Cash on Delivery
☐ Consignment to World Factory
☐ Regularly Scheduled Production Run?

General Offer Shipping Information:
871 — *Estimated FOB Port Departure Date: May 1 2001
873 — *FOB Port: Shanghai
875 — *Estimated World Factory Arrival Date: June 1 2001

[Finish] — 883

FIG. 31B

| WORLD FACTORY | Home Page | Outdoor Living | Tools & Hardware | Office | New Departments | Close-out |

FAQ's    View My RFQ's    Advanced Search    U.S. Sample Showroom    Help/Contact Us Order Pad Last item purchased:
UTILITY COOLER
WITH RADIO
  Total Items: 2
  Subtotal: $45,463.84

View Order Pad

Browse Departments

Hand Tools
  Garden Tools
  Pliers & Wrenches
  Screwdrivers & Saws
  Shears, Loppers
  & Pruners
  Tool Kits
Power Tools
Wagons & Hand Trucks Container Builder
Container# 1  ─1005
       1001
1003      ─ 60202350: UTILITY COOLER WITH RADIO (68% /62% O.P.)
            ─ 60202132: 531/PCS PRO TOOL KIT (26% /0% O.P.)
            ─ 60202130: 135/PCS TOOL SET (6% /0% O.P.)

Container# 2
            ─1007
1009 ─ 60202212: WANDER SAW REPLACEMENT BLADES (3%)
      ─ 60202210: WANDER SAW (1%)
      ─ 60202107: TWIN DRIVER SET (1%)
      ─ 60202103: 8-IN 1 SCREWDRIVER SET (1%)
      ─ 60202100: 26-PC UNIVERSAL SOCKET & DRIVER SET (2%)
      ─ 60202110: 27-PC Z-DRIVER SET (3%)
      ─ 60202342: 121/PCS DRILL & DRIVER SET (13%)
      ─ 60202130: 135/PCS TOOL SET (8%)

Factory Offer
Orders placed for Factory Offer items are not confirmed until verified by World Factory

UTILITY COOLER WITH RADIO

Offer Number:   1697
SKU Number:    60202350
Offer Expires:  6/15/2001
World Factory
Arrival Date:   7/15/2001
Orders begin shipping 3-14
days from above Date
Production
Run Minimum:    100 Met
Min Order:      2
In Multiples of: 1
Price:          $31.63
Order
Quantity: [   ]

ADD TO ORDERPAD

This cooler/lunchbox features a built-in AM/FM radio, has a durable plastic exterior, rugged handle and adjustable shoulder strap. Operates on 4 "AA" Batteries.
More Information ☑ Item has met the Production Run Minimum
◩ Your Order Pad Area
◪ Item has NOT met the Production Run Minimum
☐ Open Items in this offer to help fill open container space:

|   | Min Orders Needed | Min Order Qty |   | Min Orders Needed | Min Order Qty |
|---|---|---|---|---|---|
| 1) 60202350 UTILITY COOLER WITH RADIO | 100 | 2 | 6) 60202100 26-PC UNIVERSAL SOCKET & DRIVER SET | 250 | 24 |
| 2) 60202132 531/PCS PRO TOOL KIT | 250 | 4 | 7) 60202103 8-IN 1 SCREWDRIVER SET | 250 | 72 |
| 3) 60202130 135/PCS TOOL SET | 250 | 4 | 8) 60202107 TWIN DRIVER SET | 250 | 48 |
| 4) 60202342 121/PCS DRILL & DRIVER SET | 250 | 6 | 9) 60202210 WANDER SAW | 100 | 20 |
| 5) 60202110 27-PC Z-DRIVER SET | 250 | 6 | 10) 60202212 WANDER SAW REPLACEMENT BLADES | 40 | 20 |
|   |   |   | 11) 60202104 17-PC POCKET SECURITY DRIVER SET | 250 | 96 |

FIG. 31D

| W⊕RLD FACTORY | Home Page | Outdoor Living | Tools & Hardware | New Departments | Close-out |

FAQ's    View My RFQ's    Advanced Search    U.S. Sample Showroom    Help/Contact Us Order Pad Last item purchased:
Tailgaiter Fireplace and Grill
Total Items: 5
Subtotal: $155,881.70

View Order Pad

Factory Offer
Orders placed for Factory Offer items are not confirmed until verified by World Factory

CONDUCTORS 3/PCS LANTERN SET

Offer Number: 1273
SKU Number: 50401056
Offer Expires: 5/15/2001
World Factory
Arrival Date: 6/1/2001
Orders begin shipping 3-14 days from above Date
Production Run Minimum: 256
Min Order: 1
In Multiples of: 1
Price: $56.17
Order Quantity: ☐

ADD TO ORDERPAD

INCLUDES WITH SMALL 30" LANTERNS AND LARGE 48" LANTERNS WITH LANTERN 7-3/4" DIMAMETERS OF 7-3/4 AND 12".
More Information Container Builder
Containers# 1-4
1021 — [▨▨▨▨▨▨▨]
1023 — [▨▨▨▨▨▨▨▨]
1025 — [▨▨▨▨▨▨▨▨▨]
1027 — 50401074: COPPER PATIO TORCH SET (4Cnts /88% O.P.)

Container# 5  1045
1039 — [▨▨▨▨▨▨ | ▨ |     ]
1029 — 50401056: CONDUCTORS 3/PCS LANTERN SET (20% /20% O.P.)
       50401074: COPPER PATIO TORCH SET (39% /39% O.P.)

▨ Item has met the Production Run Minimum    ▨ Your Order Pad Area    ▨ Item has NOT met the Production Run Minimum    ☐ Open Items in this offer to help fill open container space:

| | Min Orders Needed | Min Order Qty |
|---|---|---|
| 1) 50401074 COPPER PATIO TORCH SET | 440 | 1 |
| 2) 50401056 | | |

| WORLD FACTORY | Home Page | Outdoor Living | Tools & Hardware | New Departments | Close-out |

FAQ's    View My RFQ's    Advanced Search    U.S. Sample Showroom    Help/Contact Us World Wise Co. Account Page
Service Options 1503
- Track Recent Orders
- View/Edit Shipping Address Book
- Edit Profile
- Change Password
- Complete Credit Application
- Log Out If you have questions or problems please contact us at 1-888-422-7800 or email us at customerservice@worldfactory.com RFQ's 1505
- View Factory Offers in Response to your RFQ's
- View All Submitted RFQ's
- Submit a new RFQ Factory Offers in Response to your RFQ's:
Responses Pending WorldFactory Review For RFQ's:

1507
- RFQ #2: GeeWhizBang Digital Camera – Offer #1289
- RFQ #2: GeeWhizBang Digital Camera – Offer #1290
- RFQ #2: GeeWhizBang Digital Camera – Offer #1291

1509 — In response to RFQ #2 TEST

| | Production Level | Offer Price | Offer Closes | Minimum Order | WorldFactory Arrival Date |
|---|---|---|---|---|---|
| | (icon) | $500.00 | 5/15/2001 | 100 | 6/15/2001 |

1511 — In response to RFQ #9 10" WOODWORKING CABINET TABLE SAW

| | Production Level | Offer Price | Offer Closes | Minimum Order | WorldFactory Arrival Date |
|---|---|---|---|---|---|
| | (icon) | $400.00 | 5/15/2001 | 100 | 6/17/2001 |

1513 — View All Submitted RFQ's:

| RFQ# | Item | Status | |
|---|---|---|---|
| 42 | TEST | Received | Edit RFQ |
| 35 | 10" WOODWORKING CABINET TABLE SAW | Under Review | |
| 45 | 8 SLAT TRADITIONAL PARK BENCH | Under Review | |
| 41 | B-DAY SUIT | Under Review | |
| 40 | NEW KIT | Under Review | |
| 39 | SHORT STAND W/TAPERED LANTERNS | Under review | |
| 8 | GEEWHIZBANG DVD PLAYER | Buyer Contacted | |
| 2 | GEEWHIZBANG DIGITAL CAMERA | Quotation Generated | |
| 9 | GEEWHIZBANG TABLE SAW | Quotation Generated | |
| 15 | OUTDOOR RUNNING TRACK | RFQ Terminated | |

| W🌐RLD FACTORY   WHERE BUSINESSES BUY DIRECT FROM THE WORLD'S FACTORIES |
| About Us   Edit Registration   View Item Catalog & Items on Offer   View RFQ's   Help/Contact Us   U.S.A. Sam |

◯ Submit Offer on RFQ ▱

World Wise Co. — Account# 6292 — Don Domzalski

RFQ Item Offer Information: ⟋1530

| 1533 Item | 1537 *Minimum Order Quantity | 1541 *Price ($/Unit of Measure) | 1545 *Maximum Order Quantity | 1551 Earliest/Possible Production Date | Help |
|---|---|---|---|---|---|
| 10" WOODWORKING CABINET TABLE SAW | 250 | 400 | 1000 | May ▼   3 ▼   2001 ▼ | |
| 1535 | 1539 | 1543 | 1547 | 1553 | |

Comments:
1561 ⟋ [         ]

Shipping Information: ⟋1560

*Earliest Possible FOB Delivery Date: June ▼  10 ▼  2001 ▼
1563

1565 ⟋ *FOB Port: Dallas

1567 ⟋ *Offer Expiration Date: May ▼  19 ▼  2001 ▼

1569 ⟋ Available Terms of Sale: ☐ Letter of Credit

☑ Bank Transfer

☐ Cash on Delivery

☐ Consignment to World Factory

Is there regularly scheduled production of this item? ☑ Yes

[Finish] ⟞ 1571

Main Menu

| WORLD FACTORY | ⊕USA SAMPLE SHOWROOM |

About Us  Edit Registration  View Item Catalog & Items on Offer  View RFQ's  Help/Contact Us  U.S.A. Sam U.S.A. Sample Showroom

RESERVE YOUR SPACE NOW $9m^2$ Year-Round Showroom Space Starting at $3,600

To better serve USA Import Buyers, World Factory is inviting a limited number of suppliers to display products in our USA Sample Showroom. The showroom will allow buyers throughout the USA to see, touch and buy our supplier's merchandise through the World Factory system.

Showroom Benefits Include:

- Professional set-up and display of your products in the USA Sample Showroom. <u>Reserve Your Space Here!</u>

- Secure, well-lighted space open only to qualified <u>buyers</u>.

- Showroom is located 5 minutes from Dallas-Fort Worth International Airport, the second l airport in the USA. Our USA buyers can fly in, visit our showroom, purchase merchandise return home within a day.

- Cost efficient sample management.

- Free internet display space for your merchandise on www.worldfactory.com

W🌐RLD FACTORY  🌐USA  SAMPLE SHOWROOM

Space Reservation # 1081

Client: World Factory Inc.  
Authorized Name: Don Domzalski  
Agreement Date: 5/15/2001 11:51:59 AM Status: Waiting  
Approved By:  
Approved Date:

Check here to confirm receipt of Signed Agreement ☐ [Cancel] [Approve]

| Code | Description | Monthly Rate | Quantity | Monthly Rate Total | Yearly Rate Total |
|---|---|---|---|---|---|
| RFS | Raw Floor Space 9m² | $350.00 | 1 | $350.00 | $4,200.00 |
|  | Plus Display Fixtures |  |  |  |  |
| FSN | Nesting Tables | $50.00 | 1 | $50.00 | $600.00 |
| FS3 | 3-Tier Display | $50.00 |  |  |  |
| FS4 | 4-Tier Display | $50.00 |  |  |  |
| FSP | Platform | $25.00 |  |  |  |
| FSS | Slatwall H Unit | $75.00 | 1 | $75.00 | $900.00 |
|  |  |  |  | TOTAL | $5,700.00 |
|  | Display Fixtures |  |  |  |  |
| LDG | Large Display Case with Glass | $198.00 |  |  |  |
| SDG | Large Display Case No Glass | $148.00 |  |  |  |
| LDN | Small Display Case with Glass | $184.00 |  |  |  |
| UW2 | Upright Shelf Wall Space 24" deep (0.6m D) | $198.00 |  |  |  |
| UW4 | Upright Shelf Wall Space 48" deep (1.2m D) | $248.00 |  |  |  |
| SG4 | Towers & Slat Grid Wall 48" wide x 96" high (1.2m W x 2.4m H) | $148.00 |  |  |  |
| SG9 | Towers & Slat Grid Wall 96" wide x 96" high (2.4m W x 2.4m H) | $248.00 |  |  |  |
| NTB | Nesting Tables | $248.00 |  |  |  |
| 3TD | 3-Tier Display | $198.00 |  |  |  |
| 4TD | 4 Tier Display | $198.00 |  |  |  |
| PFM | Platform | $98.00 |  |  |  |
| SHU | Slatwall H Unit | $198.00 |  |  |  |

Payment Method (select one)  
◉ Annual (12 months)-1 payment  
Get one extra month free when selecting annual payments  
○ Bi-Annual (6 months)-2 payments

TOTAL $0.00  
GRAND TOTAL $5,700.00

[Calculate] [Approve]

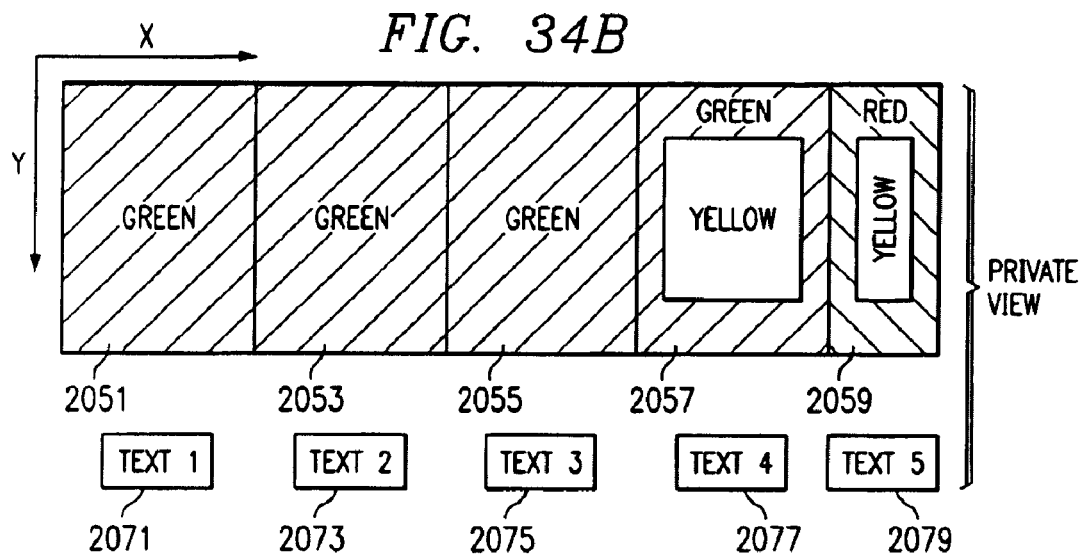
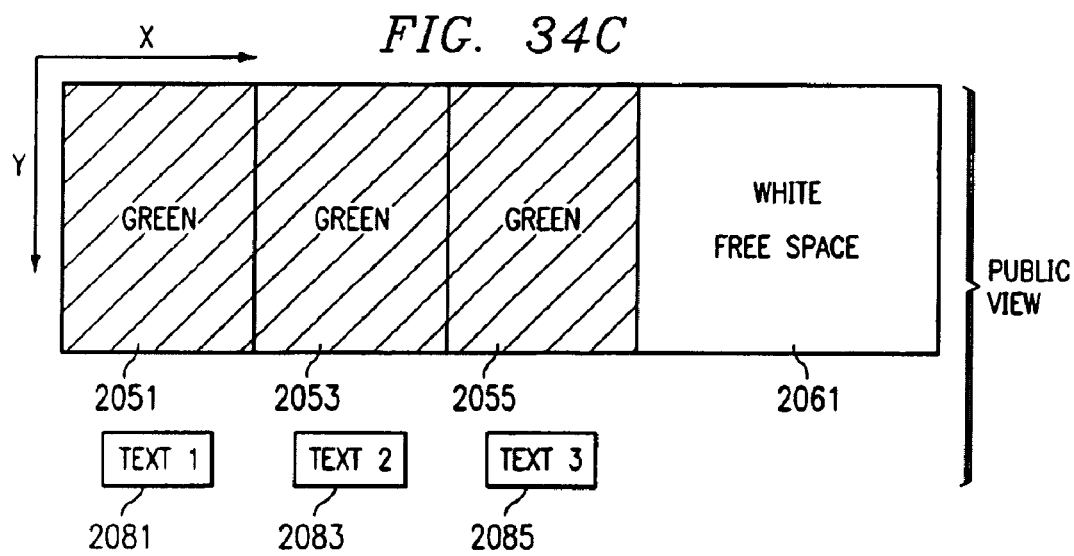

FIG. 35A

W🌐RLD FACTORY    WHERE BUSINESSES BUY DIRECT FROM THE WORLD'S FACTORIES

About Us   Edit Registration   View Item Catalog & Items on Offer   View RFQ's   Help/Contact Us   U.S.A. Sam ▢ Registration Information ▢

Vendor #: 117

Add To/Update G.P.: ☑

*E-mail Address: [A1117@117.com] (This will be your Login ID)

*Password: [ ]

Title: [Mr. ▼]

*Family Name: [<Unknown>]

*Given Name: [<Unknown>]

Job Title: [ ]

*Company Name: [ ]

Department: [ ]

Address: [ ]
[ ]
[ ]

City: [ ]

State/Province: [ ]

Postal Code: [ ]

*Country: [ ▼]

*Primary Telephone: [ ] [ ] [ ]
            Country Code   City Code   Phone Number Fax: [ ] [ ] [ ]
      Country Code   City Code   Fax Number Home Page: [ ]

*=Required Field

[ Next>> ]   [ List Additional Contacts at Your Company ]   [ Cancel ]

*FIG. 35B*

W⊕RLD FACTORY  WHERE BUSINESSES BUY DIRECT FROM THE WORLD'S FACTORIES

About Us  Edit Registration  View Item Catalog & Items on Offer  View RFQ's  Help/Contact Us  U.S.A. Sample Showro ☐ Company Profile 1. Type of Business: (Please check all that apply)
   ☐ Agent  ☐ Distributor  ☐ Manufacturer  ☐ Importer
   ☐ Exporter  ☐ Trading Company 2. Number of sub-vendors who supply your company:
   ○ 1-10  ○ 11-100  ○ 100+

3. Approximate annual sales of your company:
   ○ Under $1 million  ○ $1-5 million  ○ $5-24 million  ○ $25-100 million  ○ Over $100 million 4. Your major export markets (both direct and indirect). Check any that apply:
   ☐ USA  ☐ Western Europe  ☐ Eastern Europe  ☐ Central/South America
   ☐ North America  ☐ Northern Asia  ☐ Australia  ☐ Mid East/Africa  ☐ India
   ☐ Japan  ☐ Southeast Asia  ☐ Honk Kong  ☐ Taiwan
   Other [____]

5. Check any Payment Methods You Accept:
   ☐ Letter of Credit  ☐ Bank Transfer  ☐ Cash on Delivery  ☐ Consignment 6. Prefferred FOB Port(s):
   ☐ Acapulco  ☐ Bremerhaven  ☐ Fuzhou  ☐ Klang
   ☐ Kowloon  ☐ Manilla  ☐ Qingdao  ☐ Shanghai
   ☐ Shenzhen  ☐ Hong Kong  ☐ Los Angeles  ☐ Madras
   ☐ Ningbo  ☐ Xiamen  ☐ Guangzhou  ☐ Keelung
   ☐ Taichung
   Other [____]

[Next>>]  [Cancel]

FIG. 35C

W🌐RLD FACTORY  WHERE BUSINESSES BUY DIRECT FROM THE WORLD'S FACTORIES

About Us   Edit Registration   View Item Catalog & Items on Offer   View RFQ's   Help/Contact Us   U.S.A. Sam

Category Information

Your Major Product Categories: (Check one or all that apply)

- ☑ Outdoor Living
  - ☐ Accessories & Seasonal
  - ☐ Benches
  - ☐ Brass Garden & Outdoor Accessories
  - ☐ Fountains
  - ☐ Grills, Chimoneas
  - ☑ Outdoor Furniture
  - ☐ Outdoor Lighting
  - ☐ Planters
  - ☐ Tools
  - ☐ Umbrellas
  - ☐ Umbrellas Stands
- ☐ Men's Clothing
  - ☐ Outerwear
- ☐ Women's Clothing
  - ☐ Outerwear
- ☐ New Departments
  - ☐ Aluminum Cases
  - ☐ Bathrobes & Towels
  - ☐ Desks
  - ☐ Fire Sets & Screens
  - ☐ Gift
  - ☐ Picnic Baskets
  - ☐ Tableware
  - ☐ Telescopes & Binoculars
- ☐ Pool & Patio
  - ☐ Fountains, Ponds, Pumps
  - ☐ Pool Accessories
- ☐ Hardware & Tools
  - ☐ Hand Tools
  - ☐ Power Tools
  - ☐ Wagons & Hand Trucks
- ☐ Seasonal
  - ☐ Christmas
  - ☐ Halloween
  - ☐ Memorial Day
- ☑ Sporting Goods
  - ☐ Baseball
  - ☐ Basketball
  - ☐ Bicycle
  - ☐ Fishing    ☐ Hiking
  - ☐ Football   ☐ Ski
  - ☐ Golf       ☐ Soccer

- ☐ Household
  - ☐ Household Items
  - ☐ Kitchen
  - ☐ Knives, Silverware, Flatware
- ☐ Camera & Electronics
  - ☐ Camera
  - ☐ Computer
  - ☐ Stereo
  - ☐ Telephone
  - ☐ TVs
- ☐ Domestic
  - ☐ Bath
  - ☐ Bed Accessories
  - ☐ Closet Accessories
  - ☐ Sheets
  - ☐ Towels
  - ☐ Window Treatments
- ☐ Entertainment
  - ☐ CDs
  - ☐ Musical Instruments
  - ☐ Tapes
  - ☐ Videos
- ☐ Travel & Accessories
  - ☐ Accessories
  - ☐ Briefcase, Wallets & Organizers
  - ☐ Luggage
- ☐ Close Outs
  - ☐ Benches & Gliders
  - ☐ Chairs
  - ☐ New Closeouts
  - ☐ Tables
- ☐ Interior
- ☐ Office
  - ☐ Briefcases & Travel Bags
  - ☐ Chairs
  - ☐ Desks
- ☐ Home
- ☐ Medical
  - ☐ Disposable Items
  - ☐ Equipment
  - ☐ Hospital Use
  - ☐ Nursing Home Use
  - ☐ Personal Care   ☐ Retail Medical

[ Next>> ]   [ Cancel ]

FIG. 35D

W⊕RLD FACTORY  WHERE BUSINESSES BUY DIRECT FROM THE WORLD'S FACTORIES

About Us  Edit Registration  View Item Catalog & Items on Offer  View RFQ's  Help/Contact Us  U.S.A. Sam ⌑Upload Product Category Pictures⌑

| Outdoor Living | Upload Category Picture |
| Outdoor Furniture | |
| Sporting Goods | |

[ Complete Registration ]

FIG. 36A

W⊕RLD FACTORY  WHERE BUSINESSES BUY DIRECT FROM THE WORLD'S FACTORIES

About Us  Edit Registration  View Item Catalog & Items on Offer  View RFQ's  Help/Contact Us  U.S.A. Sam ⌑Item Catalog⌑  World Wise Co – Account# 6185 – Robert Sayner

[ Add New Item ]

Item Catalog

Sorting Options: [ Item SKU ▼ ]

| Item | | Item Status |
|---|---|---|
| 1213-GROOVY TIMES SKATEBOARD | VIEW CATALOG | ACCEPTED |
| 1220-DUKES OF HAZZARD SWEATSHIRT | VIEW CATALOG | ACCEPTED |
| 123-HOLIDAY WREATH | VIEW CATALOG | ACCEPTED |
| 1231321-DRILL | VIEW CATALOG | ACCEPTED |
| 2001-PING PONG SET | VIEW CATALOG | ACCEPTED |
| 35649846-SUNDIAL BIRD FEEDER | VIEW CATALOG | ACCEPTED |
| 4564561656-TERST TES | VIEW CATALOG | IN REVIEW |
| 4568912321-DOVER FOLDING CHAIR | VIEW CATALOG | ACCEPTED |
| 50107082-MY DESK | VIEW CATALOG | ACCEPTED |
| 56498798-3-TIER SQUARE PLANT STAND | VIEW CATALOG | ACCEPTED |
| 5678-PINBALL MACHINE | VIEW CATALOG | ACCEPTED |
| 6498765154-POLYRESIN WALL CLOCK | VIEW CATALOG | ACCEPTED |
| 65431876541-ROUND TWO-TIER PLANT STAND | VIEW CATALOG | ACCEPTED |
| 654987123-TESTER | VIEW CATALOG | IN REVIEW |
| 654987451-INK PEN | VIEW CATALOG | IN REVIEW |
| 67981546-ANGEL RAIN GAUGE | VIEW CATALOG | ACCEPTED |
| 789456-AMERICAN SPRUCE CHRISTMAS TREE | VIEW CATALOG | ACCEPTED |
| 87946456-MILANO DINING ARMCHAIR | VIEW CATALOG | ACCEPTED |
| 89746-2-TIER ROSE PLANTER | VIEW CATALOG | ACCEPTED |
| 9874613165-CLASSIC CEDAR GLIDER | VIEW CATALOG | ACCEPTED |
| CAP1-BASEBALL CAP | VIEW CATALOG | ACCEPTED |
| PUTTERK-KIDDIE PUTTER | VIEW CATALOG | ACCEPTED |

Items on Offer at WorldFactory
*Order quantities shown are for informational purposes only. No commitment to purchase products is made or implied, until a purchase order has been issued by an authorized WorldFactory.com representative Sorting Options: [ Offer ID ▼ ]

FIG. 36B

```
Offer Id: 365
Expires: 10/1/00
FOB Date: 11/30/00
Status: ACTIVE
Met Offer Minimum:
```

| Item | Quantity Ordered | Minimum | Status |
|---|---|---|---|
| 1.  4568912321-DOVER FOLDING CHAIR | 374 | 460 | ACCEPTED |

```
Offer Id: 366
Expires: 10/30/00
FOB Date: 11/30/00
Status: ACTIVE
Met Offer Minimum:
```

| Item | Quantity Ordered | Minimum | Status |
|---|---|---|---|
| 1.  4568912321-DOVER FOLDING CHAIR | 80 | 200 | ACCEPTED |
| 2.  87946456-MILANO DINING ARMCHAIR | | 300 | ACCEPTED |
| 3.  9874613165-CLASSIC CEDAR GLIDER | | 150 | ACCEPTED |

☒

```
Offer Id: 367
Expires: 1/1/00
FOB Date: 1/1/00
Status: IN REVIEW
Met Offer Minimum:
```

| Item | Quantity Ordered | Minimum | Status |
|---|---|---|---|
| 1.  654987451-INK PEN | | 100 | IN REVIEW |

```
Offer Id: 370
Expires: 12/1/01
FOB Date: 1/2/02
Status: IN REVIEW
Met Offer Minimum:
```

| Item | Quantity Ordered | Minimum | Status |
|---|---|---|---|
| 1.  654987123-TESTER | | 200 | IN REVIEW |

```
Offer Id: 371
Expires: 1/2/00
FOB Date: 1/2/01
Status: IN REVIEW
Met Offer Minimum:
```

| Item | Quantity Ordered | Minimum | Status |
|---|---|---|---|
| 1.  1213-GROOVY TIMES SKATEBOARD | | 1 | ACCEPTED |

```
Offer Id: 372
Expires: 2/1/01
FOB Date: 2/2/01
Status: IN REVIEW
```

FIG. 36C

| Met Offer Minimum: | | | |
|---|---|---|---|
| Item | Quantity Ordered | Minimum | Status |
| 1. 1213-GROOVY TIMES SKATEBOARD | | 12 | ACCEPTED |

Offer Id: 373
Expires: 1/1/00
FOB Date: 1/1/00
Status: IN REVIEW

| Met Offer Minimum: | | | |
|---|---|---|---|
| Item | Quantity Ordered | Minimum | Status |
| 1. 1213-GROOVY TIMES SKATEBAORD | | 34 | ACCEPTED |

Main Menu

FIG. 36F

W🌐RLD FACTORY    WHERE BUSINESSES BUY DIRECT FROM THE WORLD'S FACTORIES

About Us   Edit Registration   View Item Catalog & Items on Offer   View RFQ's   Help/Contact Us   U.S.A. Sam Submit Offer on RFQ
World Wise Co. - Account# 6185 - Robert Sayner RFQ Item to be Offered: 65431876541-ROUND TWO-TIER PLANT STAND If you wish to submit an individual offer for this item only, simply press Next.

Next >>

Multiple Item Offer Option  Help
If items below will be available at the SAME TIME in the SAME COUNTER as the item above, you may offer them together as a multiple item offer. The Muliple Item Offer option helps buyers meet your required minimums faster and promotes sales.

Select items to add to offer from the list below and press the Next button.

- ☐ 1213-GROOVY TIMES SKATEBOARD
- ☐ 1220-DUKES OF HAZZARD SWEATSHIRT
- ☐ 123-HOLIDAY WREATH
- ☐ 1231321-DRILL
- ☐ 2001-PING PONG SET
- ☐ 35649846-SUNDIAL BIRD FEEDER
- ☐ 4564561656-TERST TES
- ☐ 50107082-MY DESK
- ☐ 56498798-3-TIER SQUARE PLANT STAND
- ☐ 5678-PINBALL MACHINE
- ☐ 6498765154-POLYRESIN WALL CLOCK
- ☐ 654987123-TESTER
- ☐ 654987451-INK PEN
- ☐ 67981546-ANGEL RAIN GAUGE
- ☐ 789456-AMERICAN SPRUCE CHRISTMAS TREE
- ☐ 89746-2-TIER ROSE PLANTER
- ☐ cap1-BASEBALL CAP
- ☐ putterk-KIDDIE PUTTER Next >>

FIG. 36D

| WORLD FACTORY | Home Page | Outdoor Living | Tools & Hardware | New Departments | Close-out |

FAQ's   View My RFQ's   Advanced Search   U.S. Sample Showroom   Help/Contact Us

Order Pad
Last item purchased:
POINSETTIA GIFT BASKET
Total Items: 3
Subtotal: $9,913.50

[View Order Pad]

Browse Departments
Accessories & Seasonal
Garden & Lighting
   Arches & Trellises
   Bird Baths & Feeders
   Clocks & Thermometers
   Fountains
   Garden Tools
   Lighting
   Other Accessories
   Planters
   Sun Dials & Rain Gauges
   Torches & Lanterns
Hearth & BBQ
   BBQ
   Hearth & Fireplace
Home Decor
Outdoor Furniture
   Aluminum
   Benches
   Cast Aluminum
   Gazebos
   Rattan
   Umbrellas & Cushions
   Wood
      Cedar
      Teak
      Wrought Iron
Premiums & Gifts
   Fountains
   Picnic Sets & Tailgaits Factory Offer – Multiple Items   What's This?

FROGS IN BOAT WALL MOUNT THERMOMETER

Offer Number:   347
Offer Expires:  10/1/00
FOB Date:       12/30/00

Quantity Ordered: 16
Production Run
Minimum:          80
Min Order:        4           SOLID BRASS, POLISHED VERDIGRIS
In Multiples of:  1                    More Information?
Price:            $63.00

Order Quantity: [  ]   ADD TO ORDERPAD

Container Builder
[                    ]

Items in this offer to help fill open container space:

| | Quantity Ordered | Quantity Needed |
|---|---|---|
| 1) WALL MOUNT THERMOMETER, SUN | 110 | 110 |
| 2) SPHERE GALILEO SUNDIAL | 90 | 90 |
| 3) "KEEP OFF THE GRASS" SIGN, 14" HIGH | 100 | 100 |

FIG. 36E

```
W🌐RLD FACTORY    WHERE BUSINESSES BUY DIRECT FROM THE WORLD'S FACTORIES
About Us  Edit Registration  View Item Catalog & Items on Offer  View RFQ's  Help/Contact Us  U.S.A. Som
```

◯ Submit Offer on RFQ ▢
World Wise Co. – Account# 6185 – Robert Sayner

Item Offer Information:

| Enter Multiple Item Offer Minimum: Example |
|---|
| ◯ 20 foot container |
| ◯ 40 foot container |
| ◯ US Dollar Minimum [____] or more total value |

| Item | *Minimum Order Quantity | *Price ($/Unit of Measure) | *Maximum Order Quantity | Earliest Possible Production Date | | | Help |
|---|---|---|---|---|---|---|---|
| ROUND TWO-TIER PLANT STAND | | | | -Month-▼ | -Day-▼ | -Year-▼ | |
| 3-TIER SQUARE PLANT STAND | | | | -Month-▼ | -Day-▼ | -Year-▼ | |

Comments: [_____]

Shipping Information:

*Earliest Possible FOB Delivery Date: -Month-▼ -Day-▼ -Year-▼

*FOB Port: [_____]

*Offer Expiration Date: -Month-▼ -Day-▼ -Year-▼

Available Terms of Sale: ☐ Letter of Credit
                        ☐ Bank Transfer
                        ☐ Cash on Delivery
                        ☐ Consignment to World Factory Is there regularly scheduled production of this item? ☐ Yes

[Finish]

Main Menu

METHOD OF PRODUCING, SELLING, AND DISTRIBUTING ARTICLES OF MANUFACTURE THROUGH THE AUTOMATED AGGREGATION OF ORDERS AND THE VISUAL REPRESENTATION OF STANDARDIZED SHIPPING VOLUMES

CLAIM OF PRIORITY

This application is a continuation-in-part of the following applications, and claims the benefit of the provisional applications as shown:

(1) U.S. patent application Ser. No. 09/968,962, filed 2 Oct. 2001, now abandoned, entitled "Container Builder," with Gustav P. Kuelbs as the sole inventor;
  (a) which claims the benefit of U.S. Provisional Patent Application Ser. No. 60/237,157, filed 2 Oct. 2000; and
  (b) which is a continuation-in-part of U.S. patent application Ser. No. 09/619,947, filed 20 Jul. 2000, now U.S. Pat. No. 6,954,734 which claims the benefit of U.S. Provisional Patent Application Ser. No. 60/144,682, Filed 20 Jul. 1999, and U.S. Patent Application Ser. No. 60/149,011, Filed 13 Aug. 1999.

BACKGROUND OF THE INVENTION

1. Field of the Invention

The present invention relates in general to techniques for producing, selling, and distributing articles of manufacture which is especially well suited for nonperishable articles but which could find applicability to perishable manufactured articles as well. The present invention depends upon an automated aggregation of orders and the visual representation of standardized shipping volumes such as containers and pallets.

2. Description of the Prior Art

At present, the manufacturers of non-perishable goods have obtained enormous economic and commercial advantage by having the non-perishable goods manufactured in remote locations, where economic, legal, regulatory, and labor conditions are favorable to manufacturers, resulting in relatively lower costs than can be obtained in other production markets. One primary example of this phenomenon is the increasing importance of The Peoples Republic of China and other less-developed Asian countries for the production of non-perishable consumer goods which are shipped to, and consumed by, first-world economies such as the United States, Canada, and Western Europe. The strong preference for this remote, third-world manufacturing is a primary factor for trade imbalances which exist between the United States and China. The consumer in the first world eventually benefits from this manufacturing scenario, but the immediate and primary benefit goes to the producers, distributors, and retailers of the nonperishable goods. As the product choices available to the consumer expand, consumers will typically begin viewing particular non-perishable goods as commodities. For example, television sets, stereo equipment, and computers are in large part viewed by most consumers as commodity items, and consumers are accordingly quite price sensitive. This is typically only true after the novelty of a particular item no longer commands a premium, and as competitive items are offered which include the desirable product features and functions.

Under this conventional manufacturing, sales, and distribution scenario, the consumer may or may not benefit from the relative advantages of the low cost of manufacturing the nonperishable goods; to the extent that the consumer does benefit, it is usually late in the product life, with the greatest consumer advantage typically being obtained as newer models or versions of the non-perishable goods are "rolled out" in order to replace older versions. In other words, the greatest economic advantage can be derived by the consumer by buying the non-perishable articles as they are being obsoleted by other products and newer versions of the same product. Many consumers are aware of this fact, and tend to purchase expensive items such as automobiles, computers, and the like, at the end of a product's life cycle in order to obtain the best commercial terms.

Additionally, under conventional sales and distribution techniques, relatively hefty margins are required for the non-perishable articles in order to take into account the time value of the capital which is "tied up" in products in the supply chain. Additionally, conventional distribution systems require a significant number of product units in order to fill a supply chain at all levels including the distribution level and the retail level. Of course, there is great danger for the manufacturer insofar as it may over-estimate demand and thus over-produce products which results in an "over-shoot" condition which generally results in steep discounting toward the end of the product life in order to deal with the "remainder" of the products which have not been sold. For example, this is a non-trivial aspect of book publishing, wherein remainder after markets are robust and are noteworthy for the steep (and sometimes below cost) discounting which must occur in order to deplete remaining inventory. Conversely, should the manufacturer underestimate the product acceptance and/or product demand, it generates an "under-shoot" condition, wherein there is not enough product to fill the supply chain and demand goes either unmet or is deferred until additional production runs can refill the supply chain. This is an undesirable condition insofar as fickle consumers may lose interest in a product before additional production runs are completed and product delivered to the retail outlets, or competitors may move in to fill the demand which can not be met for the product. Additionally, it is undesirable insofar as a series of successive production runs is inherently less efficient than a smaller number of large production runs, which results in an increase in the cost of goods sold and typically manifests itself as an increase in price or a reduction in profits. As a result of these factors and considerations, most manufacturers, wholesalers, and retailers follow a simple pricing plan in which new products are introduced at an initial price which is, in some cases, the highest price that will ever be charged for the product, and proceed to repeatedly discount the price in order to deplete supply. Of course, this approach severely punishes those consumers who are "early adopters" or early purchasers of products, and can result in pricing strategies which are so aggressive that consumer interest and demand is essentially squelched before it can begin.

Additionally, in conventional commerce, goods that are manufactured off-shore are placed in intermodal containers and are transported (by combinations of air, boat, rail, and surface transport such as trucks) to warehouses where the containers are broken down and products are routed to wholesale distribution centers which further break down the products and deliver them to retail outlets. Again, in the allocation and distribution of products there can occur serious "over-shoot" and "under-shoot" conditions. An over-shoot condition is represented by the relative over supplying of products to any particular geographic region or commercial channel of trade. Conversely, an under-shoot condition is the disproportionate allocation of products which results in insufficient products in any particular geographic region or channel of trade. These distributions over-shoot and under-shoot scenarios are expensive to remedy since they require the repackaging and reshipping of product to different geographic locations or different channels of trade. Frequently, there are ancillary paperwork and accounting actions which must be performed in parallel with the decision making and transfer process. Of course, sales may be lost and consumers may be frustrated during such reallocation or reshuffling operations, or better organized and/or agile competitors may move in to fill the demand.

SUMMARY OF THE PRESENT INVENTION

It is one objective of the present invention to allow the consumers of articles of manufacture to directly, immediately, and personally enjoy the commercial advantages derived from the manufacture of such articles in remote locations which have favorable manufacturing conditions.

It is another objective of the present invention to provide a method of manufacturing, selling, and distributing products which financially rewards early adopters or early buyers of products with the lowest price, and which provides a disincentive to the later adopters or purchasers with a price which increases generally as the risk and/or cost increases to the manufacturer. In other words, those customers that commit prior to production or early in the production cycle will receive the best price because the manufacturer has accepted less risk and incurred less cost. The early adopters or purchasers are, in effect, sharing risk with the manufacturer. In contrast, the later adopters or purchasers are charged a higher price because the manufacturer has experienced an increasing amount of risk and committed capital as the products are designed, manufactured, packaged, transported, delivered to warehouses, and further distributed through wholesale or retail channels of commerce. The present invention is well suited for the sale of goods to the end users (a business-to-consumer application) and to resellers (a business-to-business application). In the case of business-to-consumer-sales, the approach of the present invention is diametrically opposed to current conventional methods of production, sales, and distribution of products. In a business-to-business application, the present invention enables small and mid-size buyers (defined as buyers of quantities of goods that are less than a production minimum) to directly drive make/not make production decisions at the manufacturing point. The enhancement organizes and enables small buyers to collectively exercise demand response at the pre-production and production stages, far earlier and with less intermediation than possible previously, resulting in economic advantage to the buyers.

Viewed in economic terms the present invention can be characterized in basic economic concepts. Conventionally, fixed costs are usually amortized over a number of items produced (or sold), which results in a price reduction as volumes increase and fixed costs are increasingly recovered. In perfectly competitive markets, the movement of commodity price theoretically and in practice generally moves down the average unit cost curve to price equilibrium (i.e., the lowest price for the consumer that is sustainable by the manufacturer) at the marginal unit cost. The present invention recognizes and rewards the qualitative difference (in terms of risk deferral) at an individual buyer level of "early adopters (or demanders)" in their enabling a manufacturer (or "inventory risk taker") to enter the market in the first place.

In the preferred, but not exclusive, implementation of the present invention, the product price increases at the key points in the life-cycle of the product. For example, certain natural milestones in a product development can correspond to an upward step increase in price, and some exemplary milestones include: product design, pre-production, production, container-loading, in-transit, in-warehouse, in-distribution, and in-stock.

It is another objective of the present invention to provide a method whereby "markets" for a given commodity or article can be made at key (risk) points in the life-cycle of a commodity (i.e., from drawing board, to pre-production, to producing, to "in-transit" status, to available for sale). The formation of the "market" at each point requires an electronically-enabled means of aggregating qualified buyers, identification and qualification of a manufactured product or manufacturers willing to guarantee manufacture, and the electronic, simultaneous mass presentation of certain information (e.g., product specifications, delivery date, terms and quantities) which varies from stage to stage, to all buyer participants.

It is another objective of this invention to reduce the risk of loss to the manufacturer through rewards to early adopters or early purchasers, to minimize production over-shoots and production under-shoots, and to minimize distribution over-shoots or distribution under-shoots. Furthermore, it allows a producer or manufacturer to utilize the capital (from pre-payments) of its customers in order to finance the design, mass production, packaging, shipping, routing, and delivery of the goods.

It is another objective of the present invention to provide a method of packaging and delivering goods which reduces significantly shipping and handling costs by allowing the manufacturer to take responsibility for certain packaging, labeling, sorting, and container packaging decisions, which collectively allow the manufacturer to perform many steps or tasks which were previously performed by delivery companies in the geographic location of the consumers of the nonperishable goods. As a consequence, producers will be able to negotiate the lowest possible shipping and handling charges with commercial shippers and delivery services such as FedEx, UPS, USPS, and the like.

In alternative embodiments, the present invention may be utilized for the selling and distribution of commodities and perishable processed goods or perishable articles of manufacture.

DESCRIPTION OF THE DRAWINGS

FIGS. 17A, 17B and 17C are exemplary Internet graphical user interfaces in accordance with another embodiment of the present invention, presenting an array of different products.

FIG. 18A through 18F are graphical representations of the numerous advantages which are obtained through implementation of the present invention.

FIG. 27 is an exemplar Internet page of a catalog in accordance with one embodiment of the present invention.

FIG. 28 is an exemplary product data sheet in accordance with one embodiment of the present invention.

FIG. 29 is an exemplary Internet page which specifies one exemplary product in accordance with one embodiment of the present invention.

FIG. 30 is a depiction of a Web page which is utilized to receive offer information from a particular factory.

FIGS. 31A through 31D depict various examples of the container/pallet builder feature of the present invention.

FIGS. 32A through 32C depict a request for quotation feature in accordance with one embodiment of the present invention.

FIGS. 33A and 33B depict a showroom feature in accordance with one embodiment of the present invention.

FIGS. 34A through 34E depict the aggregation and presentation of information in accordance with the preferred embodiment of the present invention.

FIGS. 35A through 35D is an exemplary questionnaire for potential manufacturers.

FIGS. 36A through 36F are exemplary listings of offered products for a particular exemplary manufacturer.

DETAILED DESCRIPTION OF THE INVENTION

Figure 1:
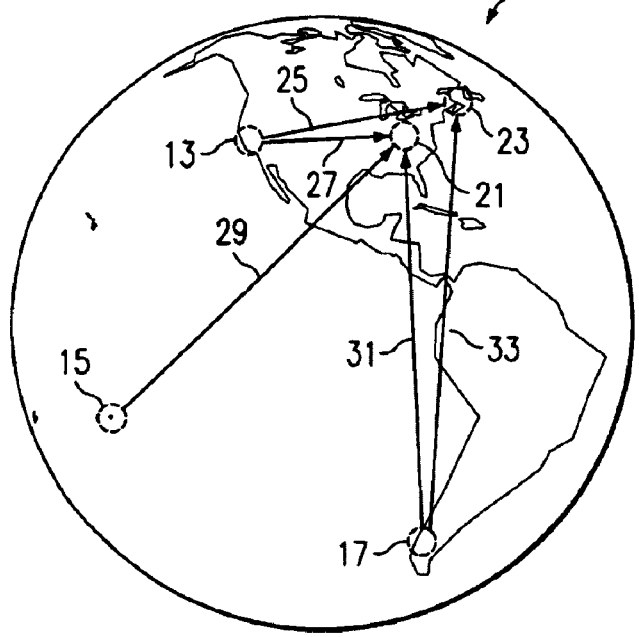
FIG. 1 is a simplified pictorial representation of relatively separated geographic regions for the production of commodities, nonperishable goods, or articles of manufacture and for the consumption of such goods.

FIG. 1 is a simplified and symbolic representation of the manufacture, transportation, and delivery of nonperishable goods, processed commodities, or articles of manufacture between production sites and consumption sites. More specifically, earth 11 includes a number of production locations 13, 15, 17 which have local economic, legal, regulatory, and other conditions which are favorable for the mass production of nonperishable consumer goods. More particularly, nonperishable goods may be manufactured on a large scale at a relatively low cost per item. A plurality of relatively remote consumption locations 21, 23 are also provided which are relatively good markets for the sale of such nonperishable consumer goods. For example, consumption locations 21, 23 may comprise North America and Western Europe. A plurality of relatively well established export/import transport pathways 25, 27, 29, 31 and 33 are provided between the production locations 13, 15, 17, and the consumption locations 21, 23. The export/import transport path typically comprises an intermodal transport path in which goods are packed into a standard shipping container and transported by sea, air, rail, or ground transport, or combinations of those transport methodologies. It is one objective of the preset invention to allow consumers located in consumption locations 21, 23 to personally, directly, and immediately realize the commercial advantages which have heretofore been realized principally by the producer of goods, provided that the consumers of consumption locations 21, 23 make concrete and early financial commitments to the producer or manufacturer which are financially advantageous for the producer or manufacturer.

Figure 2:
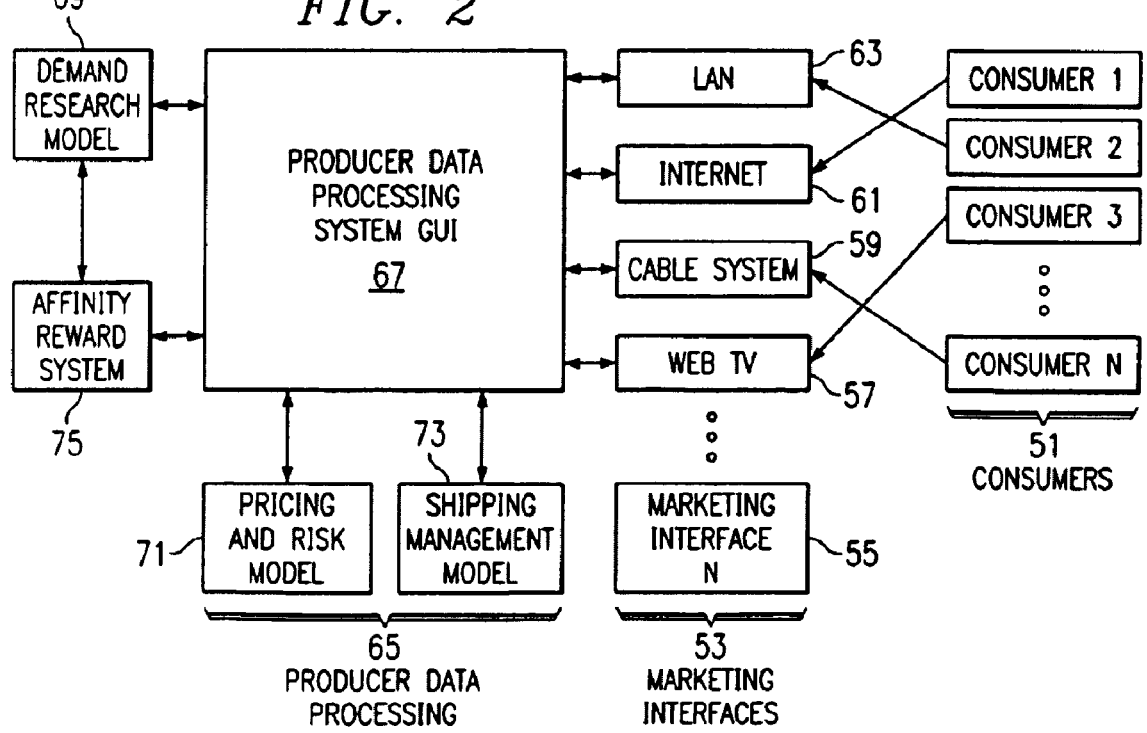
FIG. 2 is a simplified block diagram representation of an exemplary producer data processing system and an exemplary marketing interface which may be accessed by consumers in order to evaluate and/or consummate transactions.

FIG. 2 is a block diagram representation of the producer data processing system 65, alternative and potential marketing interfaces 53, and consumers 51. As is shown, the producer data processing system 65 includes a producer data processing system graphical user interface 67. Additionally, the producer data processing system 65 includes a demand research model 69 which is utilized in order to determine potential consumer demand for particular proposed nonperishable consumer goods, prior to pre-production activities. Preferably, but not necessarily, an affinity reward system 75 is coupled to the demand research model 69. The demand research model is an attractive but nonessential portion of the present invention since goods can be offered for sale with little or no research, especially if the goods are conventional in nature. The same is true for the affinity reward system. When present, both the demand research model 69 and the affinity reward system 75 are embodied in executable data processing instructions, and are preferably modular in construction.

The producer data processing system graphical user interface 67 preferably comprises a series of cascading graphical user interface screens, coded in HTML or XML as is conventional, which present customers 51 with a series of instructions, options, and requests for information. It is through the aggregated and collective interaction by consumers 51 with the graphical user interface screens that producer determines what particular proposed products are likely to be well received by consumers 51. Additionally, it is through use of the cascading graphical user interface screens that consumers 51 interact with the modular price and risk model 71 which is preferably embodied in a series of executable data processing instructions, and which provide a mathematical and predetermined frame work for fixing the price of one or many nonperishable consumer goods, in accordance with the particular timing of the customer purchase of a particular product. In general, earlier customer commitments will result in lower product prices, while later customer commitments will result in higher product prices. In this manner, customers that are "early adopters" or early buyers and make financial commitments to purchase products early in the production cycle will receive the best possible price, and thus will realize the considerable economic advantages of the remote manufacture of the goods. Conversely, those customers which make financial commitments to purchase particular products late in the production cycle will receive a relatively higher price which reflects the amount of risk and the costs which has been absorbed or incurred by the producer up to that point in time. A model typically is constructed based upon the timing and relative increases in risk over time as a product is proposed, placed in pre-production, mass produced, packaged, shipped, and delivered. If a customer makes a financial commitment early in the supply chain cycle of a particular product, he or she will receive the best possible price.

Viewed in economic terms the present invention can be characterized in basic economic concepts. Conventionally, fixed costs are usually amortized over a number of items produced (or sold), which results in a price reduction as volumes increase and fixed costs are increasingly recovered. In perfectly competitive markets, the movement of commodity price theoretically and in practice generally moves down the average unit cost curve to price equilibrium (i.e., the lowest price for the consumer that is sustainable by the manufacturer) at the marginal unit cost. The present invention recognizes and rewards the qualitative difference (in terms of risk deferral) at an individual buyer level of "early adopters (or demanders)" in their enabling a manufacturer (or "inventory risk taker") to enter the market in the first place, without the participation of intermediary resellers in the supply chain.

In the preferred implementation of the present invention, the price increases at the key points in the life-cycle of a product. For example, certain natural milestones in a product development can correspond to an upward step increase in price, and some exemplary milestones include: product design, pre-production, production, container-loading, in-transit, in-warehouse, in-distribution, and in-store.

It is another objective of the present invention to provide a method whereby "markets" for a given commodity or article can be made at key (risk) points in the life-cycle of a commodity (i.e., from drawing board, to pre-production, to producing, to "in-transit" status, to available for sale). The formation of the "market" at each point requires an electronically-enabled means of aggregating qualified buyers, identification and qualification of a manufactured product or manufacturer willing to guarantee manufacture, and the electronic, simultaneous mass presentation of certain information (e.g., product specifications, delivery date, terms and quantities) which varies from stage to stage, to all buyer participants.

As is depicted in FIG. 2, and in accordance with the preferred embodiment of the present invention, the interaction between the producer data processing system 65 and consumers 51 is conducted in a semi automated fashion. This is important because it reduces the overall transaction costs associated with the interaction between a plurality of consumers 51 and the producer's data processing system 65 which may present one or many particular products. In the event that a producer is offering thousands or tens of thousands of products, the transaction costs associated with the soliciting, receiving, and recording of financial commitments can be considerable. It is through the utilization of computer-executable instructions that such a complex interaction of aggregated point-to-point communication between consumers and producers is made commercially feasible. A plurality of alternative marketing interfaces are depicted in block diagram form in FIG. 2. These include a local area network 63 which may require dial-up by consumers 51 in order to gain access to producer data processing system 65. The utilization of local area network 63 may also require the consumers 51 to utilize pass words which are assigned to them. An alternative marketing interface 53 is utilization of the Internet 61 in order to communicate in an electronically moderated fashion with the producer of data processing system 65. An alternative system would comprise a cable system 59 with a set-top box. As telecommunication functions are being shifted from land lines over to coaxial cable systems, it is likely that significant commercial interaction between consumers and sellers of goods will occur utilizing interactive television with a cable connection. One particular embodiment of an intelligent television system is the utilization of Web TV 57 as an interface between consumers 51 and producer data processing system 65. "Web TV" is a set-top box which allows for simultaneous access to television program and the Internet in order to allow each media to supplement the other.

Figure 3A:
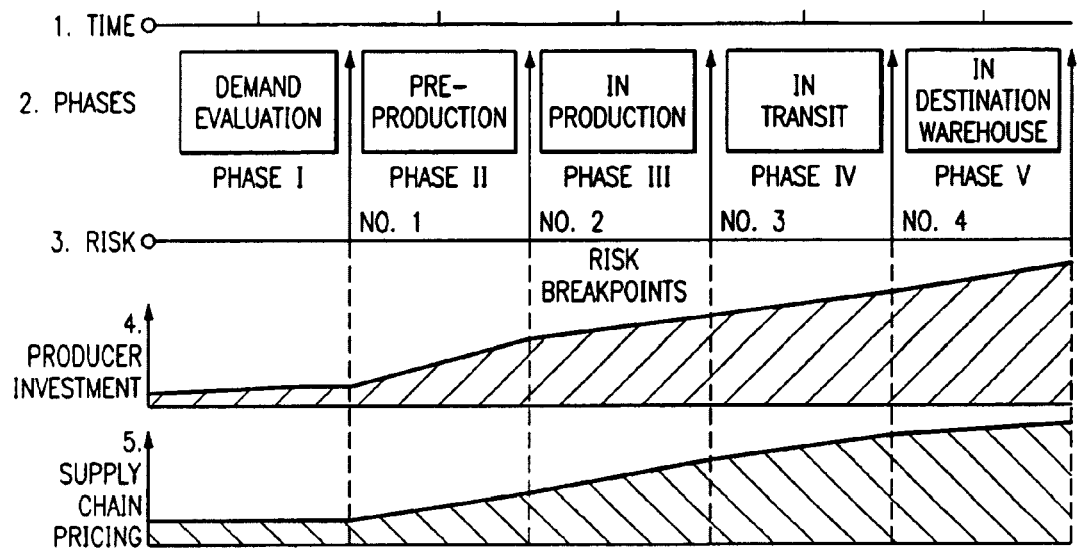
FIG. 3A is a simplified graphical representation of various phases of production, risk breakpoints, producer investment (or risk) and the advantageous supply chain pricing which may be accomplished utilizing the present invention, all with respect to a common time axis.
Figure 3B:
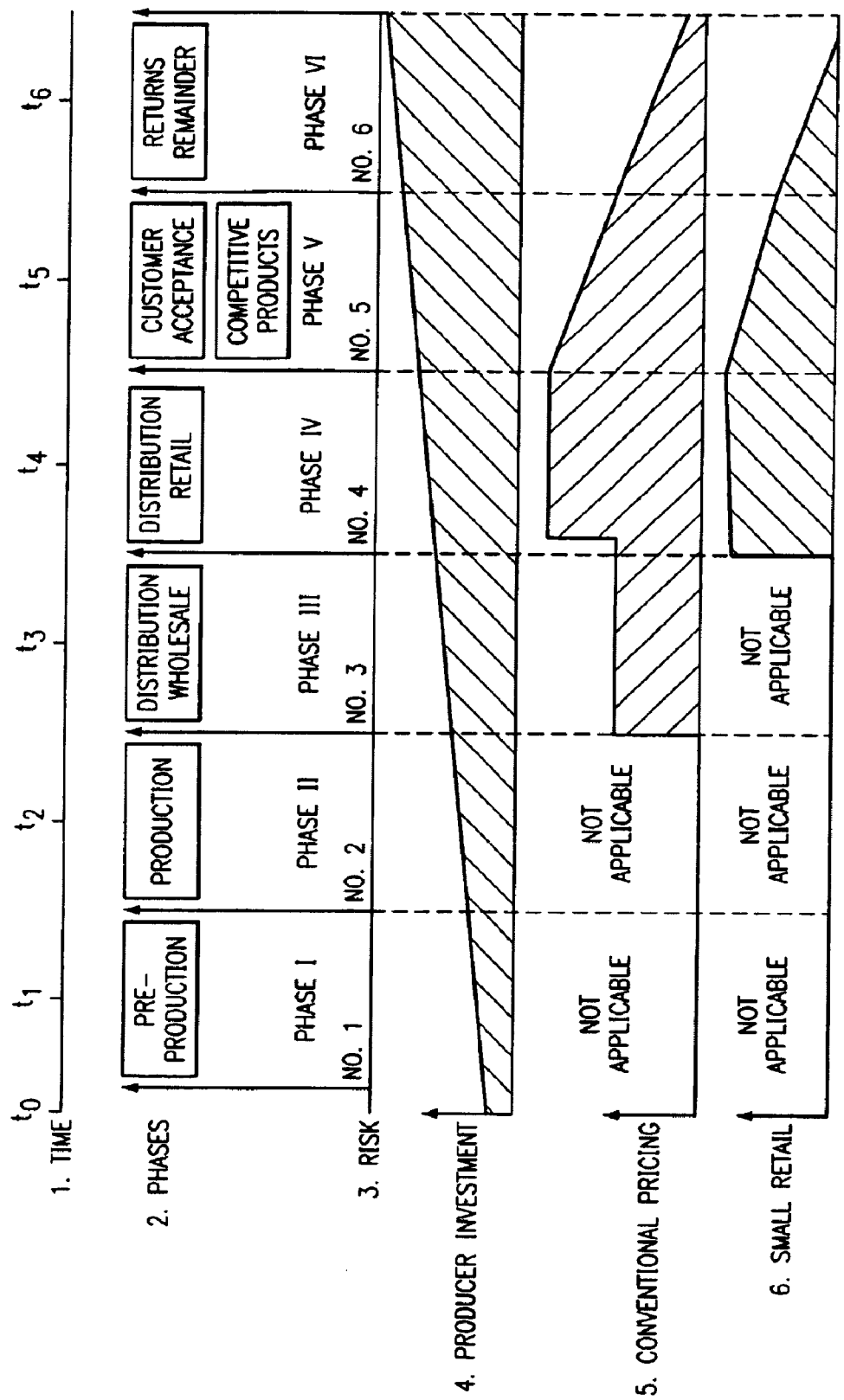
FIG. 3B is a graphical representation of the conventional prior art approach, and provides a graphical contrast with the approach of FIG. 3A.

FIGS. 3A and 3B are contrasting graphical representations of the preferred implementation of the present invention and the conventional implementation of the prior art. FIG. 3A is representative of the present invention, while FIG. 3B is representative of the prior art. A plurality of graphs are depicted which represent time, production phases, risk, producer investment, and pricing. With reference first to FIG. 3A, at time t1 the producer is utilizing the demand research model 69 of FIG. 2 in order to determine potential demand for a proposed product. In many instances, the proposed product has been produced before and the "offer" relates to a proposed production run. In other instances, the offering may constitute the creation of a actual or "virtual" prototype of the product, product specification, and preliminary price data. At this point in time, the producers risk is low or de minimus, and its investment is relatively modest, consisting of the pictorial, graphical, and other information necessary to present proposed products, without having actually produced the products. In accordance with the preferred embodiment of the preset invention, potential customers are encouraged to express their level of interest in the proposed product and rewarded through the related affinity reward system 75 of FIG. 2.

As the producer moves from demand evaluation to pre-production activity, in time interval t2, the producer begins making concrete financial commitments to the product which are illustrated as an increase in the producer investment in the view of FIG. 3A. Such producer investment includes the cost of engineering, testing, manufacturing molds or other equipment utilized for mass production, and similar capital investment. During the end-production phase of time interval t3 additional considerable producer investments are made in the product. These include the costs of acquiring parts, raw materials, and the like, as well as the costs of engaging one or more factories to tool-up for mass production operations, and any corresponding financial commitments which are required by the manufacturer. During the fourth phase, a product which has been produced and placed in containers for transport from a producing location to a consuming location. Transport typically includes intermodal transport by land, sea, air, or rail. The producers investment further increases during this phase of time interval t4. The cost items include the cost of transportation and insurance. In the time interval of t5, product is placed in a destination warehouse for further distribution to retail outlets. Again, another risk threshold is crossed and the producer makes additional investments in the product, principally in the form of the time value of capital tied up in inventory in the warehouses and distribution channels.

For each one of phase I through V, the producer has an increasing capital investment in the product. It is one objective of the present invention to have a price model which generates a price for each unit of product which increases in general correspondence with the increased investment, and corresponding risk that the producer has in the particular product. This is depicted in the fifth graph of FIG. 3A.

As is shown, during Phase I, the customer is allowed to purchase the product at the lowest possible price. This corresponds to the producer's investment in the product which is essentially de minimus at this point. During Phase II, once pre-production activities have commenced, the producer has an increasing investment in the product, so the price which is generated by the price model for the customer increases in general correspondence thereto. As one can see from the graphs of FIG. 3A, a customer that makes a commitment during Phase I obtains a better price than a customer that makes a commitment during Phase II. During Phase III, the producer's investment in the product (and corresponding risk) further increases, and so does the price which is generated by the price model and which is made available to the customer. As the goods are loaded into containers for intermodal transport, during Phase IV, the customer may obtain the product at a still higher price, which also generally corresponds to an increase in the producer's investment in the product. During Phase V, when the product has been received at a destination warehouse, the producer's investment (and corresponding risks) is still higher, so the price model of the present invention generates a price which generally corresponds to this increased investment. FIG. 3A provides a simplified, but graphically, representation of a significant advantage accomplished utilizing the present invention, which is to have a better correspondence between the price charged to the end customer and the actual investment, cost, or risk incurred by the producer. This can be better understood by contrasting the graphs of FIG. 3A with the graphs of FIG. 3B, which depict in more conventional pricing strategy.

As is shown in FIG. 3B, six graphs are shown which represent time, phases of production, risk to the producer, the producer investment, and conventional pricing. As is shown in FIG. 3B, it is not conventional to price products to the consumer for the pre-production activities of Phase I or the production activities of Phase II, so there is no pricing data generally available at this point. However, the producer is experiencing real risks and costs as it moves into pre-production, and from pre-production to production. The producer investment is depicted in simplified form as a generally increasing amount. It is only during Phase III (distribution and wholesale) that price is typically announced or made available. At this phase small retailers are not often actively involved principally because wholesale distribution typically requires the purchase of large volumes, and small retailers simply lack the financial strength to make such purchases, and, in fact, small retailers simply could not sell volumes sufficient to justify such large purchases. The net effect is that small retailers are effectively locked out of the wholesale level. This is represented graphically in the six graphs of FIG. 3B.

As is conventional, the wholesale price is a fractional component of the suggested, recommended, or mandated retail price. In many industries retail prices are 100 to 200% of wholesale prices. As is shown, in Phase III, when wholesale distribution begins, a price is associated with the product, but the price is not generally made available to, or known by, the end user. As the product moves from wholesale distribution of Phase III to retail distribution of Phase IV, the price typically increases in a step-function fashion in order to allow the retailer a fair profit margin. During Phase V, the producer is now able to determine customer acceptance of the product. Additionally, competitive products may be available substantially simultaneously. FIG. 3B depicts a situation in which customer acceptance for the new product is not robust, and in which competitive products are available. Typically, this results in a declining price over the duration of Phase V, and into Phase VI which is representative of the returns and remainder after-market. During the remainder after-market activity of Phase VI, the price may be cut substantially, and in fact may be cut below the actual costs of goods sold.

Heretofore, the preset invention has been described with respect to a single product. In fact, the preferred embodiment contemplates simultaneously applying the present invention to a wide array of products. In fact, the present invention is especially well suited for selling a wide array of unrelated nonperishable consumer goods or articles of manufacture. Additionally, the present invention has applicability to the sale of produced or processed perishable goods. For example, processed foods or drinks may be sold utilizing the present invention, especially if the customer is a small business. For example, butter or soft drinks can be presold before production begins to small grocery stores and grocery store chains.

Figure 4:
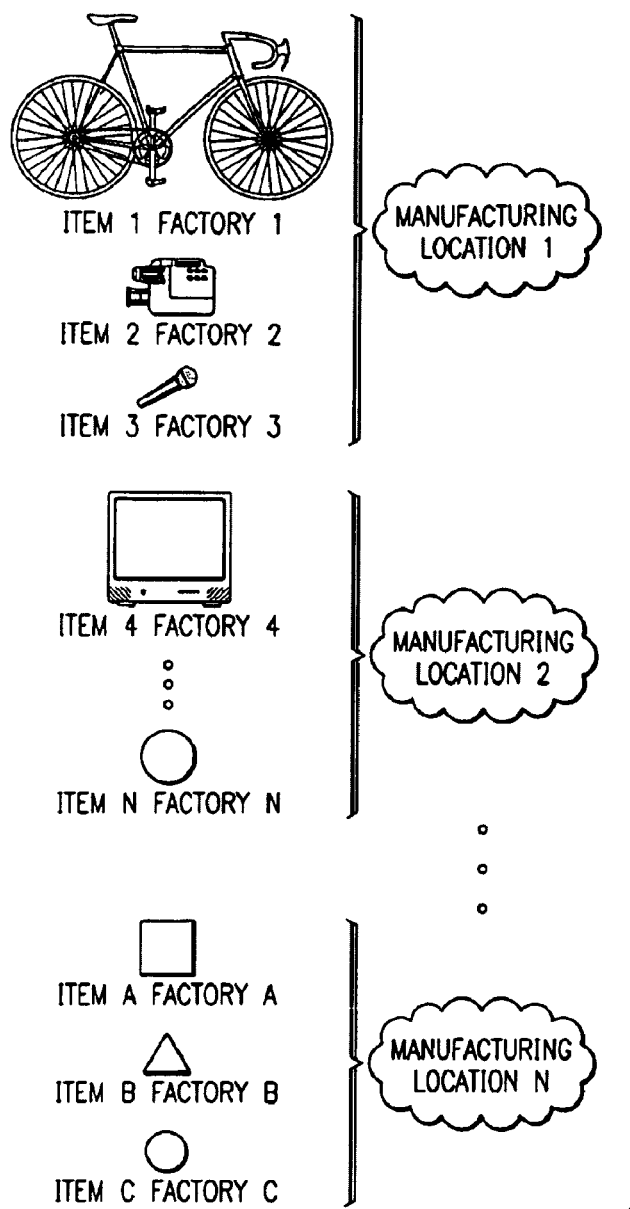
FIG. 4 is a highly symbolic representation of the manufacture of a variety of nonperishable goods or articles of manufacture at a variety of remote manufacturing locations.

FIG. 4 depicts the sale of an array of goods. As is shown, a number of separate manufacturing locations exist, including manufacturing location 1, manufacturing location 2, and manufacturing location N. Each manufacturing location represents a general geographic location in which a plurality of plants or factories are utilized U25 to produce a plurality of disparate, unrelated nonperishable consumer products. For example, at manufacturing location 1, item 1 from factory 1 is a bicycle, while item 2 from factory 2 is a LCD display, and item 3 from factory 3 is a tennis racket. Factories 1, 2, and 3 are generally located proximate to one another, the packaging and shipping operations be consolidated and coordinated in a manner as will be described below. Manufacturing location 2 is located remotely from manufacturing location 1. It includes factory 4 which produces item 4 which is a television and item N from factory N. These factories are physically proximately located justifying a consolidation and coordination of packing and shipping operations. The same is true for factory location N which manufactures item A at factory A, item B at factory B, and item C at factory C. This factory N location is geographically remote from the other factories, but the proximity of factories A, B, and C justify consolidation and coordination of packing and shipping operations.

Figure 5:
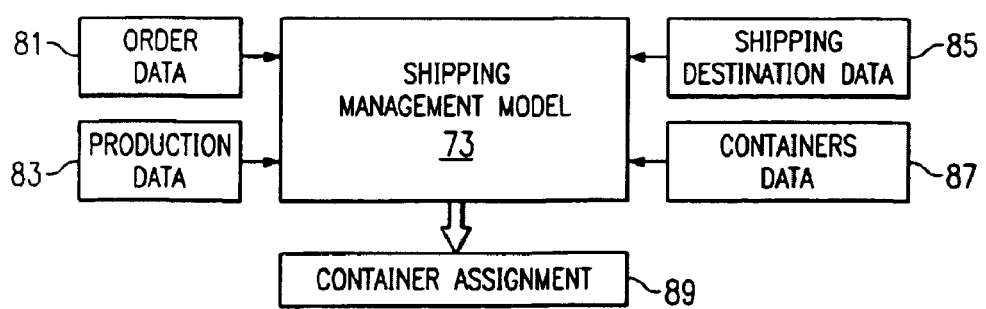
FIG. 5 is a block diagram representation of a shipping management model which is utilized in order to determine container assignment for particular goods.

In accordance with the preferred embodiment of the present invention, the shipping management model 73 of FIG. 2 is utilized to intelligently and dynamically coordinate the packing and shipping of unrelated nonperishable consumer goods. This is depicted in block diagram form in FIG. 5. As is shown, shipping management model 73 receives as an input order data 81 which may comprise product identity number and product option information, production data 83 which may comprise expected completion dates for particular productions runs, the size of the production run, and the like, shipping destination data which may comprise very specific address and other information for the particular consumer placing a particular order, or it alternatively may comprise detailed information about a shipping destination which is a third party facilitator (such as "Mail Boxes Etc." or other similar commercial shipping centers), and container data 87 which may comprise the number, size and current load condition of a plurality of containers which are available presently or which may be available at future dates for the coordinated shipping effort.

The order data 81, production data 83, shipping destination data 85, and container data 87 is passed into shipping management model 73 in order to generate container assignment data 89 which is utilized to fill intermodal shipping containers with the unrelated and disparate nonperishable consumer goods from a number of (perhaps unrelated) factories all located in a particular manufacturing location. The shipping management model 73 is especially useful in efficiently and fully filling each container. This is critical, since the disparate and unrelated nonperishable consumer goods are of different sizes. For example, item 1 of factory 1 is a bicycle which requires a rather large box, while item 2 from factory 2 is an LCD display which is relatively small in comparison. Additionally, item 3 from factory 3 is a tennis racket which requires still different packaging. Each of the products also have particular shipping requirements, due to their fragile or durable nature. Shipping management model 73 takes all this information into account in order data 81 and matches it against the current status of a particular container which is manifest in container data 87. For example, a plurality of containers may be available for the next shipment, with each container having varying degrees of available space. The particular volume of the packaging associated with items 1, 2, and 3 should be taken into account in order to optimally fill the containers in a timely manner without presenting any unnecessary risk of harm to any of the items carried in the particular container.

It is a further requirement of the preset invention that the available containers be dedicated to particular geographic shipping destination regions. In other words, the shipping containers should be utilized to pre-group a plurality of packages which are generally destined for a generally similar geographic location. The advantages of this approach will be clear in the description which follows below. Production data 83 is utilized to ensure that the various product schedules and availability dates for the various items which are available for loading in manufacturing location 1 do not unnecessarily delay product delivery. For example, one would not want to unnecessarily delay the delivery of LCD displays of item 2 from factory 2 because of production delays for the tennis racket of item 3 from factory 3. Accordingly, a greater number of bicycles of item 1, factory 1 may be loaded preferentially in order to prepare one or more containers for timely departure from the docks.

Figure 6:
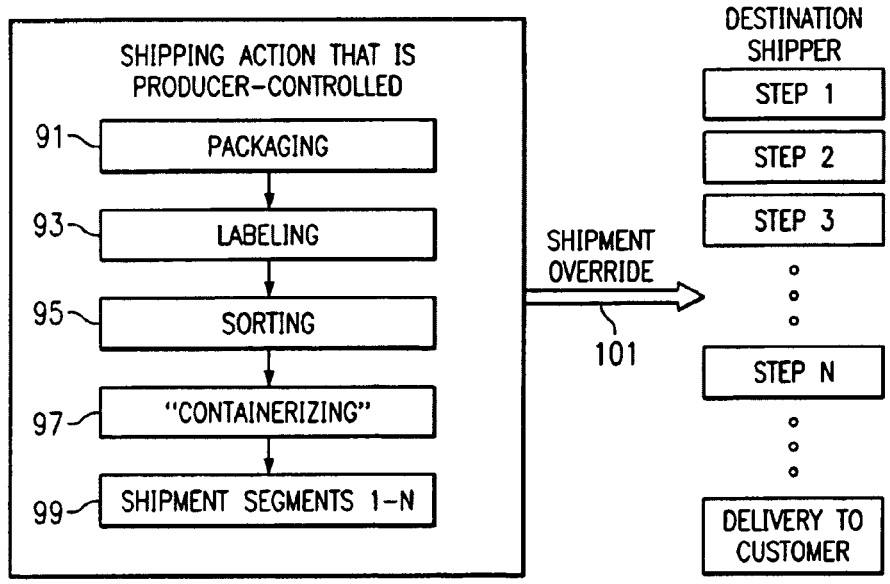
FIG. 6 is a block diagram representation of the interrelationship between shipping actions which are performed by and/or controlled by a producer and the activities performed by and/or controlled by a destination shipper in the region in which the commodities, nonperishable goods, or articles of manufacture are to be delivered.

In the preferred embodiment of the present invention, the producer and third parties under the control and direction of the producer take responsibility for particular shipping actions or activities which have heretofore been left to commercial shippers. This presents a form of "prepackaging, presorting, and prelocating" which has not heretofore been done in the prior art. This is depicted in block diagram form in FIG. 6. As is shown, a plurality of shipping actions are under the control of the producer include packaging step 91, labeling step 93, sorting step 95, "containerizing" step 97 and the determination of shipping segments 1 through N (which will be described in detail below). Collectively, these producer-controlled shipping actions represent a form of shipment override 101 which is superimposed upon the ordinary packing, labeling, containerizing, and shipping actions of third-party commercial shippers in the geographic region of the destination of the nonperishable consumer goods. As is shown, the actions of a destination shipper are depicted in simplified form as steps 1, 2, 3, N, and delivery to customer. The aggressive and proactive shipping actions taken by the producer eliminate, reduce, simplify, or entirely preempt actions which are conventionally taken by the destination shipper. This should present a commercial advantage when utilized properly which will manifest itself in the form of shipping discounts. Commercial shippers such as FedEX, UPS, USPS, and the like will likely enter into contracts which provide preferential shipping rates for items which are prepackaged, labeled, sorted, containerized, and organized by region.

Figure 7:
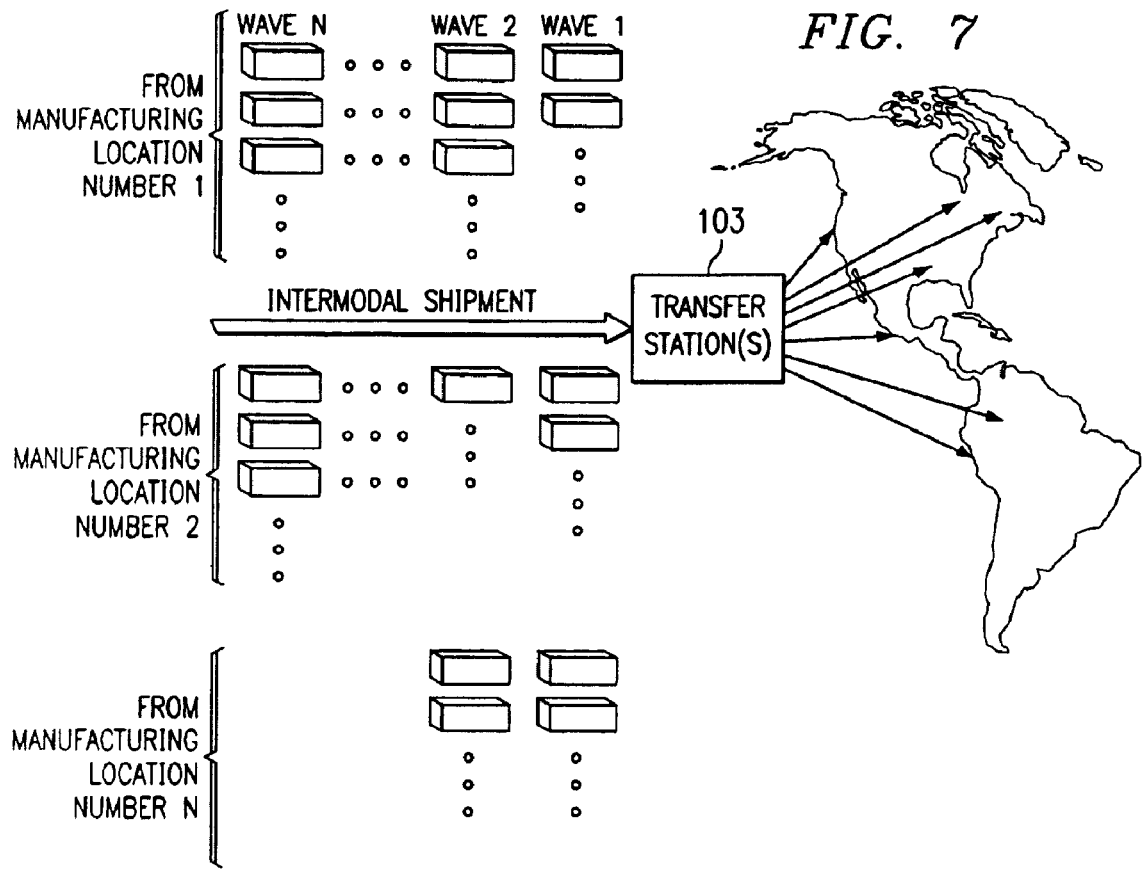
FIG. 7 is a graphic and pictorial representation of the utilization of producer-controlled "containerization" of commodities, nonperishable goods, or articles of manufacture and the utilization of transfer stations to increase distribution and shipping efficiencies and thus to reduce costs.

The savings which can be achieved can be better understood with reference to FIG. 7 which is a simplified block diagram and graphical representation of the improved shipping and delivery method of the present invention. As is shown, shipping containers are organized in "waves" which depart from foreign manufacturing site and are destined for one or more locals which contain numerous consumers or purchasers of the nonperishable goods. FIG. 7 depicts wave 1, wave 2, and wave N. Each wave is carried on a separate boat, aircraft, rail system, or truck system. Wave 1 will arrive prior to wave 2. Likewise, wave 2 will arrive prior to wave N. Each container contains a plurality of disparate and otherwise unrelated items. In the previous figures groupings of bicycles, LCD displays, and tennis rackets were utilized in an example of this type of grouping. Each container is filled as completely as possible in order to maximize the use of the container space. Waves 1, 2, and N depart in separate intermodal shipments from manufacturing locations 1, 2, and N. They are destined for receipt at one or more "transfer stations." Transfer stations are stations which are especially configured to receive and process prepackaged nonperishable articles grouped in waves of shipping containers. The transfer stations may be centralized or regionalized in their location. In the view of FIG. 7, a single transfer station is depicted; although, in alternative embodiments, multiple transfer stations may be utilized. The transfer stations are utilized to further simplify the distribution of goods and route them to the general regions for delivery to the customers. The actual delivery to the customer or to a third party commercial intermediary (such as Mail Boxes Etc.) may be performed by a commercial shipper such as FedEx or UPS. These services should be obtained at a substantial discount due the prepackaging, presorting, and regional grouping of the containers.

Figure 9:
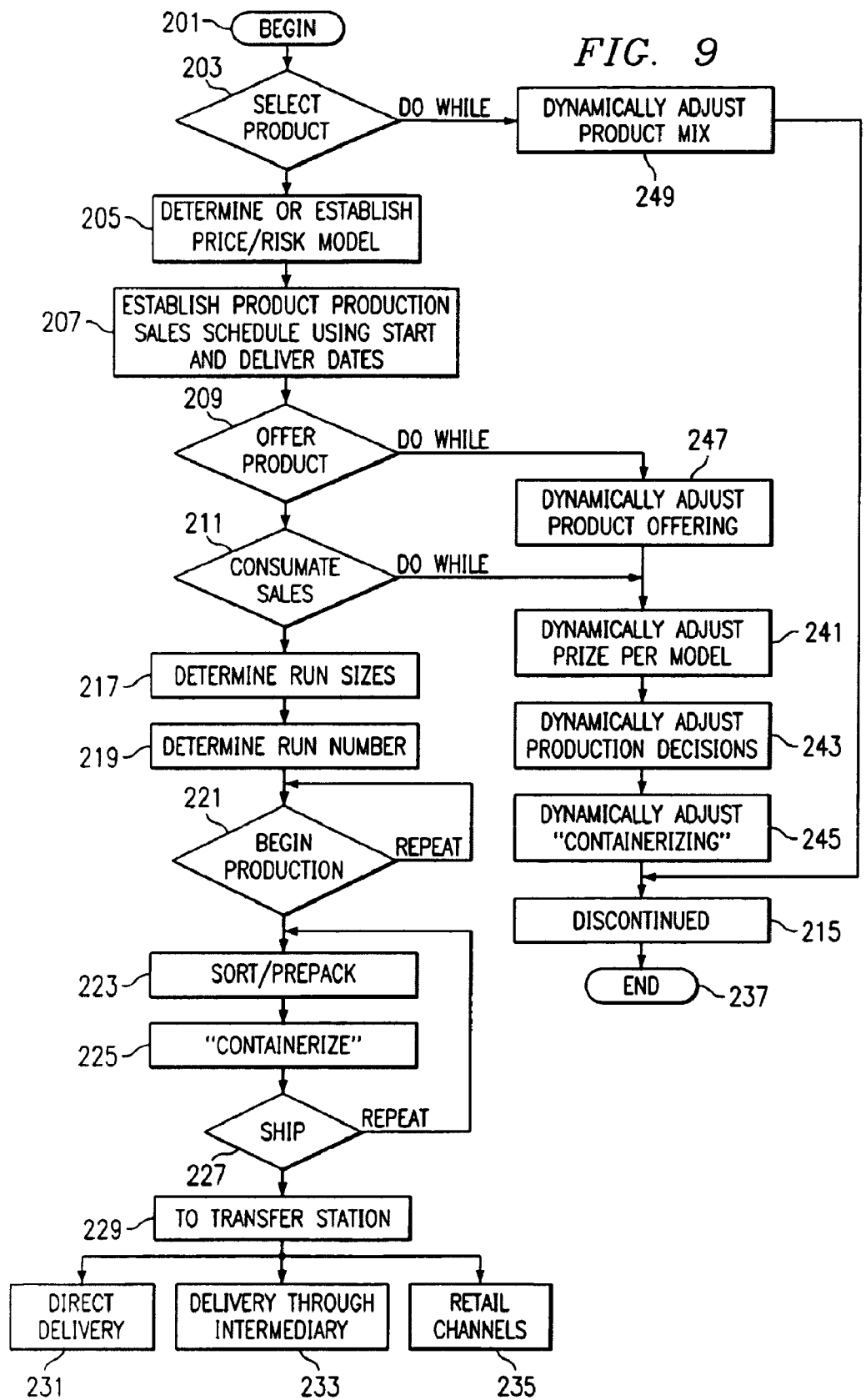
FIG. 9 is a high level flowchart representation of steps utilized in order to accomplish the preferred embodiment of the present invention.

FIG. 9 is a high level and relatively simplified flowchart overview of the improved manufacturing, sales, and distribution system in accordance with the preferred embodiment of the preset invention. The process begins at block 201. In accordance with block 203, a product is selected. In accordance with step 205, the producer or its agent establishes or determines a price/risk model which is associated with the product. This should be an economic model which most accurately models this particular product or product type. The goal is to provide an accurate measure of the investment/risk that the producer has or will have in a particular product. It must be accurate enough so that sales and other commercial commitments can be made based upon the model, and it must include adequate profit for all involved. In accordance with step 207, the producer establishes a product production sales schedule which uses start and delivery dates. In accordance with step 209, the producer offers, over an electronically moderated communication channel, the product for sale. In accordance with step 211, a plurality of customers contact the data processing system which is utilized to offer the products and consummated the plurality of sales.

In accordance with block 217, the producer determines run sizes based upon the existing or anticipated commitments. In accordance with step 219, the producer determines the total number of production runs which are to be made. In accordance with block 221, producer begins production of the products. This process is repeated until all production runs have been completed. In accordance with step 223, the producer sorts and prepacks the already sold products. The producer may also sort and pack products which are not yet sold but which will be either sold in transit or will be sold after delivery to conventional wholesale or retail channels of trade. In other words, a container may be composed of a certain number of items which are "presold" and which have specific end users identified therewith, and specific destinations of delivery. Also, the container may include a great number of packaged but not sold items, which have no specific end destination, but will be either sold in transit or sold in the conventional manner through wholesale and/or resale distribution channels if not sold prior to that time. In accordance with step 225, the sorted and packed items are "containerized" in order to maximize the utilization of containers. In accordance with step 227, the products are shipped (preferably in waves of shipments as discussed above). In accordance with step 229, the products are received at a transfer station or a plurality of transfer stations. At that point, the product may either be routed to retail channels 235 (first passing through wholesale channels), delivered directly to the consumer in accordance with step 231, or delivered to the consumer through an intermediary in accordance with step 233 (utilizing an intermediary such as the post office or Mail Boxes Etc.).

Several "do while" loops are established which iteratively operate throughout the entire process. The first "do while" loop is represented by block 249. In accordance with this step, the product is only one of a relatively large number of products. In accordance with teachings of the present invention, the producer should dynamically adjust the product mixture based upon product interest or actual product sales. In fact, a relatively large "catalog" of products may be maintained.

The next "do while" operation is represented by block 247. In accordance with this block, the product offering is dynamically adjusted. By this we mean the particulars of the product such as size, color, or other user-selectable attributes may be dynamically adjusted during the manufacturing process in direct or indirect response to customer interest in the product, preferably as manifest by advanced purchases of the product. For example, should the data reveal that blue polo shirts are in greater demand than red polo shirts, the manufacturing process can be adjusted dynamically so that successive product runs are utilized to generate a greater number of products which are in high demand and a lesser number of products which are in low demand. The next "do while" operation is represented by blocks 241, 243, and 245. These represent the dynamic adjustment of price per model in accordance with block 241, the dynamic adjustment of production decisions in accordance with block 243, and the dynamic adjustment of containerizing operations in accordance with block 245. One fundamental attribute of the preset invention is that the price will generally match the amount of investment and/or risk that the producer is experiencing at a particular time a sale is consummated and it will include an adequate profit for those involved. This has previously been discussed with reference to exemplary graphs which attempt to represent conceptually the increase or decrease in price, risk, and investment. Additionally, production decisions may be adjusted dynamically in response to weak or strong demand for particular products or product types. Finally, in accordance with block 245, the presorting, prepacking, and containerization operations can be adjusted automatically to take into account a variety of factors including changes in production schedules, changes in actual sales, and changes in consumer demand. These processes are iteratively performed in order to dynamically adjust the manufacturing, selling, and distribution process. The process may be discontinued in accordance with block 215 and ended in accordance with block 237.

Figure 8A:
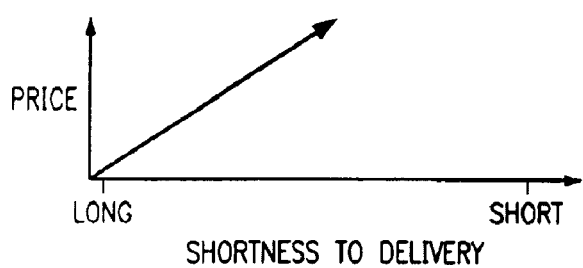
FIG. 8A is a simple graphical representation of the changes in price with respect to time in accordance with the preferred embodiment of the present invention as contrasted with the prior art of FIG. 8B.
Figure 8B:
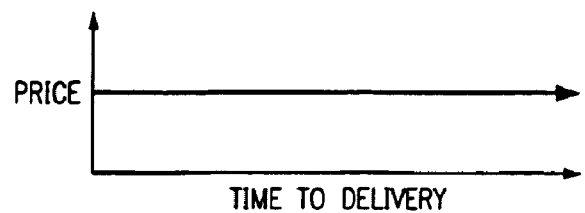
Figures 10, 11:
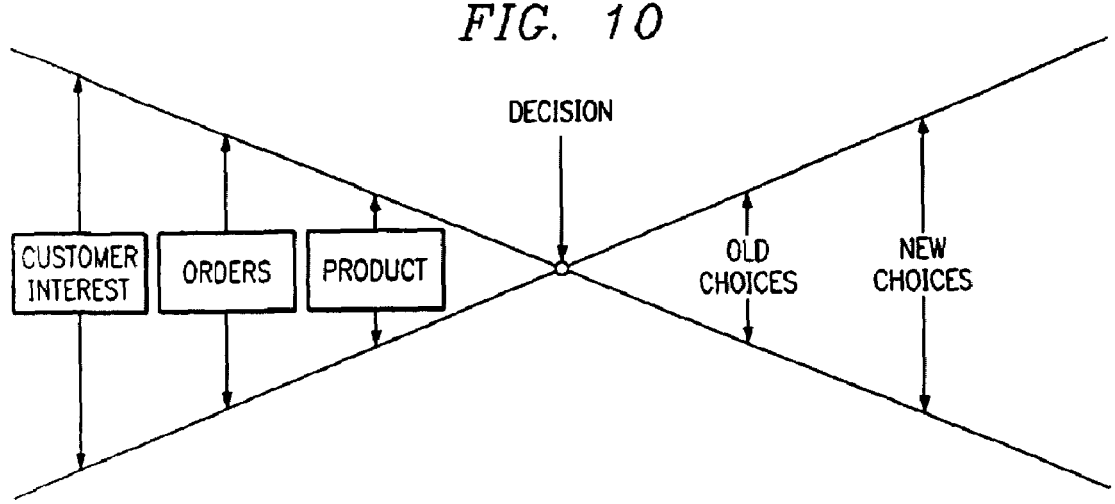
FIG. 10 is a graphical representation of utilization of the present invention to alter product choices and options once production has begun.
FIG. 11 is a pictorial representation of an exemplary graphical user interface screen utilized to present customers with purchase options in accordance with the preferred embodiment of the present invention.

Some advantages associated with the preferred embodiment of the preset invention are graphically depicted in FIGS. 8A, 8B, and 10. FIG. 8B is representative of the advantage obtained with the present invention which allows price to be increased as the interval one must wait for delivery decreases. In other words, more patient customers, who make early financial commitments, receive the lowest price. Customers that are reluctant to make financial commitments early in the production process, or who require more immediate delivery, are charged a higher price accordingly. This stands in contrast with the prior art which is represented graphically in FIG. 8B, in which price is relatively invariate with respect to delivery time. In other words, in conventional production, sales, and delivery scenarios, there is little advantage or disadvantage afforded to a customers willingness or unwillingness to wait for particular time intervals to pass before receipt of a product. This is true because the prior art does not allow the consumer to interact with the producer/seller in the early stages of the production cycle. FIG. 10 is a graphical representation of the ability to change product features based on sales data developed from earlier production runs.

FIG. 11 is a pictorial representation of an exemplary graphical user interface screen 301 which is utilized to present to customers a particular nonperishable good for sale. In the view of FIG. 11, a tennis racket is depicted in graphical user interface 301. Preferably, a digital image 301 is provided of the product. Additionally, a brief specification 305 is also provided. Additionally, information is provided which maps days-to-deliver data 307 to unit cost data 309. As is shown, the longer the interval of time that the potential customer is willing to wait for actual delivery, the lower the per unit cost will be. For example, if the customer can wait seven days for delivery of the tennis racket, the unit cost is $140.00. In contrast, if the customer can only wait two days for delivery, the unit cost is $190.00 per unit. Should the potential customer elect to purchase the racket, the graphical user interface contains templates which allow the user to enter identification information 311, shipping address information 313, select options available for the product, which are represented in options block 315, and establish a method of payment from a list of available payment methods 317.

Figures 12, 13, 14:
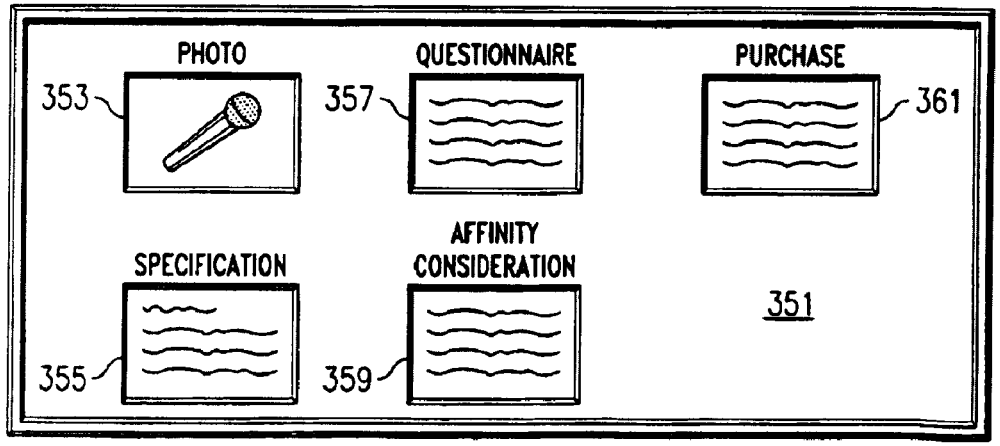
FIGS. 12 and 13 depict alternative methods of price modeling in accordance with the preferred embodiment of the present invention.
FIG. 14 is representative of an exemplary graphical user interface utilized in order to establish potential demand for a proposed product in accordance with the preferred embodiment of the present invention.

The relationship between the days to delivery and unit costs can be relatively complex relationship which takes into account a variety of risks and investment factors. Two exemplary approaches are depicted in the view of FIG. 12 and 13. FIG. 12 is a representation of the risk/cost analysis which is performed in the form of a tabular calculation. As is shown, the days to delivery data 307 maps to corresponding unit cost information 309. At least these items are made available to the central purchaser in the graphical user interface 301 of FIG. 11. However, further, additional and more complete risk and cost information may be provided to the user in alternative embodiments. For example, such information may include cost of money data 321, risk of obsolence 323, exogenous risk 325, currency risk 327, and factory costs 329. Essentially, the pertinent risk and cost factors can be calculated and provided in a tabular format, in a spread sheet type model, in order to map the purchaser's options to particular price points. An alternative to this approach is depicted in the view of FIG. 13. This is a more formulaic approach, in which a multi-variant equation is established which maps price to a variety of factors, such as manufacturer's cost, the real cost of money in annual percentage points, the number of days of financing which is provided by a prepaid sale, and a variety of other risks related to the product itself, currency fluctuations, and the like. Essentially, the spread sheet approach of FIG. 12 can be supplanted entirely with the formulaic approach such as that depicted in FIG. 13.

Figure 15:
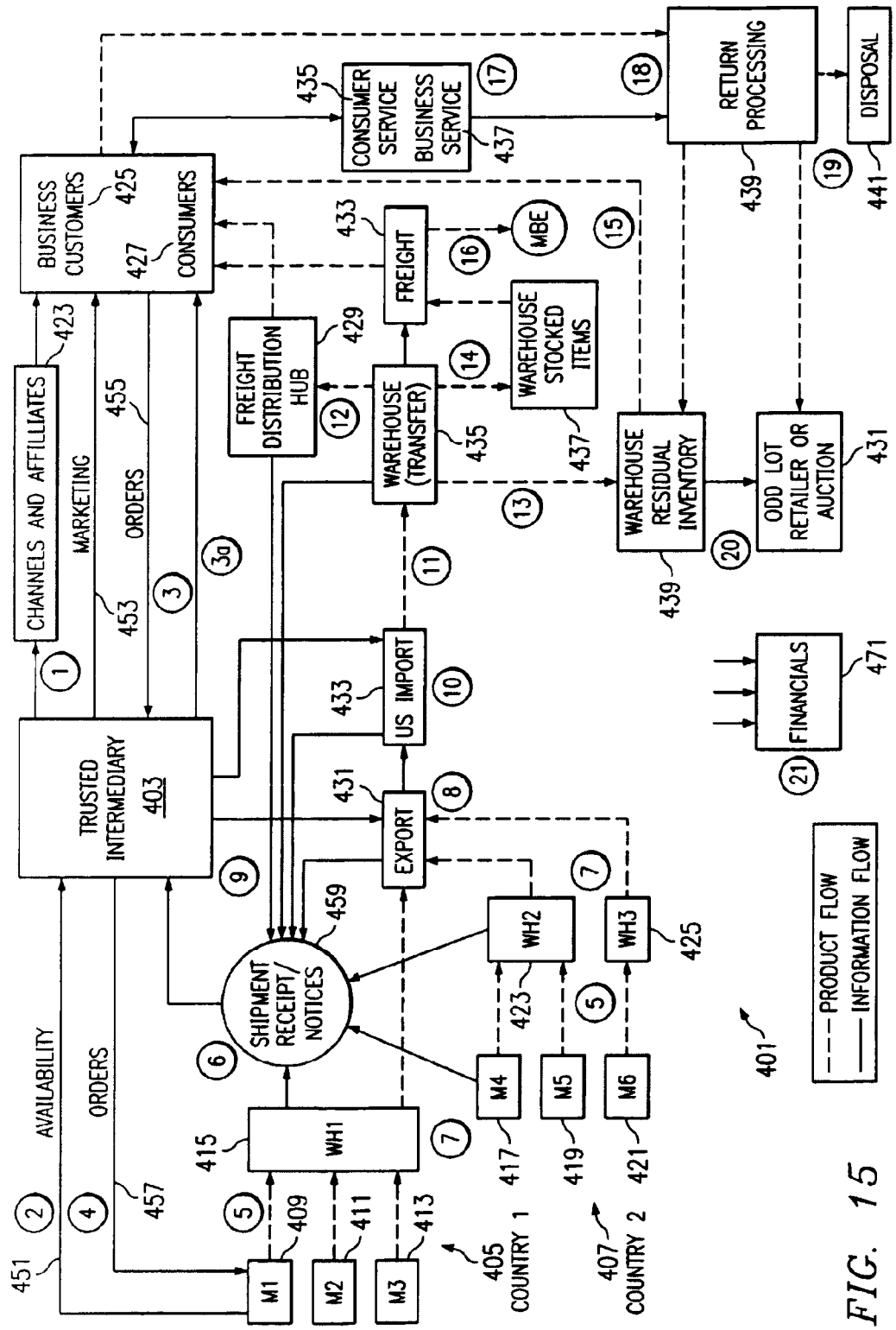
FIG. 15 is a diagram of product and information flow for a business exchange operated in accordance with one embodiment of the present invention.

FIG. 14 is a pictorial representation of a graphical user interface utilized in connection with the demand research model 69 and affinity reward system 75 of FIG. 2. As is shown, a graphical user interface 351 includes a plurality of blocks of information which are useful in determining potential demand for a proposed product. As is shown, a digital photograph 353 is provided of the proposed product (which in this case is the tennis racket, again). Additionally, a brief technical and marketing specification 355 is provided to graphical user interface which describes the product and options available for the product. A questionnaire section 357 is provided which elicits customer opinion regarding the desirability or interest of a particular customer to that product. Once the customer completes the questionnaire information in block 357, he or she may move to the affinity block 359 which provides for monetary or nonmonetary compensation of consideration to the customer for completing the questionnaire information. For example, a "frequent buyer" program may be established in which various points are awarded and accrued which may be redeemed for product purchases or discounts on purchases or for some other unrelated consideration. For example, the affinity consideration block 359 may advise the potential purchaser of a marketing link to a frequent flyer program. For example, the affinity consideration can take the form of an award of frequent flyer miles. Additionally, in the view of FIG. 14, graphical user interface 351 includes a purchase block 361 which is utilized preferably to solicit a financial commitment from the buyer's of the particular product. This differs from an advanced purchase, and represents some relatively de minimus consideration that the potential purchaser will make at this time in order to be notified of product availability and be accorded the lowest optimum most-favored-nation price on a particular product. For example, the purchase data block 361 may elicit a credit card transaction in the amount of $1.00 or $5.00 which will secure the potential purchaser's rights to most-favored-nation pricing in the event that the tennis racket which is depicted in digital photo 353 and described in specification 355 is available for purchase. This may be "dove tailed" with automatic messaging systems such as automatic messaging in Internet, cable, or Web television systems or through one or two way paging systems which notify the potential buyer of product availability. FIG. 15 is a block diagram and flow depiction of one embodiment 410 of the present invention, which shows the flow of product in a dark line and the flow of information in a light line. A trusted intermediary entity 403 is utilized to manage a virtual marketplace which is preferably accessible over the Internet. The trusted intermediary 403 has commercial relationships with both producers of goods and consumers of goods. In particular, this figure represents how the present invention enables business-to-business e-commerce. The process is shown in a series of numbered steps. Each step will be discussed below.

In step number 1, products will be marketed either directly to small businesses 425, or some combination of small businesses 425 and consumers 427. Alternatively, some or all products can be marketed through certain channels and affiliates 423. Marketing information 453 flows from trusted intermediary through a marketing interface. The marketing information is determined or driven by product availability information 451 obtained from a plurality of manufacturers. The trusted intermediary entity 403 operates to qualify or pre-qualify both customers and manufacturers. This is an important function since participation in the "virtual marketplace" or "exchange" depends upon the reliability of the "offers" from manufacturers and the aggregated "acceptances" by the customers. The trusted intermediary entity 403 can obtain production guarantees from the manufacturers and payment promises from the customers. These guarantees can take many forms, and they can have a wide range of legal "enforceability". For example, the payment promise may constitute a charge authorization to a credit card, or simply a check of credit-worthiness sufficient to fulfill the commercial obligation. For large customers, the payment promise may constitute a letter of credit or an escrow deposit of the payment amount. For the manufacturers, the commitment may constitute a performance bond or simply a positive performance history. Once the virtual exchange is perceived by participants as being valuable, the threat of expulsion or exclusion may be sufficient motivation to ensure both payment by buyers and manufacturing by sellers. Also, however it is guaranteed, the order information 451 needs to be reliable. This means that the product needs to conform to the description and specification, and the price and delivery date needs to be firm.

In accordance with step 2, the trusted intermediary entity 403 identify product families and product availability to customers which is determined by product availability and capacities information which is obtained from the manufacturers. In accordance with step 3, the aggregated orders 455 from customers are utilized to as commercial commitments that drive the design, production and/or manufacturing decisions of manufacturers 409, 411, 413, 417, 419, 421, which are located in countries 405, 407. Additionally, in accordance with step number 3a, the customers will be able to track the status of their orders on-line. As discussed above, and in accordance with step 4, the aggregated commercial commitments are in fact treated as purchase orders which thus diminish or eliminate the commercial risk to the manufacturers. The manufacturers may utilize order histories and order patterns form early orders, and thus will be able to develop forecasts for future offerings, and to also better estimate production quantities.

The manufacturers are located proximate warehouses 415, 423, 425 and, in accordance with step number 5 the manufacturers will ship finished product to a local (in-country) warehouses 415,423,425. In the preferred embodiment, the trusted intermediary entity 403 will track production lots, containers, and individual end items throughout the supply chain.

IN accordance with step number 6, the trusted intermediary 403 will receive notification of shipments, receipts, and deliveries from manufacturers, in-country warehouses, and import/export partners U.S. warehouses and freight forwarders at each point in the supply chain. Some of this information may be relayed as product status information to customers via email or through Web access to the Internet site.

At the in-country warehouses 415, 423, 425, in accordance with step number 7, workers will label orders for shipment utilizing a preferred, or affiliated shipper such as Untied Parcel Service or FedEX. The items may also be bar coded for identification and tracking purposes. Preferably, workers will sort and aggregate merchandise for shipment according to regions or zones in the consuming country (for example, with UPS/LTL zones). Also appropriate customs documents will be prepared. Then, in accordance with step number 8, the processed products will transported to an appropriate port and processed for export clearance. Preferably, but not necessarily, the activities at the warehouses and export clearance station are performed by the trusted intermediary entity 403 or by someone under its control. In accordance with step number 9, the trusted intermediary entity 403 will continue to take orders for merchandise determined by its supply chain pricing model, and those orders will be allocated against individual items in-transit. Of course, the financial system will capture the selling price of each item and the other order information.

In accordance with step number 10, the shipments are received at a port in the consuming country, and it is processed for clearance though customs. In accordance with step number 11, the shipment is delivered to a warehousing and processing facility, such as a transfer station 423, which has been described above. The pre-labeled items will be delivered to a freight distribution hub 429, in accordance with step number 12. For example, the pre-labeled items may be delivered to an LTL/Carrier/UPS hub in the consuming site and delivered in accordance with the information on the pre-applied label to the end customer.

In accordance with step number 13, items not pre-labeled will be transported to a warehouse location near a port of entry, where pre-sold items will be picked, labeled, and shipped to customers placing orders while the merchandise was in transit. In accordance with step number 14 items which are available for "cross-selling" will be transported to warehouse location 437. In accordance with step number 15, orders will continue to be filled from residual inventory 439 and shipped via the selected delivery service such as UPS until the inventory is depleted or order volumes subside. In some instances, in accordance with step number 16, at a customer's request or if the delivery service is unable to complete delivery, parcels may be directed to local holding networks such as the Mailboxes, Etc or Kinko's networks.

In accordance with step number 17 customer service functions will be performed by a customer service entity 435 or a business service entity 437. Preferably these entities are under the control of trusted intermediary entity 403, but these entities could be independent contractors. Additionally, in accordance with step number 18, a return processing entity 439 can handle return issues. Preferably, returns will be authorized by customer or business service 435, 437 and sent to a central point for processing. In accordance with step number 19 a disposal service 441 will dispose of damaged goods or consign to an odd lot retailer or auctioneer in a refurbished or as-is condition. And in accordance with step number 20, an odd lot retailer or auctioneer 431 may be utilized to sell any residual inventory.

Throughout the entire process, financial system 471 captures appropriate data feeds regarding orders, pricing, inventory, billings, receivables, etc. A key component of such a financial system is an event-triggered pricing matrix with prices determined by the products location or stage of completion, such as: pre-production, production, overseas warehouse, in-transit, in local warehouse, or in-stock. Other and different price points can be utilized.

Figure 16A:
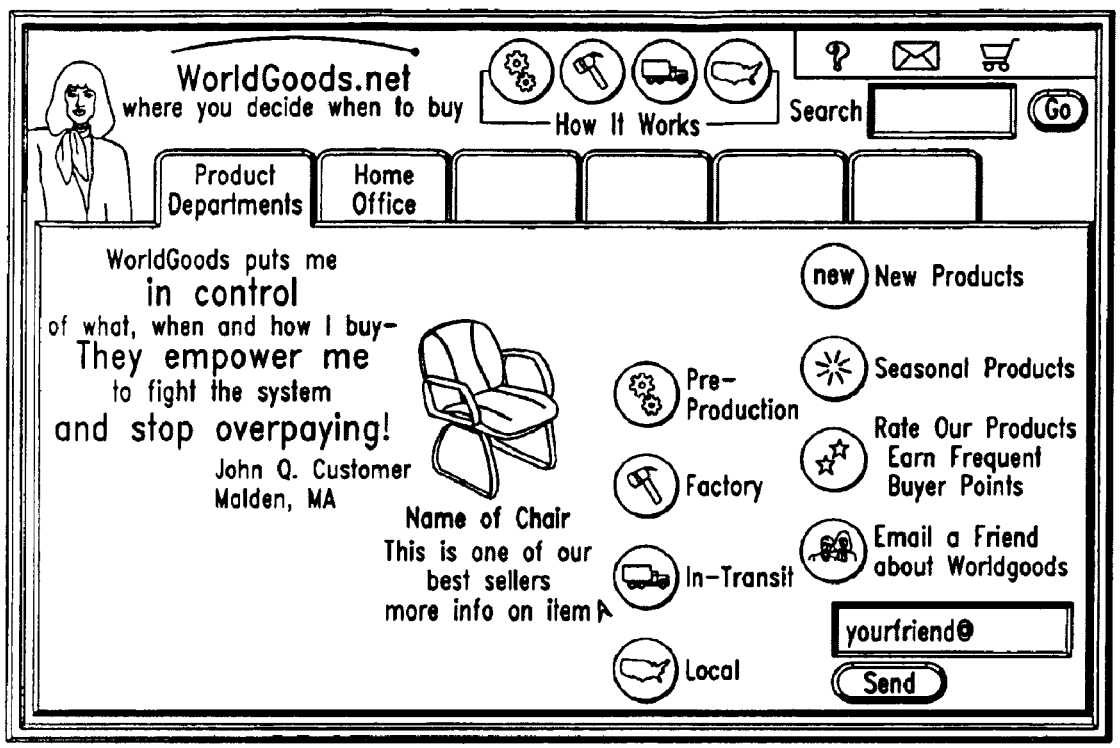
FIGS. 16A and 16B are exemplary Internet graphical user interfaces in accordance with one embodiment of the present invention.
Figure 16B:
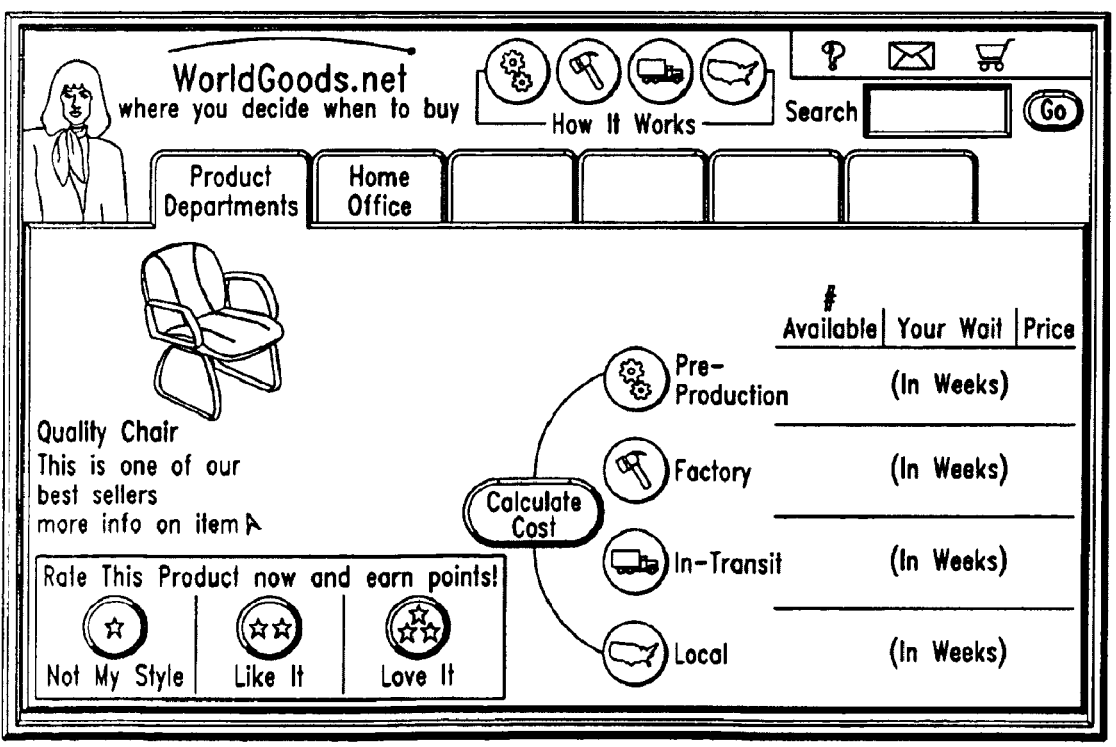

FIGS. 16A and 16B depict some exemplary Web pages. In the view of FIG. 16A, a chair is shown which can be purchased in any of a "pre-production" stage, a "factory" stage, an "in-transit" stage, and a "local" stage. Icons are established for each of these stages. In FIG. 16 B, an associated (cascading) screen is depicted. For each production stage includes three associated fields: one for the number of units available, one for the amount of time to delivery, and one for the price associated with that stage. This figure additionally depicts an affinity-driven system for providing product feedback, with discrete rating buttons to simplify the response and allow easy aggregation.

Figure 17A:
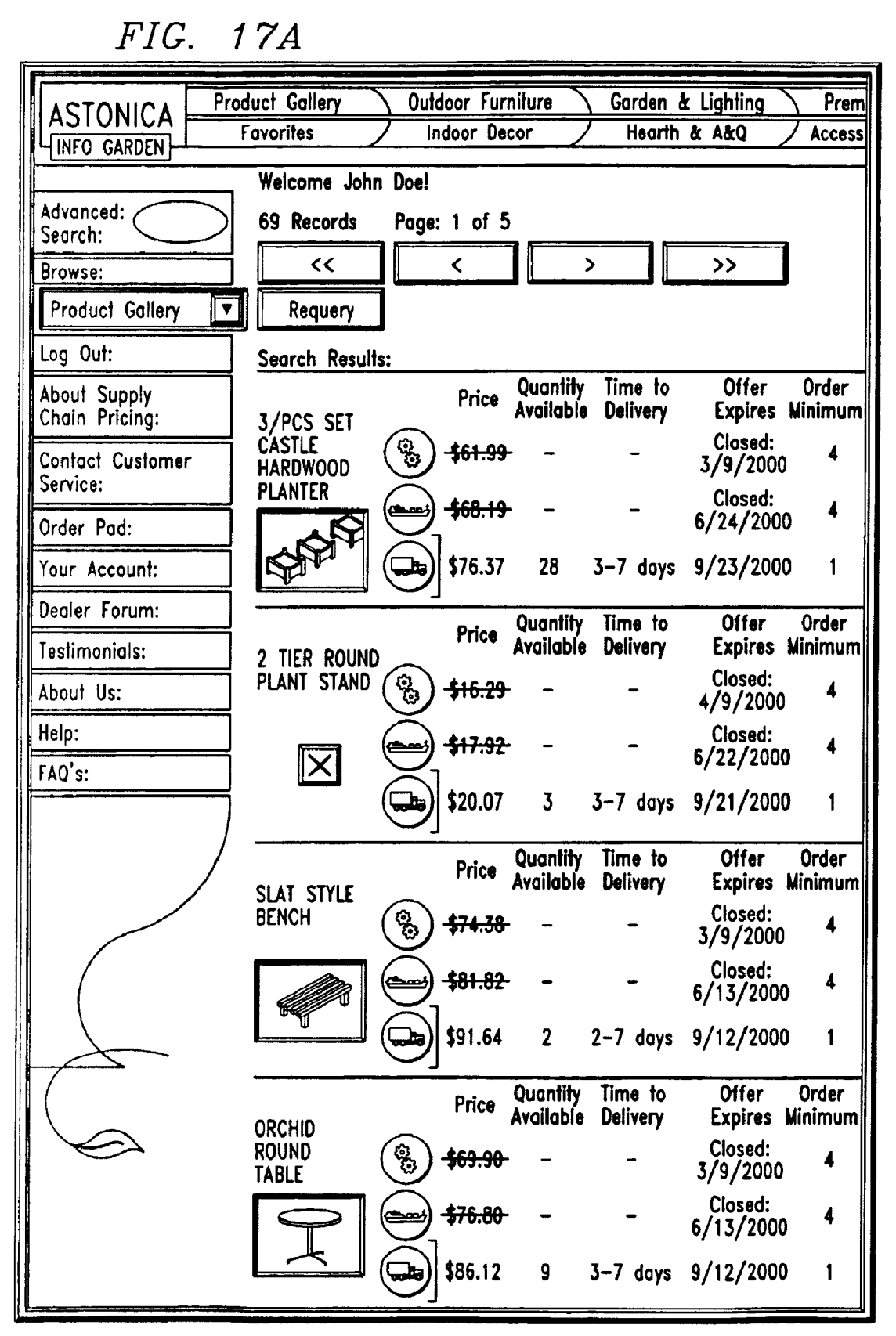

FIGS. 17A, B, and C depict an alternative system with only three discrete stages: one for a "production" stage, one for an "in transit" stage, and one for an "in country" or "in store" stage. These Web pages represent a number of exemplary pages from what may be a catalog of products. Preferably, the products are grouped by subject matter. A plurality of garden and lawn items are shown. Each product is depicted and/or described. Several fields are associated with each item: a price field for each stage, a quantities available filed, a time to delivery field, an offer expiration date, and an order minimum field. As is shown at each stage the price increases in order to encourage early financial commitments.

Figure 18E:
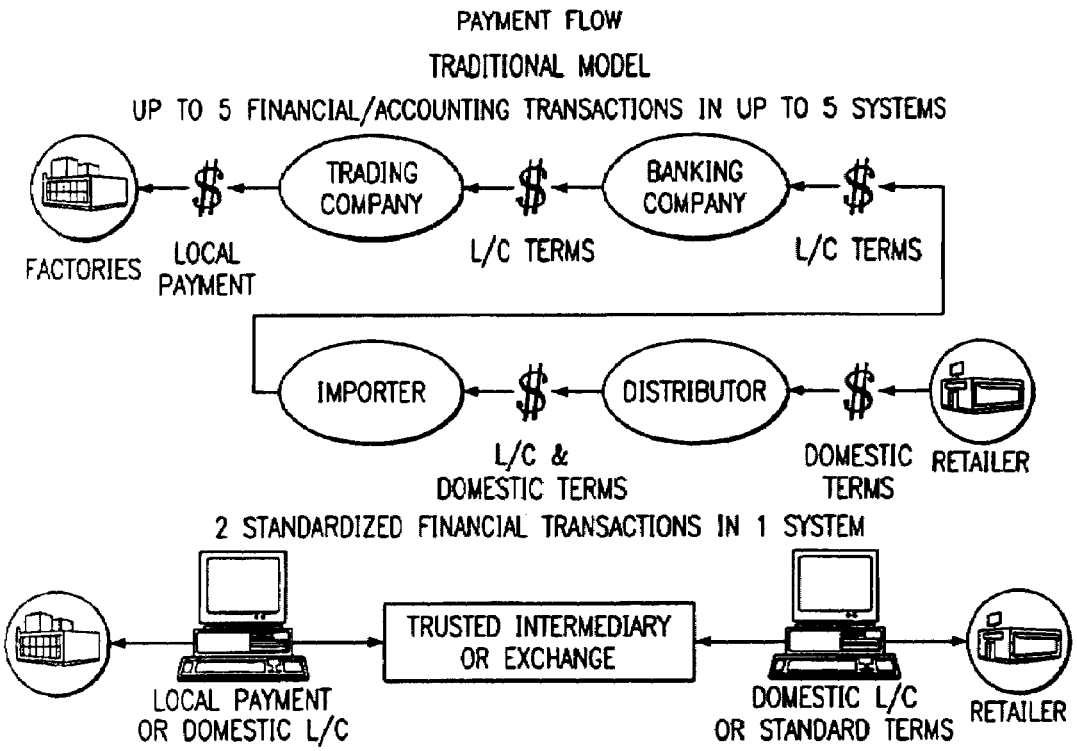
Figure 18F:
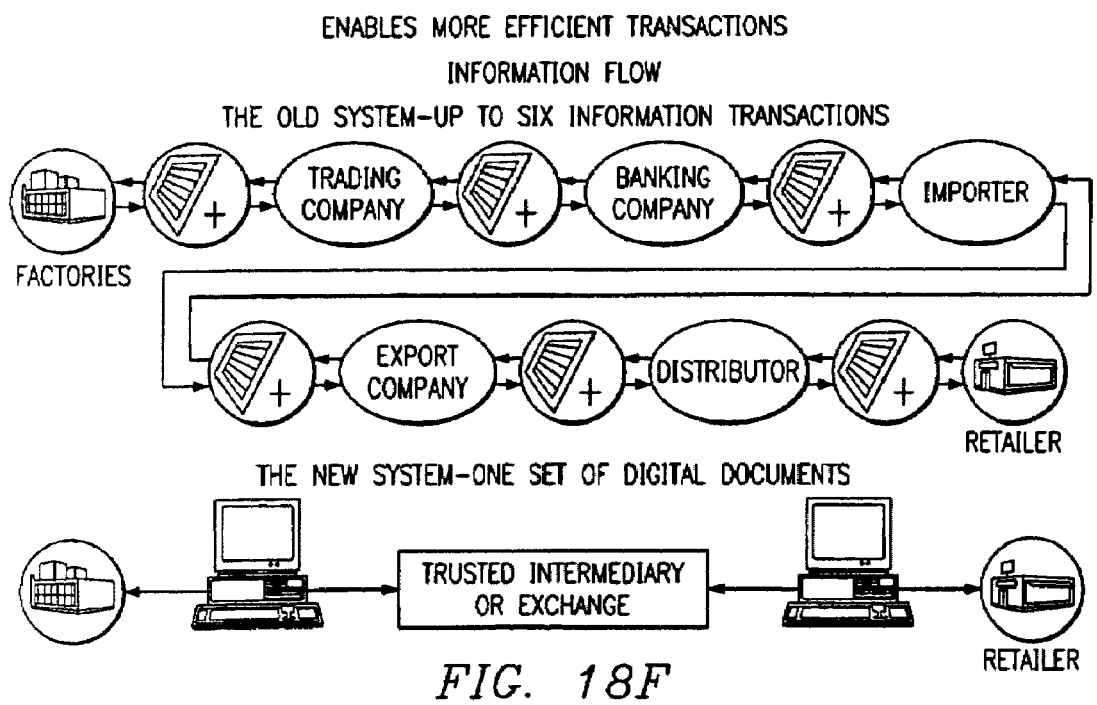

FIGS. 18 A through 18 F compare the present invention to the prior art, and illustrate the advantages of the present invention. As is shown in FIG. 18A, the prior art import system involves an international factory filling containers with a large number of items same-kind items which are delivered to a large volume buyer for resale. In contrast, the present invention allows one buyer to consolidate product form multiple factories, or a large factory to reach independent retailers, or small factories to connect to small buyers or even individual consumers. As is shown on FIG. 18 B, the present invention eliminates multiple layers in an international supply chain, such as sourcing agents, trading companies, import/export companies, importers, domestic distributors, product representation firms, and even retailers. In the prior art as many as six layers may exist between the factory and retailer. As is shown in FIG. 18 C, in the prior art, each product category has its own unique path to supply which makes it difficult for independent retailers to source a variety of goods. As such each product category has its own industry references, its own trade shows, and its own agents. The virtual exchange of the present invention allows retailers to enjoy a single point of contact to multiple product categories and multiple factories. The virtual exchange of the present invention also empowers independent retailer purchasing personnel. Independent retailers can now compete in both price and selection with national chains. FIG. 18 D depicts the physical flow of goods. In the prior art as many as five shipping transactions and as many as three warehouse stops are required for the distribution, but with the present invention only one or even zero warehouse stops are required. The trusted intermediary entity handles all customs clearance, picking, packing, and shipping activities. FIG. 18 E depicts the flow of payments. In a traditional system, up to five financial and/or accounting transactions are required in up to five different systems. In contrast, in the present invention, two standardized transactions are used with one system, as there is only a domestic payment or letter of credit and a foreign payment or letter of credit. FIG. 18 F depicts the flow of information. The prior art requires up to six information transactions, while the present invention allows one set of digital documents. It can be appreciated that the present invention provides numerous significant advance over the prior art.

The present invention also provides a dynamic on-line order gathering system that enables sellers to offer one or a combination of goods whose availability (production and/or shipping) may be economically linked in some ways with other items and which facilitates aggregation of demand across related items so as to enable the ability to reach critical mass of demand for the related goods by a more efficient means than currently available.

For example, let's suppose production of three particular models of bicycle are dependent upon demand reaching sufficient quantity for a basic sub-assembly, common to all the bikes. The realization of a critical mass of orders for the sub-assembly could allow for the economic production of all three bikes, despite the fact that no single bike had reached a critical mass of orders to justify production. The ability for a producer to articulate an offer of economically related goods creates the opportunity for buyers to make choices which increase their ability to determine what gets produced and in turn create the opportunity for the producer to economically produce more bicycles.

For a second example, an overseas trading company produces several dozen styles of small brass accessories, such as doorknockers, signs and fountains, for use in gardens, nurseries and patios. The production characteristics of individual items is such that they can be produced in quantities as small as fifty pieces but each has a unique weight, price, volume and master carton characteristics. Due to the generally low individual value of items and the cost of ocean freight, the order minimum for an overseas buyer of these items is the equivalent of a 20 foot container, which may represent potentially unlimited combinations of items and item quantities to reach this minimum.

The system of the present invention enables sellers to define his or her required minimum order level both individually or as a dynamic sum of related items within the multiple item offering, as long as the sum of accumulated orders for the item or items collectively meet one or a combination of the following criteria:

1) physical volume of one or more goods ordered reaching a volume requirement, such as filling a 20 or 40 foot container, or a pallet;

2) a combination of multiple items reaching a combined order dollar volume minimum where any single item may have a minimum substantially below the combined order minimum;

3) the equivalent units of offered item or combination of item reaching a unit volume minimum.

Leading up to the creation of the offer, the system gathers the necessary information from the seller with respect to individual product characteristics, such as price, package material, carton configuration, weight and other factors. This information is stored in a database of product information which is separate from but accessible by an algorithm and database which allows the seller to define an offer of one item or many related items. The offering system and database accumulates for all combinations of items offered the dollars ordered, volume ordered and quantity ordered, which are used in the algorithm as variables in calculating and displaying to potential buyer and suppliers the progress at that moment toward meeting the condition set by the supplier to begin production.

The system displays to buyers the progress toward the minimum which has been made as a result of multiple buyers having registered orders for the good or goods offered. A graphical representation displays the amount of each item which has been ordered, expressed as a percentage of either goals 1, 2 or 3 above, and also shows the combined amount of all related items which have been ordered. A color coding system has been devised which shows by color whether the individual item minimum within the offering group has been met.

Figure 19A:
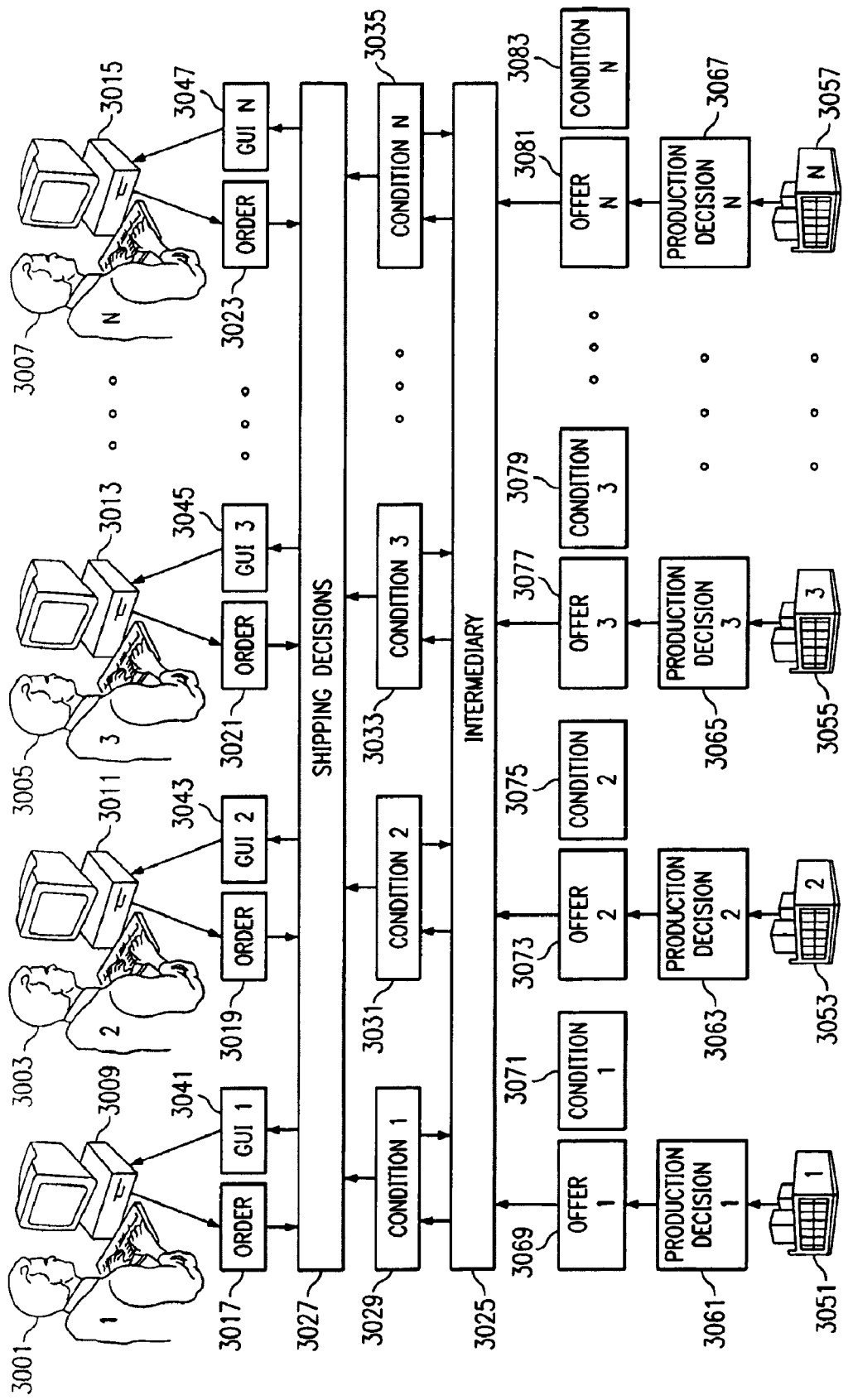
FIG. 19 depicts the container builder feature of the present invention.
Figure 19B:
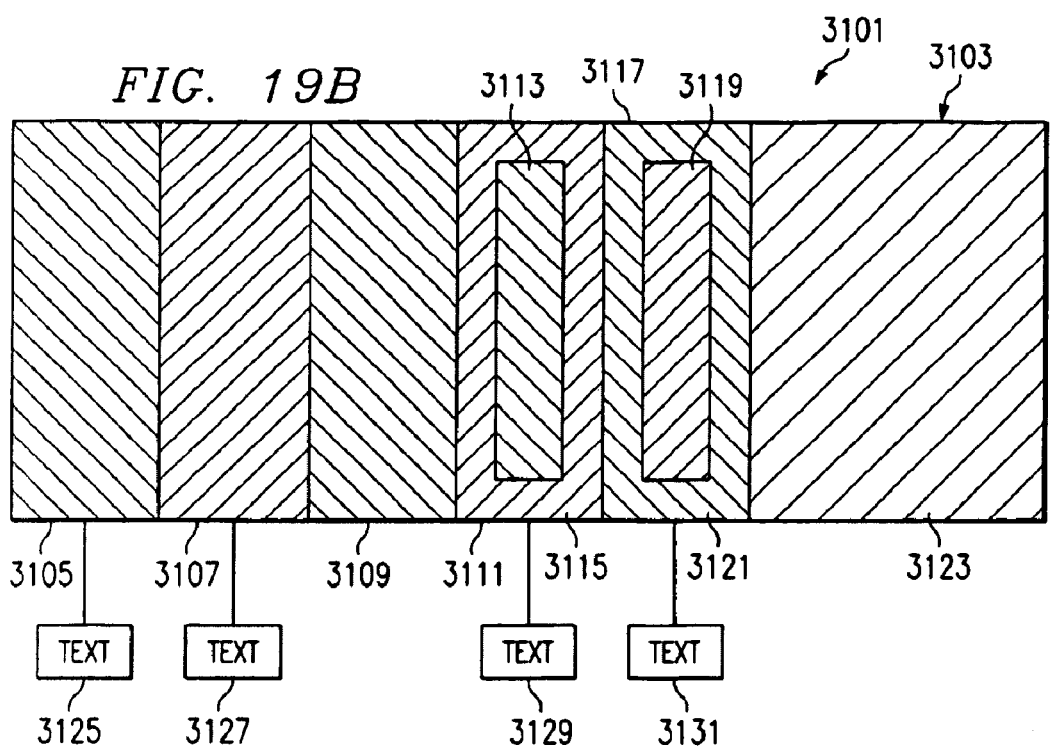
Figure 19C:
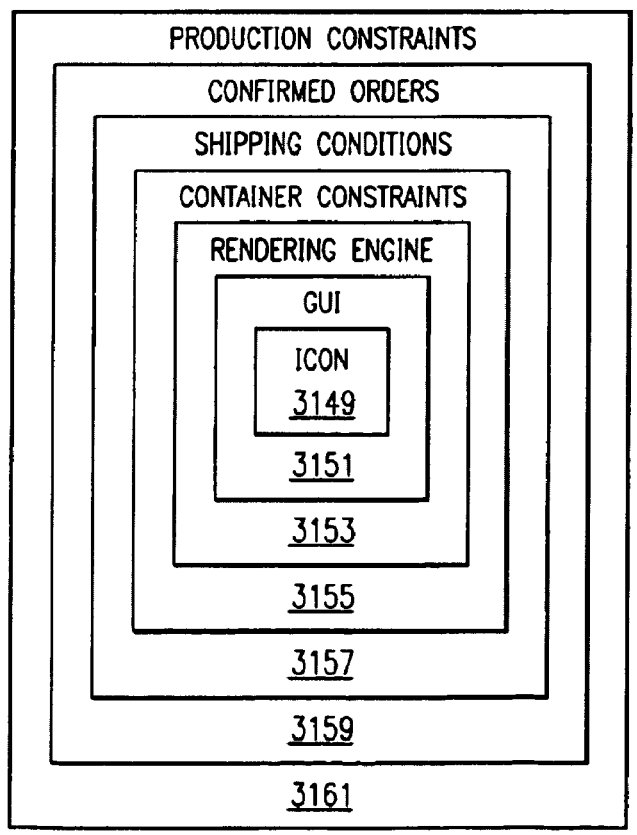

FIGS. 19A through 19C are high level representations of some of the core concepts associated with the preferred implementation of the present invention. With reference first to FIG. 19A, a plurality of purchasers 3001, 3003, 3005, 3007 interact with their data processing systems 3009, 3011, 3013, 3015. In order to communicate with the trusted intermediary 3025. The purchasers 3001, 3003, 3005, 3007 submit purchase orders 3017, 3019, 3021, 3023 through the trusted intermediary 3025 for a variety of goods which have been offered for sale under predetermined sale conditions by a plurality of factories 3051, 3053, 3055, 3057. The factories 3051, 3053, 3055, 3057 have a contractual relationship with trusted intermediary 3025 through which they offer their products for sale to buyers 3001, 3003, 3005, 3007 under terms and conditions which are established by them. As discussed above, the terms and conditions may relate to the price of goods, the date such goods will be available, and any preestablished condition which must be met before the factory 3051, 3053, 3055, 3057 will make the goods available. For example, a certain number of prepaid orders may be required to meet a "production minimum" before the goods will be made available. Until the production minimum is met, the offer is "conditional" and does not bind the factory 3051, 3053, 3055, 3057. Once the production conditions are met, the factory will commence production of the goods and make them available at the price (or prices) on the date (or dates) which are associated with the offer. In the view of FIG. 19A, factory 3051 makes its production decision 3061 and submits offer 3069 which has associated with it condition 3071. Likewise, factory 3053 makes its production decision 3063 and generates an offer 3073 which has associated with it a condition 3075. Similarly, factory 3055 makes its production decision 3065 and tenders an offer 3077 which has associated with it a condition 3079. Finally, factory 3057 makes its production decision 3067 and generates an offer 3081 which has associated with it a condition 3083. The conditional offers are communicated to intermediary 3025. Intermediary 3025 is in charge of the shipping of finished goods from one or more production ports to one or more consumption ports. Typically, the factory is located at large distances away from the production ports and shipping containers are utilized to move the goods from production ports to consumption ports. The goods may be moved utilizing ships, trains, or trucks. Intermediary 3025 does not wish to ship containers which are only partially filled. Accordingly, it must make its shipping decisions 3027 in a manner which meets a variety of shipping conditions 3029, 3031, 3033, and 3035. These shipping conditions may relate to the commitment of container space for particular goods or groups of goods. The intermediary must utilize an analytical process whereby the weight and/or volume of the products which are "committed" to a particular container are constantly monitored and analyzed in order to determine whether or not a container is fully committed and thus ready for shipment. Of course, in accordance with the broad concepts of the present invention, the goods that are being offered are goods that may not yet be in production. Accordingly, the analysis of the shipping containers, the commitments for the shipping containers, and the shipping conditions or constraints is conducted in advance of the actual filling of the containers, and is thus an analytical construct which is utilized to match confirmed orders, production output, and shipping resources. The goal, of course, is to optimize operations so that ordered goods are delivered to the customers as soon as possible, without wasting shipping resources. In order to facilitate this optimization, and further to empower the buyer, the present invention presents to each buyer a graphical user interface which is representative of the balancing of confirmed orders, production output, and shipping resources. In the view of FIG. 19A, graphical user interface 3041 is provided to buyer 3001. Likewise, graphical user interface 3043 is provided to buyer 3003. Graphical user interface 3045 is provided to buyer 3005. Graphical user interface 3047 is provided to buyer 3007. In the preferred implementation, each graphical user interface 3041, 3043, 3045, 3047 is adapted to graphically and/or textually communicate to buyers 3001, 3003, 3005, 3007 an amalgamation or aggregation of information pertaining to confirmed orders, production output, and shipping resources.

FIG. 19B is a simplified explanation of the preferred implementation of the present invention. As is shown a simplified explanation of the preferred implementation of the present invention. As is shown, icon 3101 is generated for a particular buyer icon 3101 is preferably a two-dimensional which is rectangular in shape. In the preferred implementation of the present invention, the preferred shipping volume is that of a shipping container. Accordingly, icon 3101 has a shape which is similar to the side view of a shipping container. In alternative embodiments, smaller standardized volumes may be utilized such as a pallet. It may be possible to implement the present invention in order to aggregate extremely small orders which together make up a single "pallet" of goods. A pallet may take a standardized shape. In such embodiments, the iconographic representation of the shipping volume may be a square or rectangular shape. As is shown in FIG. 19B, the rectangular shape 3103 is compartmentalized and color coded. As is shown in this example, portions 3105, 3107, 3109, 3111, 3117, and 3123 are representative of six products and/or conditions. Portion 2133 is representative of the "free" or unused space within a container which is represented by icon 3101. Of course, the container is not actually filled. The icon 3101 is merely a symbolic representation of commitments of shipping resources which will be utilized at a future date. Accordingly, portion 3123 represents the uncommitted shipping resources which are available to ship other products from one or more production ports, or for destination to one or more consumption ports. In contrast, portions 3105, 3107, 3109, 3111, 3117 represent particular orders or potential orders for products. These each represents a different product which will or may be shipped within a particular shipping resource such as a container, at a future date. In accordance with the preferred implementation of the present invention, color coding is utilized to communicate to the potential buyer that some portion of the shipping resource is allocated with "confirmed" orders. In the preferred implementation of the present invention, a color coding of green indicates a confirmed order for a product which has already met its production minimums. In other words, green indicates that a firm order has been placed for a product in response to a conditional offer, but that the condition has been met. In the view of FIG. 19B, portions 3105, 3107 are shaded green to indicate that these are confirmed orders for products which have already met the manufacturers' offer conditions. For example, the manufacturer may set a condition which establishes a minimum number of firm orders be placed before the manufacturer is legally obligated to produce the goods at the offered price, and offered time. In contrast, portion 3109 is coded red which indicates that a firm order has been placed, but that the manufacturer's condition has not been met. For example, portion 3109 may indicate a firm financial commitment to place an order for which the manufacturer is not currently legally obligated to perform unless and until the conditions are met. In other words, this represents a conditional allocation of shipping resources which may or may not be utilized at a future date depending upon whether the manufacturer's offer conditions are L1 indeed met by the time that the shipping resource must be utilized. In accordance with the preferred implementation of the present invention, each of buyers 3101, 3105, 3107 has an opportunity to "preview" potential orders and determine their impact on the use of shipping resources at a future date. This is visually illustrated by portions 3111 and 3107 of FIG. 19B. Portion 3111 includes a central portion 3113 which is coded yellow to indicate it's a potential order which may be placed by one particular purchaser. It is outlined by a border 3115 which is color coded to indicate whether or not the manufacturer is legally obligated by an offer. In the view of FIG. 19B, portion 3113 is surrounded by a green border which indicates that the conditions established by the manufacturer have been met and the manufacturer is accordingly legally obligated to produce the goods at the offered price at an offered time. The user realizes that should he or she place this order, this will represent a concrete commitment of a shipping resource at a future date. Because the user is provided with shipping date information and transit time information, by the trusted intermediary 3025, he or she then can project roughly the date on which the goods should be delivered to him or her. This involves the individual buyer and his or her decision making process in the resource allocation which must be performed for the shipping resources. Individual buyers are then involved in the decision making process through their individual concrete decisions. Continuing with FIG. 19B, portion 3117 depicts an alternative situation. Central portion 3119 is color coded yellow to indicate that this a potential order for a particular purchaser. It is surrounded by a border 3121 which is red which indicates that the conditions established by the manufacturer have not been met yet, so the manufacturer is not legally obligated to deliver the goods at the price and date of the manufacturer's offer. Only when the conditions established by the manufacturer are met will the manufacturer be obligated to deliver the goods. If the conditions established by the manufacturer are not met by an offer expiration date, the offer will expire and all those individual buyers that have made financial commitments will not be obligated to make a purchase. Only when the manufacturing conditions are met will all the parties be obligated to consummate the transaction. If conditions are not met, the manufacturer and the buyers are released from the conditional offer. In the view of FIG. 19B, textual portions 3125, 3127, 3129, 3133 are also provided to further explain to the buyer the meaning of the icon 3101.

The broad concept of the present invention can also be understood with reference to FIG. 19C. As is shown, a particular icon 3149 is generated for a user in a graphical user interface 3151. The graphical user interface is constructed by rendering engine 3153 which is under the control of the intermediary 3025. The rendering engine operates to generate the icon and associated text in response to calculations performed which take into account container restraints 3155. Additionally, the calculation and rendering also takes into account shipping conditions 3157. Of course, the model also takes into account confirmed orders 3159. All of this is subject to production constraints 3161 (such as conditional offers).

The present invention improves over the prior art significantly. It involves individual buyers in an aggregation of information and constraints and conditions. The constraints and conditions are real world constraints such as the number of containers available, the amount of shipping space available, the weight and volume limitations of particular containers. Additionally, it takes into account production constraints which are driven by financial and legal considerations. The icon and associated text generated for individual views is an amalgamation of this information which renders relevant portions of production and shipping operations transparent to individual users. This is done in a manner which does not violate the privacy of individual users and which does not excessively reveal information to others except in an aggregated and anonymous form.

Figure 20:
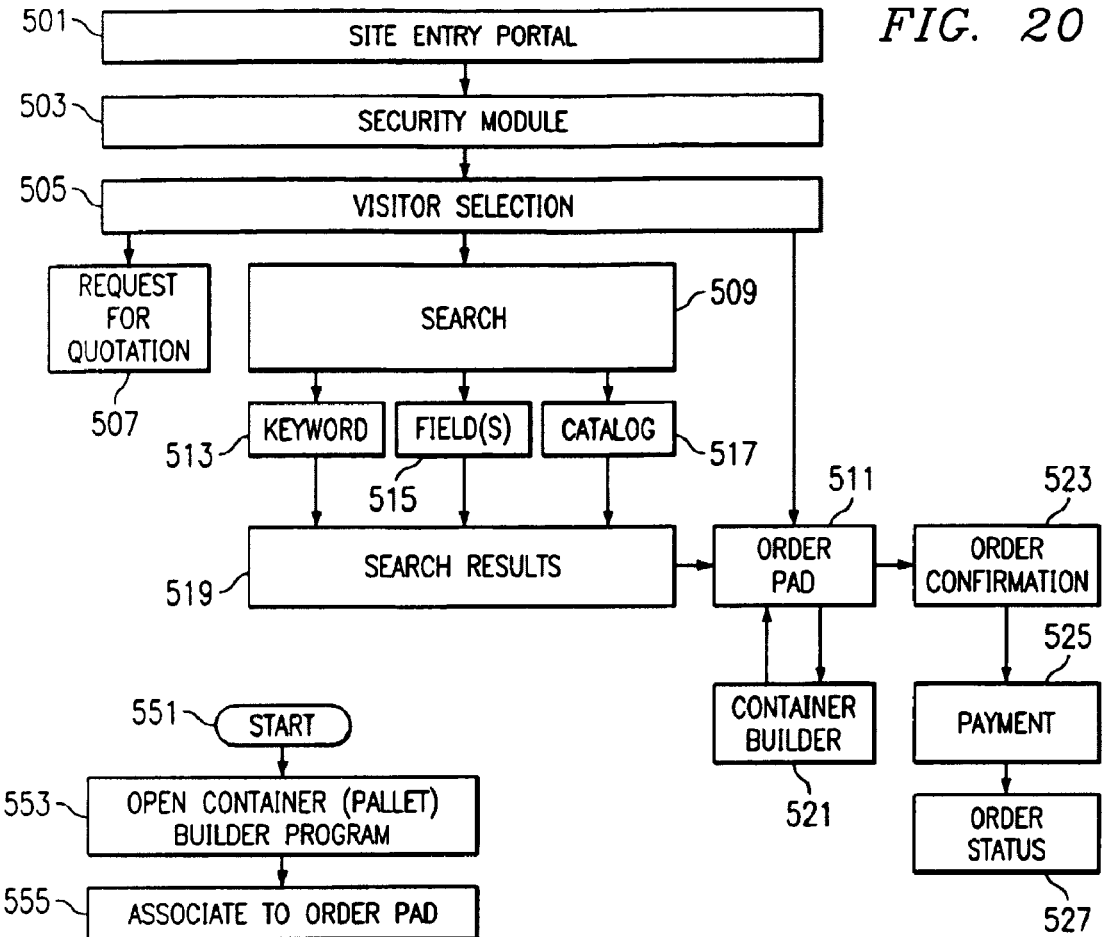
FIG. 20 is a flowchart representation of software modules which enable an Internet site in accordance with the present invention.
Figure 21:
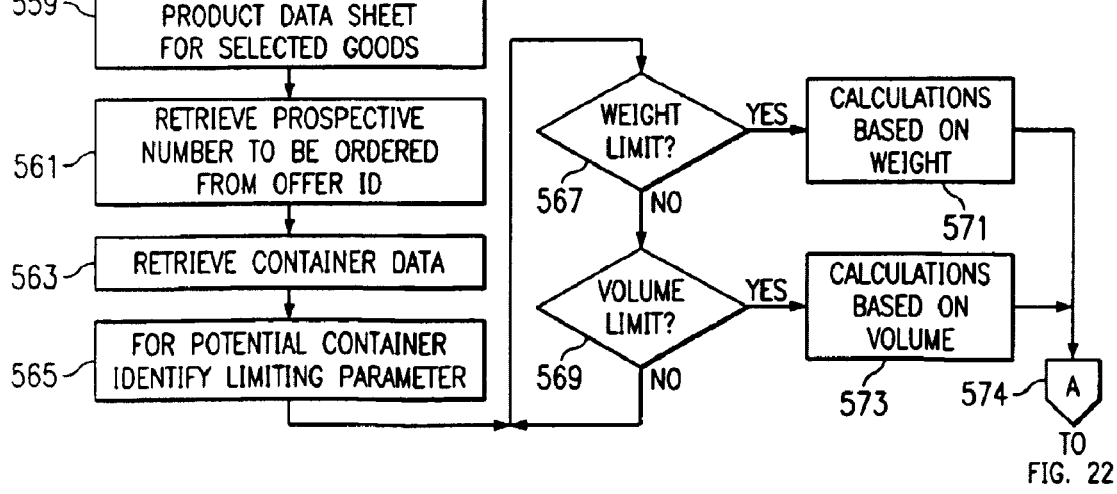
FIGS. 21 through 25 are flowchart representations of a container/pallet builder program in accordance with one embodiment of the present invention.
Figure 26:
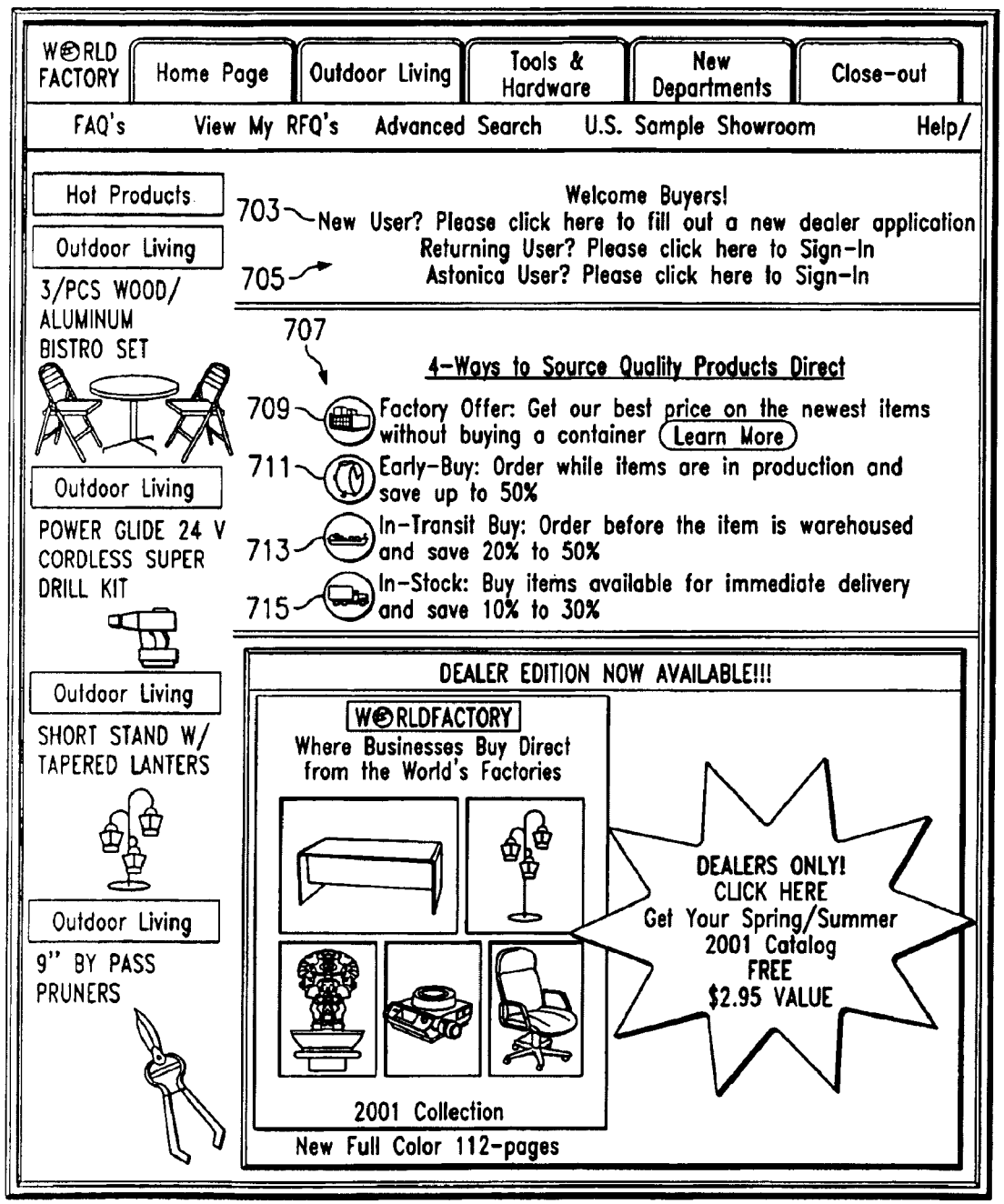
FIG. 26 is an exemplary buyer's portal in accordance with one embodiment of the present invention.

FIG. 20 depicts in high level overview and block diagram form a software system which implements one embodiment of the present invention. In accordance with block 501, a site entry portal is provided to allow users to utilize an Internet connection to access a commerce site constructed in accordance with the present invention. An exemplary site entry portal is depicted in FIG. 26. Next, in accordance with block 503, a security module is utilized to selectively allow access to the commerce site. In accordance with block 505, the commerce site waits for visitor selection of an action. A variety of alternative actions are presented to the user including a request for quotation system 507 which will be described in further detail below, a search engine 509, and an order pad 511. Search engine 509 includes key word search module 513, fields search module 515, and on-line catalog 517. An exemplary on-line catalog page is depicted in FIG. 27. The user may move from search results 519 to order pad 511 in order to prepare an order for submission. The order pad 511 is a system which allows a user to test various potential order scenarios. The user may mix and match products, select price points, and change order volumes for the products. The order pad is operatively coupled to a container (or pallet) builder program 521 which is utilized to visually represent the selections made by the operator in the order pad module 511. The container builder program 521 is utilized to visually represent to the potential buyer the relationship between the items on his or her order pad 511 and the production process of one or more factories as well as the shipping process of one or more ports. This will be described in greater detail below. The potential buyer may move between order pad module 511 and container builder 521 iteratively in order to study and configure his or her order in relation to real world constraints (such as weight and/or volume) of standardized shipping containers.

This is important for the present invention since the user is offered an opportunity to purchase goods well in advance of production or shipping. Providing a visual display which relates the potential order to real-world production information and real-word shipping information should and will give the potential buyer a greater sense of comfort and control in entering into a commercial arrangement for goods that may not even have been manufactured yet. Once the potential buyer has decided upon the contents of the order, he or she may proceed to an order confirmation module 523 which confirms the information related to the order. Next, the potential buyer may proceed to the payment module 525. Thereafter, the customer may revisit the site in order to check order status by accessing the order status module 527.

FIGS. 21 through 25 depict the container (or pallet) builder program in accordance with one preferred embodiment of the present invention. As is shown, the process starts at block 551, and continues at block 553, wherein the container (or pallet) builder program is opened. As a part of the opening, the variables associated with this program are either initialized or retrieved. In accordance with block 555, the container builder program is associated with a particular order pad of a particular potential buyer. It is important to note that the present invention operates dynamically to aggregate information from a number of actual buyers and potential buyers. Each potential buyer will view his or her order pad and associated container (or pallet) builder program icon. This view is a personal and private view, and cannot be accessed by other potential buyers; however, the graphical information generated by this container builder program takes into account the order information from a large number of other actual buyers. In other words, the container builder program generates iconographic and textual material which represents to the potential buyer information which is combined with order information from other actual buyers. The other actual buyers are associated with the particular order pad due to similarities in the product being ordered or the shipping port or the containers potentially being utilized.

Next, in accordance with block 557, the container builder program receives the offer ID associated with the goods from the order pad. This should contain information identifying the item, its price, and its time availability, whether that be in terms of production availability or shipping availability. Next, in accordance with block 559, the container builder program retrieves and opens a product data sheet for the selected goods. An exemplary product data sheet 751 is depicted in FIG. 28 and will be described below in greater detail. In accordance with block 561, the program retrieves the prospective number of items to be ordered from the offer ID. Then, in accordance with block 563, the container builder program retrieves container data associated with either the product or the shipping port.

Next, in accordance with block 565, the container builder program examines the potential shipping container to identify limiting parameters associated with the container. For example, the particular potential container may be near its weight limit (due the inclusion of relatively heavy items) but not very near its volume limit.

Accordingly, in this scenario, the weight factor would be the limiting parameter. Alternatively, the container may be very near its volume limit (due to the inclusion of a great number of relatively light articles), but not very near its weight limit. Accordingly, in this situation, the limiting parameter would be the volume parameter. In accordance with the preferred embodiment, as is depicted in blocks 567, 569, 571 and 573, the container builder program analyzes the container in order to identify the limiting parameter. Further calculations demonstrating amount of space/weight available in the container will be based either upon the weight parameter or the volume parameter depending upon the particulars of each container. In order to facilitate a weight-volume analysis, the program calculates a weight per cubic volume for heavy items and then compares that measure to the maximum which may be allowed in the container. Once it determines that the weight limit will not be exceeded, it will move forward on a volume analysis. If the program determines that the weight threshold would be exceeded, it calculates a modified volume measure for the article, and moves forward using that metric. Essentially, it is looking for the most favorable weight/volume denominator to maximize the loading of the container.

Figure 22:
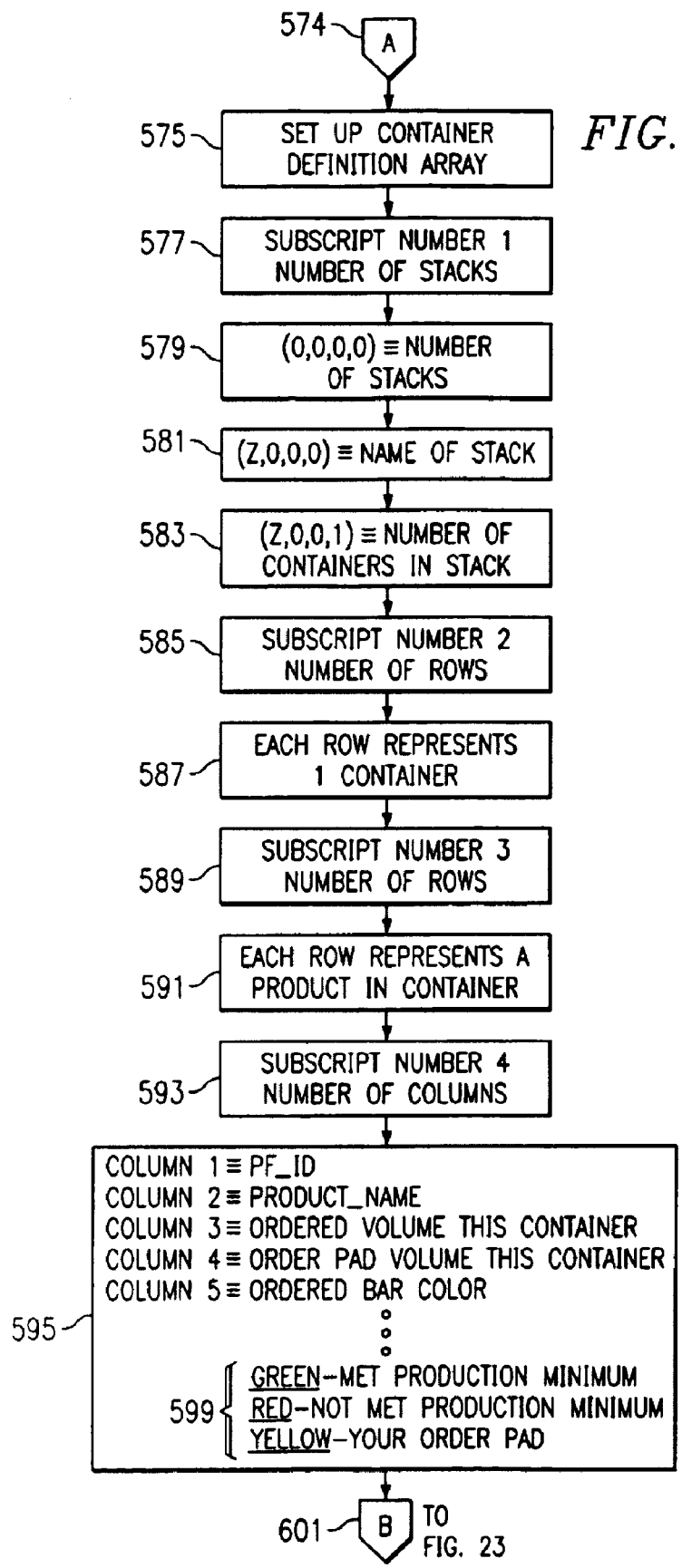

In some instances, a situation may require the depiction of a number of containers, one stacked upon the other. In this case, the container builder program must generate a container definition array in order to keep track of the information. Turning now to FIG. 22, in accordance with block 575, the container builder program sets up the container definition array. The first step is depicted in block 577, wherein a subscript number 1 is created which identifies the number of container stacks. In accordance with blocks 579, 581, and 583, this subscript number 1 includes information which identifies the number of stacks, the name of the stack, and the number of containers in each stack. Next, in accordance with block 585, subscript number 2 is created which represents a number of rows. In accordance with block 587, each row value for subscript number 2 represents one container. Then, in accordance with block 589, subscript number 3 is created which generates a number of rows associated with each container. As is set forth in block 591, each row of subscript number 3 represents a product in the container. Then, in accordance with block 593, subscript number 4 is generated which represents a number of columns. Each column contains information related to each product within a particular container. For example, column number 1 represents the product ID. Column number 2 represents the product name. Column number 3 represents the ordered volume in this container. Column number 4 represents the order pad volume in this container. Column number 5 represents the ordered bar color. This is all depicted in block 595.

As shown in block 599, three colors are available to be associated with column number 5 of subscript number 4. A green color represents that a particular product has met production minimums. A red color indicates that a particular product has not met production minimums. A yellow color indicates that this item is from the particular potential buyer's order pad. In other words, the color yellow is associated with the order pad module 511 of FIG. 20 and associated container builder module 521. It is the use of this yellow coloration which allows the potential buyer to sequentially examine a variety of scenarios. The use of this color allows the potential purchaser (1) to visually understand the impact of his or her potential order upon the meeting of production minimums in order to "close" an offer associated with a production run which has not yet been made, and (2) to fill one or more containers which are not yet filled. These two considerations are relatively important. A small buyer may adjust his or her ordering behavior based upon the information obtained through the iterative use of the order pad module and associated container builder module in order to "accelerate" either the production or shipping of particular products. He or she may decide to increase the volume of his or her order in order to allow the aggregation of that order with all other orders to trigger a production run. This is particularly useful in the context of a buyer who is a member of an affiliation of buyers, such as is found in a cooperative or buying group. Alternatively, he or she may increase his or her order so that it is aggregated with other orders in order to fill a shipping container. Once a production run minimum is met and thus "triggered," the production facility may commence production of the product. Also, once a shipping container is "filled" the container is then available for further processing and eventual shipment. Accordingly, in the present invention, a great number of potential buyers and actual buyers are placed in a position of power relative to both production timing and shipment timing.

Figure 23:
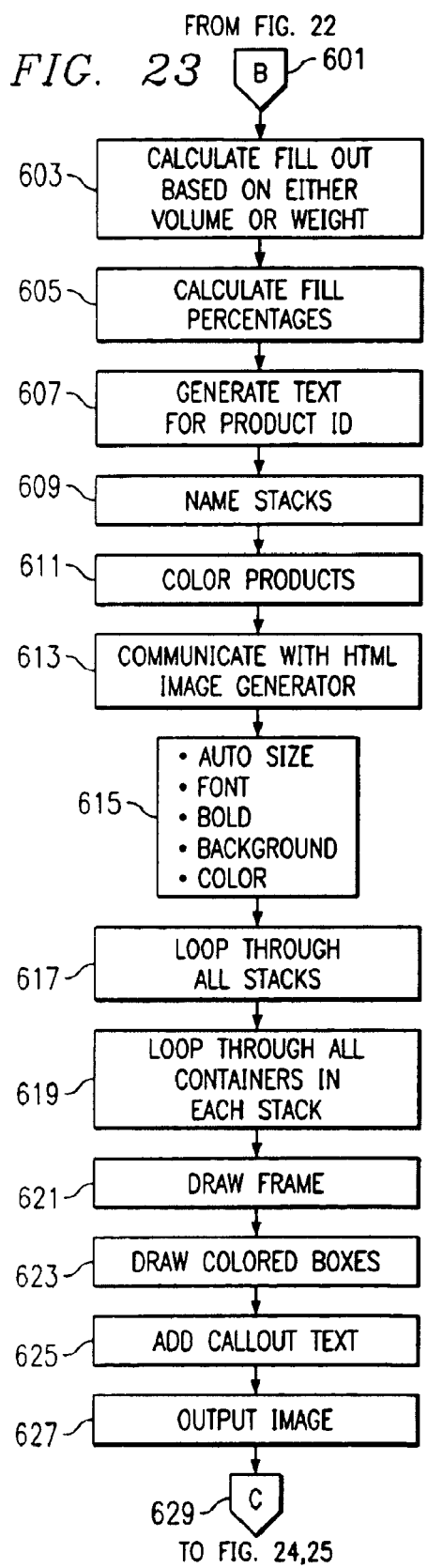

The process continues at FIG. 23, and block 603, wherein the container builder program calculates the "fill out" of a particular container based upon either the volume constraint or the weight constraint. This "fill out" provides the potential buyer with textual information, which supplements the visual information, in order to inform him or her of the percentages filled container volume associated with his or her potential orders. Next, in accordance with block 605, the container builder program calculates the fill percentages associated with the potential order from the order pad. Then, in accordance with block 607, the container builder program generates text for the product ID. In block 609, it names the stacks; in block 611, it colors the products and the stacks. As stated above, a green color indicates that a particular product has met or "triggered" the production minimums. A red color means that the particular product has not yet met or triggered the production minimums. A yellow color indicates the portion of a container which is associated with a potential order on the buyer's order pad. Then, in accordance with block 613, the container builder program communicates with an HTML image generator. Then, in accordance with block 615, the container builder program passes particular information to the HTML image generator such as the requirement for "auto sizing," a font selection, the use of bold, the background colors, and the color information (green, red, or yellow). Then, in accordance with block 617, the container builder program utilizes the container array previously established and loops through all the stacks. In accordance with block 619, it loops through all the containers in each stack. In accordance with block 621, it draws the frames. Then, in accordance with block 623, the boxes are colored. Next, in accordance with block 625, the call out text is then added to the boxes. In accordance with block 627, the image is outputted.

Figure 24:
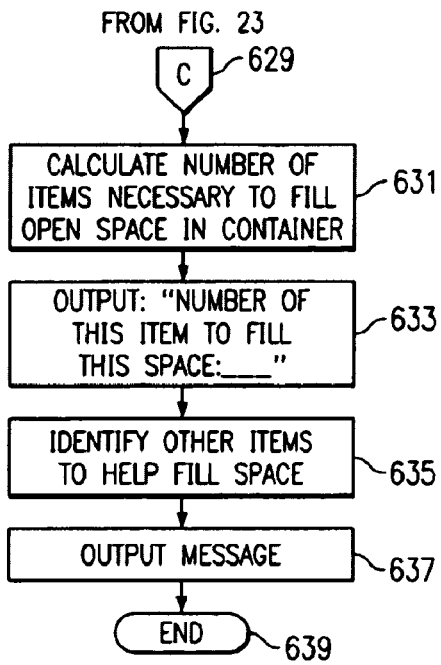
Figure 25:
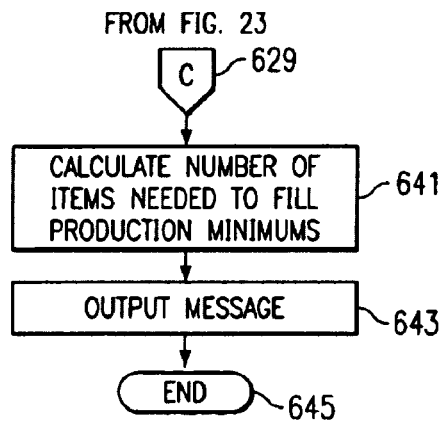

Next, in accordance with FIGS. 24 and 25, additional information is provided to assist the potential buyer in better understanding the status of the particular container. While an icon is generated which represents the filled space and the free space, the container builder program goes further to provide textual information to the potential buyer which allows him or her an opportunity to evaluate the possibility of increasing his or her order in order to fill the container space. With reference first to FIG. 24, the container builder program calculates the number of items necessary to fill the open space in the container, in accordance with block 631.

This represents a calculation based upon the items which are in the order pad of the potential customer. In other words, the program projects and provides to the buyer the number of units of product necessary to fill the space. For example, if the potential buyer is examining the purchase of solar lawn lighting, the program will calculate the number of additional units of the same solar lighting product which would be necessary to fill the open space in the open container. In accordance with block 633, the container builder program provides a message as follows: "number of this item to fill this space:_." Next, in accordance with block 635, the container builder program identifies other items (but not the items on the order pad) which could be used to help fill the space. These items may be selected based upon items on the order pad, products similar to the items on the order pad, or it may be a listing of all products shipped from that port, or of all products available from a factory, or from a consolidation factory. The listings of related products is prepared by the intermediary based upon marketing consideration and the active constraint on the supply side. For example, if a buyer is looking at one type of solar lawn lighting product, he or she may be interested in buying other types of solar lawn lighting products, or other types of lawn products in general. The container builder program will identify the other products which are associated with that port facility and enumerates those in the form of an offer or group offer. These products may be the products of a single factory, but they also may be the product of a number of factories. The common requirement is that they all be shipped from a single port so that they may indeed be "combined" in order to fill container space economically. In accordance with block 637, the container builder program outputs this message, and the process ends at block 639.

Simultaneously, in accordance with FIG. 25, if there are any products on the order pad which have not yet met the production minimum requirements, in accordance with block 641, the container builder program calculates the number of items needed to fill the production minimums for that particular product. Then, in accordance with block 643, that number is output, and the process ends at block 645.

FIG. 26 is an exemplary site entry portal 701 in accordance with one embodiment of the present invention. This site entry portal 701 corresponds to block 501 of FIG. 20. As is shown in FIG. 26, the site entry portal 701 includes active areas within the Internet page which may be utilized to address through "links" other portions of the Internet site and associated software. For example, there is a "new user" active area 703, which routes new users to portions of the site and associated software which gather the necessary information to evaluate and qualify new users. Alternatively, there is a returning user active area 705 which is utilized by returning users. This site will route returning users to a security module such as security module 503 of FIG. 20. In the site entry portal 701 of FIG. 26, there are a number of iconographic representations of the stages of production and shipping. The icon 707 include icon 709 which is a iconographic representation of a factory. This is representative of a "factory offer." This corresponds to an offer made by a factory or a supplier or the intermediary acting to qualify for the benefit of the buyer's potential sellers to sell a particular product at a particular price, provided that production minimums are met. In accordance with the general concept of the present invention, this represents the lowest price available for the goods. This is true because the manufacturer has eliminated most or all of the risks associated with manufacturing the goods. Firm financial commitments are obtained for the minimum number necessary for a production run prior to any actual manufacturing by the manufacturer. Icon 711 is an iconographic representation of an "early-buy" offer. This corresponds to the offering of items which are in production but not yet finished. In accordance with the general concepts of the present invention, this price is higher than the "factory offer" price as the factory or supplier has experienced additional risk by the commencement of manufacturing. Icon 713 represents an "in-transit buy." This corresponds to the offer of product which is in actual transit from the factory to a distribution center. This price is higher than the "early buy price" and the "factory offer price" in accordance with the general concept of the present invention. Icon 715 is representative of a "in-stock" offer which corresponds to an offering of products which are in stock at a distribution facility. These items have a generally higher price than the "in-transit buy" offers, the "early-buy" offers, and the "factory offers."

FIG. 27 is a depiction of an Internet page corresponding to one page of a number of pages of an on-line catalog. Catalog page 717 includes a product listing 719 which includes an iconographic representation of a number of products such as products 721, 723, 725, 727, 729, 731, and 733. Each of these products has associated with it an icon 741, 743, 745, 747, 749, 751, 753 which is representative of the type of offer. In the example of on-line catalog page 717, all the items are "early buy" offers, which means that these are items which are currently in factory production. On other pages of the catalog, there may be "factory offer" icons utilized to indicate that a product has not yet initiated its production run. Still other alternative products may be "in-transit" buys which indicate items which are being shipped. Alternatively, some items may carry an "in-stock" icon representative of items which are currently in stock in the distribution facility.

Each object also has associated with it a textual description of the product. A number of "fields" are provided to define data associated with each of the products. For example, there is a "price" field 742, a "minimum order" field 744, a "arrival date" field 746, and a "quantity available" field 748. For example, with respect to the ten inch metal transplanter, the price is forty-five cents. The minimum order is one. The arrival date is Mar. 15, 2001; and the quantity available is 2,160.

Each product being offered also has associated with it a product data sheet, such as exemplary product data sheet 751 of FIG. 28. This corresponds to block 559 of FIG. 521 in which the container builder program retrieves and opens the product data sheet for the selected goods on the order pad. As is shown in FIG. 28, product data sheet 751 includes product information 753, product dimensions information 781, product weight information 787, product shipping information 783 and shipping information 785. Product information may include a number of fields which define the product, such as: product category field 761, product SKU field 763, uniform product code field 765, unit of measure field 767, item name field 769, item description field 771, primary material field 773, other material field 774, color field 775, size field 776, other field 778, recommended price field 777, and MSRP field 780.

The product dimensions include dimension information for the assembled product, the package, the case, and the master carton. In the example of the product data sheet of FIG. 28, the assembled dimensions are represented as W cubic inches or W cubic centimeters. The package dimensions are represented as X cubic inches or X cubic centimeters. The case length is represented as Y cubic inches or cubic centimeters. The master carton cubic dimension is represented by Z cubic inches or Z cubic centimeters. For each product, the cubic dimension of the product and/or packaging is vital and must be correct in order to allow proper functioning of the container builder program which to keeps track of the degrees to which a container or other standard shipping space is "filled."

The weight information 787 includes net weight, gross weight, gross case weight, and gross master carton weight. The shipping information 783 includes maximum quantity for container volume, the package type, the quantity per case, and the quantity per master shipping carton. The shipping information includes a schedule of charges for shipping to particular zones.

When the container builder computer module is operating, it must pull accurate information relating to both the weight and volume of each particular product which is prospectively included in a particular container. Ordinarily, the customer would not see the product data sheet.

FIG. 29 is an example of the types of information which is made available to the potential customer. Internet page 801 of FIG. 29 represents the information relating to a copper patio torch set 805. The copper patio torch set 805 is pictorially depicted through image 807. Descriptive text 809 is provided adjacent the pictorial representation 807. The type of offer is indicated by icon 803 as an "early buy" offer. This means that production has begun so a particular price point associated with the copper patio torch set 805 has been set based upon the amount of risk associated with the production run. The product has associated with it an offer number 811 and SKU number 813. It also has associated with it an arrival date 815 and a quantity available 817. Additionally, there are fields which establish the minimum order 819 and the number of multiples in the order. A price 823 is also provided for the product, and this is based upon the stage at which it is in the production cycle. A field 825 is provided to allow the potential buyer to enter a number defining the "order quantity." Additionally, an icon 827 is provided which allows the user to add this item to an order pad. Ancillary information 829 is provided which identifies other items which are going to arrive in the same "container." As is shown, items 831, 833 are also being shipped in the same container. The quantity available field 835 indicates the quantity available of each of these items. This encourages the potential buyer to place orders for other items in order to speed the filling of the particular container, and thus speed the delivery of the product to him or her.

FIG. 30 is a graphical depiction of an Internet page which is utilized by a manufacturer to establish the metrics associated with a production run. As is shown, a variety of fields are provided for information, including: factory identification field 835, document last edited field 855, offer status field 857. Additionally, the container is identified by container number at container number field 859. The items which are associated with a particular container or containers are then grouped. Three items are shown in the view of FIG. 30 including items 861, 863, 865. Each one of these items has associated with it a product number and product name. Additionally, there are a number of fields which must be completed by the factory or supplier or the intermediary in order to "define" the offer. There is a minimum production quantity field 862, a minimum order quantity field 864, a cost field, and a maximum order quantity field. Additionally, there is an earliest/actual production date field. For example, product 861 is a short stand with tapered lanterns. The minimum production quantity is 416 units. The minimum order quantity is one. The cost in terms of dollars per unit of measure is one dollar. The intermediary may alter the cost to the buyer to provide a profit for the intermediary. The maximum order quantity is 1,500. The earliest/actual production date is Apr. 1, 2001. This product has associated with it four different prices. Each is represented by an icon. One is a "factory offer" price of $22.90. Another is an early buy offer in the amount of $26.80. The next is an in-transit offer in the amount of $28.95. Finally, there is an in-stock price of $35.65.

The Web page 851 of FIG. 30 also includes information pertaining to the container in block 867. A comment section 869 is provided. Next, shipping and payment information is provided. For example, the estimated FOB date of departure is provided by the manufacturer at fields 871. Then, the FOB port is identified at field 873. The estimated distribution arrival date is then provided in fields 875. Offer acceptance information 877 is provided at fields 879 which provide an "offer expiration date" which is set by the factory. Then, the payment terms are established for the transaction. The manufacturer can select one of a number of payment methods including letter of credit, bank transfer, cash on delivery and consignment. The information concerning the identity of the supplier and payment requirements are maintained in a separate database. The data is gathered with the form of FIG. 35. There is also a field to identify whether or not this is a regularly established production run. Button 883 is provided to allow the factory to enter the offers to the Internet commerce site. FIG. 36 is an exemplary product listing for a exemplary manufacturer. It depicts the products which are offered by a particular manufacturer through the intermediary and the internet commerce site.

FIG. 31A through 31D depict various exemplary scenarios utilizing the container builder program of the preferred embodiment of the present invention. These illustrate the depiction of production and shipping information in the form of an iconographic representation of one or more containers, an identification of the products contained in the containers and a color coding utilized to identify the status of the production run and further to identify the products on an order pad as they relate to the other items in a potential container.

Figure 31A:
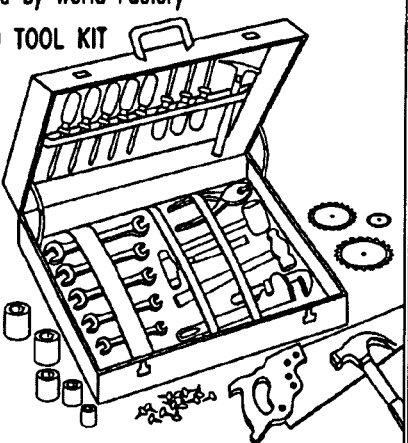

With reference first to FIG. 31A, a user is examining product 903 which is a 531 piece pro tool kit. There is a visual representation of the tool kit and descriptive text. The Web page also provides the offer number, SKU number, offer expiration date, arrival date, production run minimums, minimum orders, multiples, and price information. There is an order quantity field 905 and a "add to order pad" button 907. The view of FIG. 31 depicts the situation prior to the selection of product 903. An icon 911 is provided which visually represents a single container identified by text 913 as "container number one." Additionally, text 910 is provided which identifies the various products which are going to be shipped together within container number one. With the exception of portion 925, all the items within container number one are coded green which indicates that the production run minimums have been met. Portion 925 is coded yellow to indicate that this item 929 which corresponds to a 121 piece drill and driver set is on this particular buyer's order pad and has previously been entered or "added" to the order pad.

The portion 927 within container icon 911 is white which represents open or "free" space within the container which is available for use. Accordingly, the icon 911 and text 910 provide a summary visual and textual explanation of the status of container number one. It appears that container number one is only partially filled (about two-thirds filled). There are ten different products being shipped in this container. The text 910 includes an identification in each of these ten products. Each product is identified by product number and product name.

Additionally, next to each product name, there is a parenthetical indication of a percentage. This corresponds to the percent of the container space which is filled by this item. For example, product number 60202212 is identified as a "wander saw replacement blade." It has associated with it a percentage in parenthesis of "3%." This means that of the total container space that has been filled with this particular product represents three percent of the container space. In this example, nine out of the ten products are products which have been ordered by individuals other than a person associated with the order pad of this Web page 901. Only the 120 piece drill and driver set is on the order pad for this potential buyer. This is identified by product number 60202342. Next to the name of the goods is a parenthetical indication of "13%." Accordingly, thirteen percent of the container space is filled with this particular product. One hundred percent of this product is on the order pad of the potential buyer which has set up this page. Accordingly, portion 925 of the icon 911 is shaded yellow to indicate its association or affiliation with the particular order pad of this particular potential customer. Portion 925 is surrounded by green color which also indicates that this particular item has met its production run minimum.

Under this scenario, all that is required before the container number one can be shipped is the filling of free space 927. This may be filled by the potential buyer or by any other potential buyer. The number of potential buyers may be from one to some number which may be defined by the intermediary/administrator or by affinity or affiliation among the buyers. Their input is aggregated in a manner which fills up the remaining free space 927 of the container which is visually represented by the white or uncolored space of portion 927 within the rectangular icon 911. In order to facilitate filling of this free space 927, the container builder program automatically generates (an administrator moderated groupings) a listing of other products which can be utilized to "help fill open container space." This is provided under the header 931 in the form of a listing 933 of eleven other products by product number and product name which can be utilized to fill the free space. Each product has associated with it a minimum order number and a minimum order quantity. In this manner, the potential buyer is incented to examine the other products to determine whether or not he or she may want to attempt to fill some of the remaining free space 927 of this particular container as represented by icon 911 in order to accelerate the shipment of product. In the view of FIG. 31A, the 531 piece pro tool kit has already been ordered by other buyers and represents twenty-six percent of the container space. In this example, should the potential buyer elect to enter an order quantity at field 905 and click on the "add to order pad" icon 907, his or her potential order of the 531 piece pro tool kit would be added to the iconographic representation of container number one. His or her order would reduce the total available free space 927. Additionally, his or her potential order would show up in portion 941 which is representative of the 531 piece pro tool kit which have already been ordered. His or her potential order would be coded yellow, surrounded by green, to indicate the amount entered on the order pad, its association to the potential buyer, and that it is for a product which has met production minimums.

FIG. 31B depicts another scenario in which two containers, named container number one and container number two, are represented by icons 1001, 1003. Container number one would be completely full if the potential purchaser places the order from his or her order pad. This can be visually understood since portion 1005 within icon 1001 representative of container number one is coded with the color yellow, surrounded by green. This indicates that the order has not been placed (and is merely being contemplated as part of an order on the order pad) for an article for which production minimum has been met, indicated by the green color surrounding the yellow color of portion 1005. It appears that, should this order be placed, container number one will have three types of goods within it. These include a 135 piece tool set, a 531 piece pro tool, kit, and a utility cooler with radio. The prospective purchaser which has opened the order pad would be responsible for the majority of the utility cooler with radio product. This is indicated by the percentages carried in parenthesis next to the text which describes the product. In this particular instance, the parenthetical material reads: 68%/62% OP. This means that the utility cooler with radio takes up (by either weight or volume) 68% of container number one. The potential purchaser would take up 62% of the container capacity with his or her order should he or she elect to place the order for the utility cooler with radio. The potential purchaser has no part of the order for the 135 piece tool set or the 531 piece pro tool kit as indicated by the parenthetical material which reads respectively: (6%/0% OP) and (26%/0% OP).

In FIG. 31B, container number two, which is represented by icon 1003, has a substantial amount of free space 1007 which is coded as being free space by being colored white. There are seven products which are currently scheduled for shipment in container number two. The potential buyer has utilized the order pad to potentially add the 121 piece drill & driver set to the seven other items. This would make up thirteen percent of the container space. This is indicated by portion 1009 which is colored yellow to indicate an association with an order pad, and surrounded by a green border to indicate that is for an item for which a production minimum has been met.

Should the potential buyer actually fill the order for the two items on the order pad, he or she would completely fill the remaining space available in container number one, and would contribute to filling thirteen percent of the space of container number two. Other potential buyers would thereafter see container number one as being completely filled. This would be indicated by the coloration of the entire space within the outline of the rectangle which defines container number with the color green. No portion would be shown in yellow to other potential purchasers once the order has been placed. The color yellow is only associated with a particular order pad for a particular potential purchaser. Likewise, portion 1009 of container number two would not be shown in yellow; instead, it would be shown in green to other potential buyers as filling that space. For the other potential buyers, their potential purchases from the order pad would be colored yellow to indicate their own personal impact upon the production and/or shipping of the product.

In other words, each potential buyer has a private view of the aggregated data which includes potentially the item on his or her order pad as part of an order which may be shipped in particular containers. No other buyer has access to this private view of the order pad. However, all buyers have a view of the "aggregated" confirmed orders. These are not identified to any particular individual, so privacy and commercial secrecy concerns are not raised.

Figure 31C:
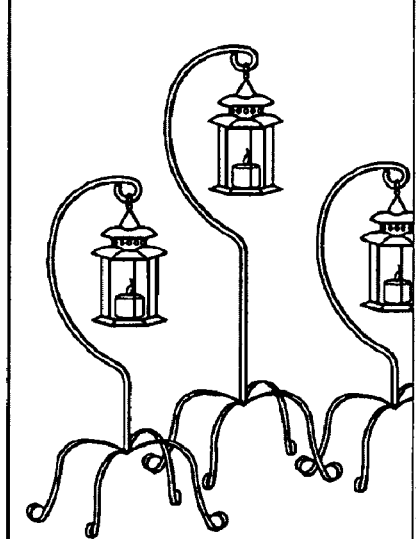
Figure 32C:
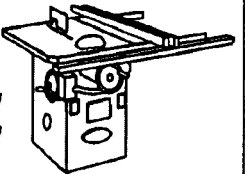

FIG. 31C depicts an alternative scenario. This scenario differs from the previous scenarios in that there are number of containers which are "stacked" in this scenario. As discussed above and in the flowchart representation of the container builder software, a module in software exists for setting up a container definition array. This process is found at FIG. 2 in blocks 575 through 601. As is shown in the view of FIG. 31C, containers one through four are in a "stacked" configuration. These are represented by rectangular icons 1021, 1023, 1025, and 1027. The four containers are maintained in partially overlapping relationship to one another so that at least a portion of each container is visible. As is shown in this example, portions 1031, 1033, 1035, 1037 are maintained in a yellow color to indicate that these items are from the potential purchaser's order pad and do not represent confirmed orders. As you can see, at least a portion of each container is visible to render visible the yellow portion as well as the surrounding green portion. This indicates that for the particular item, the copper patio torch set, the production minimums have been met.

The text portion 1041 associated with this order pad identifies the item ID number 50401074: copper patio torch set. The parenthetical material provided next to the product name reads as follows: "4Cnts/88% OP." This indicates that, of the four containers, eighty-eight percent of the container capacity is going to be filled with the order that is being contemplated by the buyer. Additionally, in this example, the proposed order of copper patio torch sets extends into container number five which is identified by icon 1029 which is rectangular in shape and which includes portions 1039, 1045, and 1049. Portion 1039 is yellow. It is surrounded by a green border. This indicates that the production minimums have been met. Portion 1045 is also yellow, bordered with green; however, this is directed to a different product, namely 50401056:conductors three piece lantern set. This is described by textual portion 1047. The parenthetical material carried next to the description reads as follows: "25%/25% OP." This means that this potential order represents twenty-five percent of the volume of container number five. The text portion 1043 is provided for portion 1039. It identifies the product as the copper patio torch set. For container number five the parenthetical material reads: "39%/39% OP." This indicates that, for this container number five, the potential buyer would be filling thirty-nine percent of container number five with the copper patio torch set product.

FIG. 31D depicts yet another alternative scenario. This scenario is similar to the scenario of FIG. 31C with one exception; namely, the potential order for the conductor three piece lantern set is depicted in icon 129 outlined in red. This indicates that this product has not yet met production run minimums. Accordingly, portions 1045 is completely surrounded in red and this should provide a clear indication to the potential buyer that, while he or she may desire to order this product, additional orders from him or her or third parties will be necessary before the production minimum is met. Once the production minimum is met, the red border for portion 1045 will be replaced with a green border to indicate that the production minimum numbers have been met.

FIGS. 32A through 32D deal with requests for quotations. In accordance with the preferred embodiment of the present invention, the Internet commerce site includes a "request for quotation" function in which customers communicate through the trusted intermediary to factories regarding the manufacturing of potential products. In this way, those who buy the goods can make concrete and specific recommendations to the manufacturers in the form of a request for a quotation. The factories will evaluate the materials provided by the potential customer and determine whether or not they care to offer the goods having the requested attributes. If the manufacturers desire to offer the goods, they will respond to the request for quotation with a specific quote which is then communicated back through the intermediary to at least the customer that made the request; additionally, in some circumstances, the request for quotation may be available to all potential buyers. In this way, the manufacturer does not have to "guess" about what product attributes are truly desired by its customers. The customers (which are typically retailers) have a better feel for what is actually selling at their retail establishments. Their "request for quotation" represents' the passage of very important and valuable commercial information to the manufacturer. The manufacturer, especially one that is headquartered abroad, may have a hard time understanding a regional market, such as Europe or North America. They may not know what products are desirable to the American and/or European customers and thus unable to match product features to customer desires.

FIG. 32A is a depiction of an Internet Web page 1501 which provides summary information concerning requests for quotations. As is shown, a plurality of active regions 1503 are provided to allow the user to perform other operations unrelated to the request for quotation. These may include tracking recent orders, viewing or editing shipping address information, editing a customer profile, changing a password, completing a credit application, or logging out. Still another block of active areas 1505 are provided which are specifically dedicated for the request for quotation function. For example, one active area may allow the user to "view factory offers in response to your RFQ's." Another active area may allow a user to "view all submitted RFQ's." Finally, another active area may allow a user to "submit a new RFQ." In the view of FIG. 32A, the user has selected to view "factory offers in response to your RFQ's. This is depicted by the text portion 1507 which identifies three specific responses to pending RFQ's. Each of these is an active area and represents a link to another Web page which contains more detailed information. Below block 1507 two particular items have been "opened."

These include items 1509, 1511. Item 1509 relates to RFQ number two, while item number 1511 relates to RFQ number nine. RFQ number nine is directed to a "10" wood working cabinet table saw." The pricing associated with this offer is a "factory offer," which corresponds to the lowest price available for the goods, since production has not yet commenced. As is shown, the offer price for the product is $400.00. The offer, at this price, closes on 15 May 2001. The order minimum is 100 units. The projected arrival date is 17 Jun. 2001. This information is presented to the individual or company that made the particular RFQ; it may also be made available to all other users of the Internet site. These users may then place their order at the "factory offer" price level before the offer closes on 15 May 2001. An additional block of information 1530 is provided which allows the user to view all submitted RFQ's. In alternative embodiments, this can be restricted to the RFQ's associated with a particular user, or they could represent RFQ's which are open to all users or to a particular group of users such as co-op members or managers of certain chains of stores.

FIG. 32 represents an Internet page 1531 which may be utilized by the customer to respond to the RFQ of item 1511 of FIG. 32A. As is shown, the potential purchaser is responding to the RFQ for the 10" wood working cabinet table saw. The form includes RFQ item offer information 1530 and shipping information 1560. The RFQ item offer information 1530 includes a number of data input boxes with headings. The item heading 1533 is placed adjacent the description 1535 of the item. The order quantity heading

1537 is associated with input box 1539. A price heading 1541 is associated with price box 1543. The maximum order of quantity heading 1545 is associated with maximum order quantity box 1547. The delivery date heading 1551 is associated with date boxes 1553. A comment region 1561 is provided. Shipping information 1560 includes earliest possible FOB delivery date fields 1563, FOB port 1565, offer expiration date 1567, and available terms of sale 1569. A finish button 1571 is provided which may be actuated when the fields are completed by the customer.

The process of generating an RFQ is depicted by Internet page 1601. This is generated by the potential purchaser. This Web page 1601 is essentially an electronic questionnaire which is generated and supplied by the trusted intermediary. The questionnaire will be fashioned for different types of goods. An inventory of questionnaires for a broad range of goods is generated and archived by the trusted intermediary. When a customer desires to submit an RFQ through the intermediary to the factories, he or she asks for the appropriate form, and the completes the form with the necessary information. In the example of Web page 1601, an image of the article 1603 is provided. This may be scanned in if the potential buyer has built a prototype or has an example of how the product should look. The fields include an RFQ number 1605 which is assigned by the intermediary. Additionally, it includes a category field which groups the RFQ into a certain category. In this instance, the category is "power tools." Next, a field 1609 is provided for the product name, and a field 1611 is provided for the product description. In this case, the product name and product description are the same. Fields 1613 are provided to solicit product package requirements from the potential buyer. Fields 1615 and 1617 solicit package dimension information and package type information. Fields 1619 inquire about the primary material requirements. In this case, the primary material is to be steel and the other materials are to be cast iron. Fields 1621 inquire about product requirements. The fasteners, finish, style, and material may be specified by the buyer to fastener-type field 1623, finish field 1625, style field 1627 and material field 1629. A construction method field 1631 is also provided. Required electrical information fields 1633 are provided to solicit power consumption information at power consumption field 1635, voltage information at voltage field 1637, frequency information at frequency field 1639, plug type information at plug type field 1641, and wire gauge information at wire gauge field 1643. The cost and shipping requirements fields 1645 are provided to inquire about required order quantity through the required order quantity field 1647, the required delivery date from the required delivery date field 1649, a request expiration date from request expires field 1651, target unit cost information through target unit cost field 1653, an FOB port information from FOB port field 1655. When all the information is completed, the user clicks the "done" button 1657 in order to submit electronically the RFQ through the trusted intermediary to one or more factories which are in a good position to respond to the RFQ. To some extent, the trusted intermediary will determine which particular factories are suitable for receipt of the RFQ. The intermediary will actually analyze and process the RFQ in order to intelligently match the RFQ with the one or more potential factories which could conceivably produce the goods under the requested constraints.

In accordance with the preferred implementation of the presentation invention, most customers will be dealing with the factories through the trusted intermediary. In many cases, the customers will not have an opportunity to inspect the goods to lower rate for delivery. Accordingly, in accordance with the present invention, a sample showroom is provided at particular locations which allows potential customers to actually inspect the goods if that is a requirement before they place an order. In this situation, the customers would not be required to engage in overseas travel in order to visit the factory. It would merely go to a site under control of the trusted intermediary and inspect the goods at that location. This minimizes the time and costs associated with making buying decisions. As is shown in FIGS. 33A and 33B, a sample showroom may be provided for display of these articles. Web page 1701 represents an exemplary page which announces the availability of showroom space. FIG. 33B is representative of a space reservation form in the form of Web page 1703. It includes an identification of items to be displayed, the monthly rental rates associated with the space, and generates a total cost for such display.

Figure 34A:
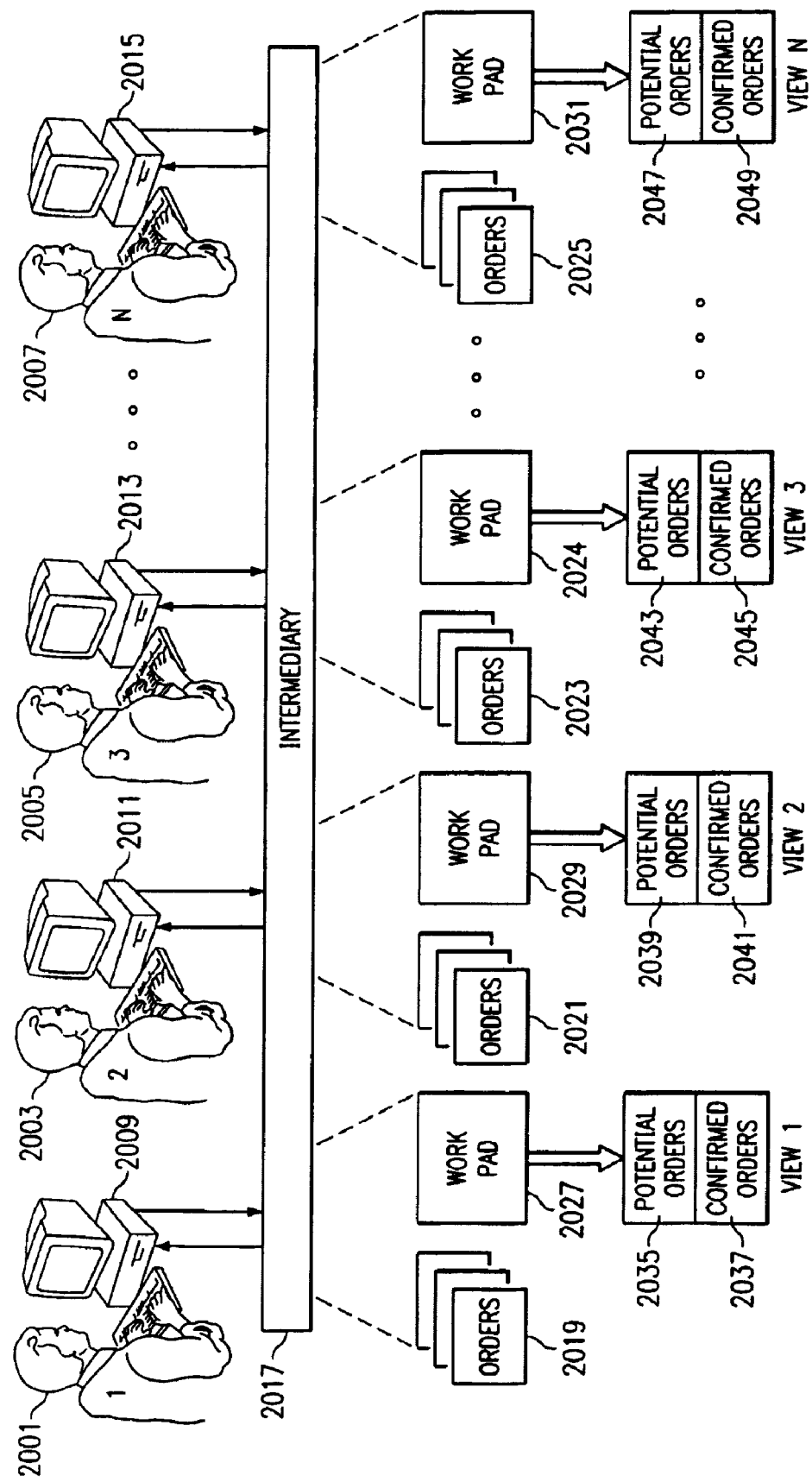

FIG. 34A depicts the aggregation of information from a plurality of potential buyers 2001, 2003, 2005, 2007. Each has access to data processing system 2009, 2011, 2013, 2015 which is communicatively coupled through an Internet connection to intermediary 2017. Intermediary is the trusted entity that is the so-called "market maker" in accordance with the present invention. This entity manages the relationship with the factories as well as with the buyers. As is shown, the interaction by potential customer 2001 through intermediary 2017 results in the generation of confirmed orders 2019 as well as potential orders which are carried on work pad 2027. Likewise, potential customer 2003 interacts with his or her computer 2011 and intermediary 2017 to generate confirmed orders 2021 and potential orders 2029. Likewise, potential customer 2005 utilizes his or her compute 2013 to interact with intermediary 2017 to generate confirmed orders 2023 and potential orders which are carried on a work pad 2024. Potential customer 2007 interacts with his or her computer 2015 and intermediary 2017 to generate confirmed orders 2025 and potential orders which are carried on work pad 2031.

Each of potential customers 2001, 2003, 2005, and 2007 generates his or her own personal and private views (shown as view one, view two, view three, and view n) which is formed in part from potential order information derived from his or her work pad alone, in combination with confirmed order information from all users which have been aggregated by intermediary 2017. For example, potential customer 2001 has access to view one which is composed of potential order information 2035 and confirmed order information 2037. The confirmed order information 2037 is generated from the information of confirmed orders 2019, 2021, 2023, and 2025. In other words, view one is in part private, and in part public. The same is true for potential purchaser 2003. He or she has a personal and private view two which is composed in part of potential order information 2039 and confirmed order information 2041. The confirmed order information 2041 is generated from all aggregated confirmed orders including confirmed orders 2019, 2021, 2023 and 2025. The same is true for a potential customer 2005. He or she has a private view three which is composed in part by personal, private, potential order information 2043 which is derived from his or her work pad 2024. Additionally however, the view three is composed in part from confirmed order information 2045 which is an aggregation of all confirmed order information including information from confirmed orders 2019, 2021, 2023, and 2025. Finally, potential customer 2007 has his or her own private view n which is composed in part from potential order information 2047 and confirmed order information 2049. The potential order information 2047 is derived from his or personal and private work pad 2031. The confirmed order information 2049 is aggregated from all other buyers and includes information from confirmed orders 2019, 2021, 2023, and 2025.

The difference between a private view of data and a public view of data is illustrated in graphical form in FIGS. 34B and 34C. FIG. 34B represents a "private view" which is available to a particular potential purchaser, while FIG. 34C represents a "public view" which is representative of the data which is available to all potential purchasers. It is important to note that, in the preferred embodiment of the present invention, each of these views includes a dominant feature, namely a two-dimensional rectangular icon which is representative of a standardized shipping unit with a fixed volume and weight capacity utilized in shipping. In the embodiment described herein, the standardized volume or shipment is a rectangular container. In alternative embodiments, the standardized volume may represent a smaller unit such as a pallet. In alternative implementations, a three-dimensional rendition of the space may be utilized instead of a two-dimensional rendition of space. As is shown in FIGS. 34B and 34C, the rectangular icon is defined by an X and Y axis. It is uniform in its shape. It is divided into parts which represent different products. These parts are color coded in order to provide additional information about the product, such as whether or not the product has met production minimums, as well as to identify the product as being part of a potential order associated with a particular work order pad.

As is shown in FIG. 34B, the container is divided into five parts, each corresponding to a different product. Parts 2051, 2053, 2055 correspond to three different products. The productions minimums have been met for these products so these portions are colored green. Portion 1057 corresponds to a fourth product. It has a central portion which is colored yellow and it is bordered with green. In the scheme of the preferred embodiment, this corresponds to a product for which production minimums have been met, but for which no order has been confirmed by this particular buyer. Portion 1059 corresponds to yet another product. It includes a yellow central portion bordered by red. In the scheme of the preferred embodiment of the present invention, this corresponds to a product for which production minimums have not been met. Furthermore, no firm order has been placed for this product. This is merely a potential order on a particular buyer's work order pad. The view of 34B represents a private view which is available to a particular buyer. This particular buyer has proposed the inclusion of the product associated with portions 2057 and 2059. Textual portions 2071, 2073, 2075, 2077, 2079 are provided to provide a textual description of the products.

FIG. 34C is a "public view" of the same data. Notice that the private elements from the work order pad have been stripped out. Only the aggregated confirmed purchase order information is provided and visually summarized in this view. As is shown, the icon includes three portions which are coded green. These include portions 2051, 2053, 2055. A fourth portion 2061 is colored white which signifies, in the preferred embodiment, free space within a container. Text portions 2081, 2083, 2085 are provided to describe the three products which are scheduled to be shipped in this container.

In comparing and contrasting these two views of FIGS. 34B and 34C, one can appreciate that a particular buyer will have a private view of the container which is affected by both the aggregated confirmed orders and the information contained on his or her work order pad. This view is not available to another buyer. Another buyer would look at the same container and see the view of FIG. 34C which would not include the information contained in the private work order pad of the other buyer. In a buying group, such as a cooperative, the software allows the blending or modification of these views; a group administrator is equipped with a control interface to allow the set up and control the views that are available to members of the group.

Figure 34D:
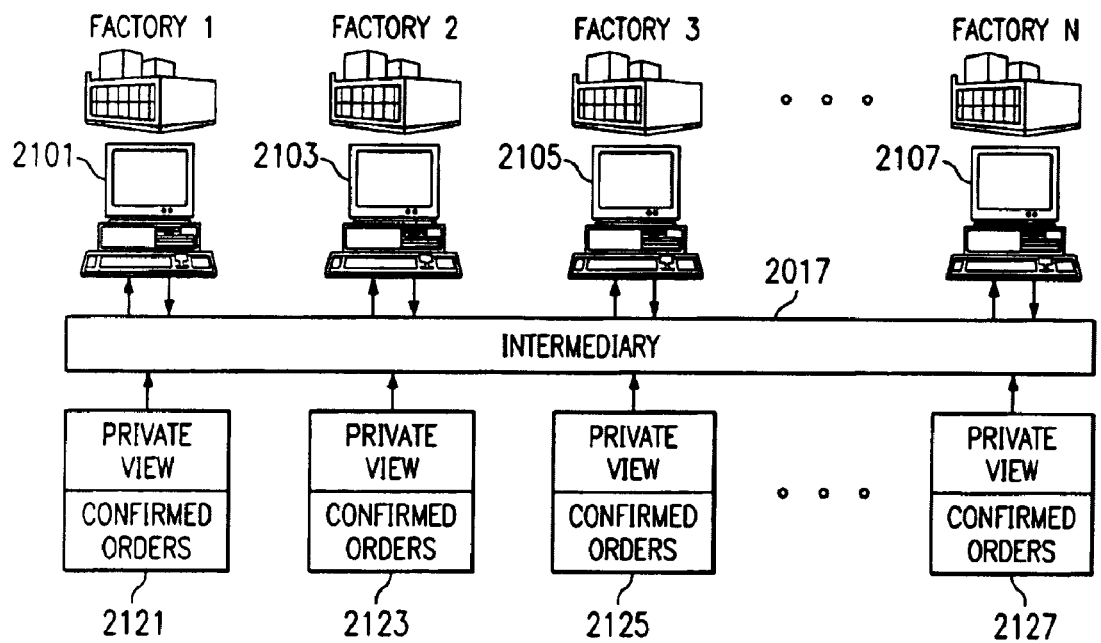

FIG. 34D illustrates another aspect of the present invention. The manufacturers such as factories one, two, three, and N each have access through their own data processing systems 2101, 2103, 2105, 2107, to intermediary 2017. Each of factory one, factory two, factory three and factory N may generate a private view 2121, 2123, 2125, 2127 which is based on confirmed order data only. The view is private insofar as it provides information relating to that factory's products, but not to the products of other factories.

Figure 34E:
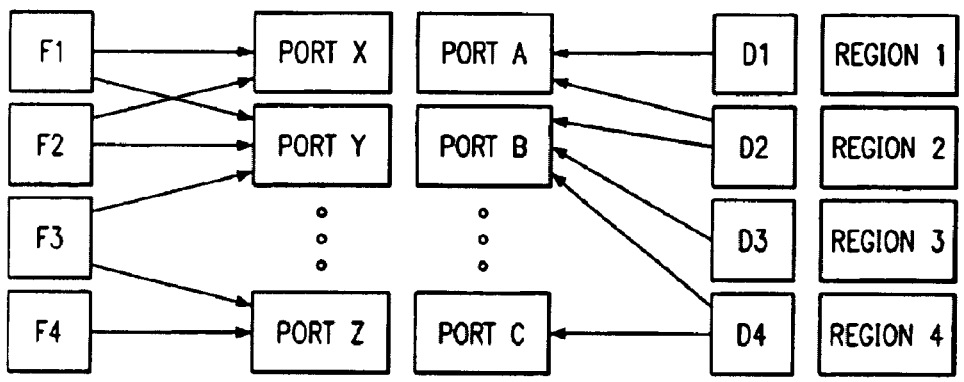

FIG. 34E is a block diagram depiction of another implementation of the present invention. In this implementation, a plurality of factories F1, F2, F3 and F4 are served by a plurality of ports including port X, port Y, and port Z. Additionally, a plurality of distribution centers D1, D2, and D4 are each associated with a particular geographic region including region one, region two, region three, region four. The distribution centers are serviced by a number of ports including port A, port B, and port C. In accordance with one embodiment of the present invention, a factory may be supported by one or more ports. This multiplicity is graphically depicted in the view of FIG. 34E by the connections between the factories and the ports. For example, factory one is serviced by port X and port Y. Factory two is serviced by port X and port Y. Factory three is serviced by port Y and port Z. Factory four is serviced only by port Z. The same is true for distribution centers. Distribution center D1 is serviced only by port A. Distribution center D2 is serviced by port A and port B. Distribution center D3 is serviced only by port B. Distribution center D4 is serviced by port B and port C.

The invention claimed is:

1. A method of selling articles over a distributed data processing system, comprising:
    (a) identifying a product utilizing said distributed data processing system,
    (b) soliciting purchase commitments from potential purchasers over said distributed data processing system;
    (c) accepting contingent offers which depend upon obtaining a predetermined minimum number of offers before acceptance of said offers; and
    (d) utilizing at least one visual representation of shipping space available within a standardized shipping volume in said distributed data processing system to communicate over time whether or not sufficient financial commitments have been obtained from said plurality of potential purchasers to fill one or more standard shipping containers.

2. A method according to claim 1, further comprising:
    (e) wherein said distributed data processing system includes a user interface which facilitates (1) gathering of information from potential purchasers and (2) presenting dynamically changing information to said potential purchasers.

3. A method according to claim 2, further comprising:
    (f) utilizing said distributed data processing system to identity a plurality of articles of manufacture which are different from one another and which are available for purchase by said plurality of potential purchasers.

4. A method according to claim 3, further comprising:
(g) wherein said plurality of articles of manufacture are, or will be, located sufficiently physically proximate to one another prior to shipment to justify a consolidation and coordination of loading-for-shipping operations.

5. A method according to claim 4, further comprising:
(h) wherein each of said plurality of articles of manufacture has particular shipping constraints associated therewith, including at least one of the following particular shipping constraints:
   (1) shipping origin;
   (2) shipping destination;
   (3) production completion date;
   (4) product volume and weight; and
   (5) product packaging.

6. A method according to claim 1, further comprising:
(e) providing a trusted intermediary entity which maintains said distributed data processing system, qualifies said potential purchasers for participation, and in part determines what particular articles of manufacture are presented for purchase over said electronic communication system.

7. A method according to claim 3, further comprising:
(g) wherein said plurality of articles of manufacture associated with each particular visual representation of a standard shipping container may comprise at least one of the following mixtures;
   (1) a mixture of different types of articles of manufacture;
   (2) a mixture of articles of manufacture which originate from different suppliers;
   (3) a mixture of articles of manufacture which are purchased by different ones of said plurality of potential purchasers.

8. A method according to claim 2, further comprising
(g) wherein said plurality of articles of manufacture associated with each particular standard shipping container may be disparate and unrelated products which are consolidated into a particular standard shipping container based upon the geographic proximity of a plurality of different factories.

9. A method according to claim 3, further comprising:
(g) wherein said plurality of articles of manufacture associated with each particular visual representation of a standard shipping container are consolidated into a particular shipping container due to an association between particular ones of said plurality of potential purchasers.

10. A method according to claim 9, wherein said association comprises at least one of:
   (1) an ad hoc grouping of potential purchasers based mainly on interest in purchasing particular ones of said plurality of articles of manufacture;
   (2) a grouping of potential purchasers which are affiliated other than through the purchase of particular ones of said plurality of articles of manufacture; and
   (3) a grouping of potential purchasers which are represented by an administrator.

11. A method according to claim 3, further comprising:
(g) wherein said plurality of articles of manufacture associated with each particular visual representation of a standard shipping container are consolidated into a particular shipping container due to geographic proximity of delivery destinations of particular ones of said plurality of potential purchasers.

12. A method according to claim 3, further comprising:
(g) wherein said plurality of articles of manufacture associated with each particular visual representation of a standard shipping container are consolidated into a particular shipping container due to temporal requirements of particular ones of said plurality of potential purchasers.

13. A method according to claim 3, further comprising:
(g) wherein said plurality of articles of manufacture associated with each particular standard shipping container are consolidated into a particular shipping container due to production completion dates or date windows of particular ones of said plurality of articles of manufacture.

14. A method according to claim 3, further comprising:
(g) wherein said plurality of articles of manufacture associated with each particular standard shipping container are consolidated into a particular shipping container due to temporal complementarities of particular ones of said plurality of articles of manufacture.

15. A method according to claim 3, further comprising:
(g) wherein particular ones of said articles of manufacture are offered for sale on a conditional basis which is contractually binding on a particular manufacturer if a predetermined condition is satisfied.

16. A method according to claim 15, further comprising:
(h) wherein said predetermined condition comprises at least one of
   (1) an order is obtained for a minimum number of units of a particular article of a manufacture;
   (2) an aggregation of orders is obtained for a minimum number of units of a particular article of manufacture;
   (3) offer acceptance time requirements are satisfied;
   (4) shipping origin requirements are satisfied;
   (5) shipping destination requirements are satisfied;
   (5) shipping container requirements are satisfied;
   (6) shipping routes requirements are satisfied;
   (7) product delivery timing requirements are satisfied; and
   (8) minimum shipping utilization rates are satisfied.

17. A method according to claim 3, further comprising:
(g) providing a shipping management module which is a computer program which receives as input order data, production data, shipping data, container data, and said shipping constraints and which operates to generate groupings of particular ones of said plurality of articles of manufacture which optimally fills at least one or a plurality of standard shipping containers in order to optimize loading efficiency.

18. A method according to claim 3, further comprising:
(g) providing a shipping management module which is a computer program which receives as input order data, production data, shipping data, container data, and said shipping constraints and which operates to generate groupings of particular ones of said plurality of articles of manufacture which fills at least one or a plurality of standard shipping containers in order to optimize shipping and delivery efficiency.

19. A method according to claim 3, further comprising:
(g) providing a shipping management module which is a computer program which receives as input order data, production data, shipping data, container data, and said shipping constraints and which operates to generate groupings of particular ones of said plurality of articles of manufacture which fills at least one or a plurality of standard shipping containers in order to optimize simultaneously loading efficiency and shipping and delivery efficiency.

20. A method according to claim 1, further comprising:
(e) wherein said at least one visual representation of said standardized shipping volume comprises:
 (1) at least one geometric icon defining a graphical user interface area;
 (2) a plurality of segments located within said at: least one geometric icon, presented in a manner which allows each segment to be distinguished from other segments;
 (3) wherein each of said at least one geometric icon represents a separate one of a plurality of standard shipping containers and
 (4) wherein said interface area in said graphical user interface which defined by each of said at least one geometric icon represents a usable volume within said standard shipping container;
 (5) wherein each of said segments represents at least one of (a) utilized space, or (b) available space within said standard shipping container.

21. A method according to claim 1, wherein the at least 20 foot standard shipping container comprises a 20 foot standard shipping container.

22. A method according to claim 1, wherein the at least 20 foot standard shipping container comprises a 40 foot standard shipping container.

* * * * *